US012647790B2

(12) United States Patent
Bora

(10) Patent No.:　US 12,647,790 B2
(45) Date of Patent:　Jun. 2, 2026

(54) METHODS AND SYSTEMS FOR FACILITATING SECURED COMMUNICATIONS AND TRANSACTIONS BETWEEN DEVICES

(71) Applicant: AirEdge Inc., Dallas, TX (US)

(72) Inventor: Swapnil Bora, Dallas, TX (US)

( * ) Notice: Subject to any disclaimer, the term of this patent is extended or adjusted under 35 U.S.C. 154(b) by 433 days.

(21) Appl. No.: 17/583,656

(22) Filed: Jan. 25, 2022

(65) Prior Publication Data

US 2022/0240093 A1　Jul. 28, 2022

Related U.S. Application Data

(60) Provisional application No. 63/141,052, filed on Jan. 25, 2021.

(51) Int. Cl.
*H04W 12/106*　(2021.01)
*H04W 12/06*　(2021.01)
*H04W 12/12*　(2021.01)
*H04W 12/47*　(2021.01)

(52) U.S. Cl.
CPC ....... *H04W 12/106* (2021.01); *H04W 12/068* (2021.01); *H04W 12/12* (2013.01); *H04W 12/47* (2021.01)

(58) Field of Classification Search
CPC .. H04W 12/106; H04W 12/47; H04W 12/068
USPC ........................................................ 713/168
See application file for complete search history.

(56) References Cited

U.S. PATENT DOCUMENTS

| | | | |
|---|---|---|---|
| 10,070,310 B2 * | 9/2018 | Powell | G06Q 20/36 |
| 2011/0161117 A1 * | 6/2011 | Busque | G16H 10/65 |
| | | | 382/307 |
| 2013/0219479 A1 | 8/2013 | Desoto et al. | |
| 2016/0012465 A1 | 1/2016 | Sharp | |
| 2016/0036594 A1 | 2/2016 | Conrad et al. | |
| 2016/0042263 A1 | 2/2016 | Gaddam et al. | |

(Continued)

OTHER PUBLICATIONS

United States Patent & Trademark Office (ISA), International Search Report and Written Opinion for PCT/US22/13654 dated May 3, 2022, 22 pp.

*Primary Examiner* — Anthony D Brown
(74) *Attorney, Agent, or Firm* — Daniel J. Chalker; Edwin S. Flores; Chalker Flores, LLP

(57) ABSTRACT

Hardware-based security systems with various codes can enhance the security, privacy, simplicity, and efficiency of various transactions between transmitting and receiving parties. The real-time parameters such as time, date, and location, which keep changing for each person are easily accessible. Such parameters may be used for a new security protocol and system, wherein, the devices can encrypt or decrypt the communication using regularly changing parameters that makes communication highly decentralized and harder to hack or figure out. Furthermore, various algorithms of encryption, decryption, or cryptography can be used in association with the parameters to enhance the communication security further. The processes of implementing such security system along with various solutions including travel passport such as with respect to vaccination, securely storing data or files on local or remote servers, enhanced financial system, and possible hardware devices and applications for such solutions are presented in this application.

20 Claims, 43 Drawing Sheets

(56) References Cited

U.S. PATENT DOCUMENTS

2016/0360403 A1 * 12/2016 Jordi ..................... H04W 12/06
2017/0132533 A1    5/2017 Darnell

* cited by examiner

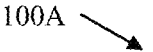
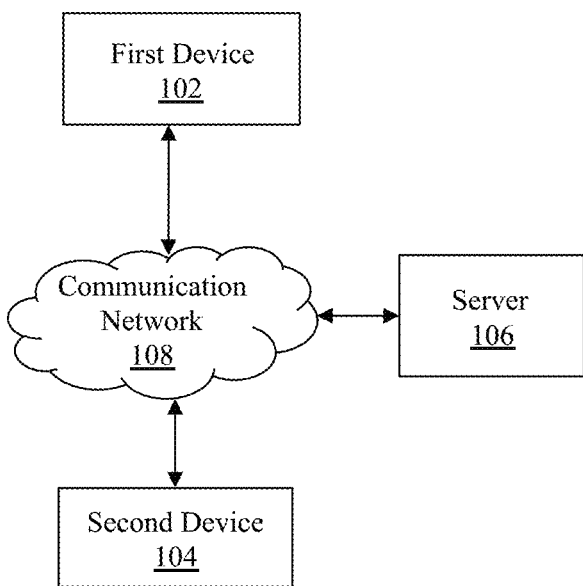
FIG. 1A

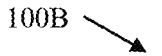
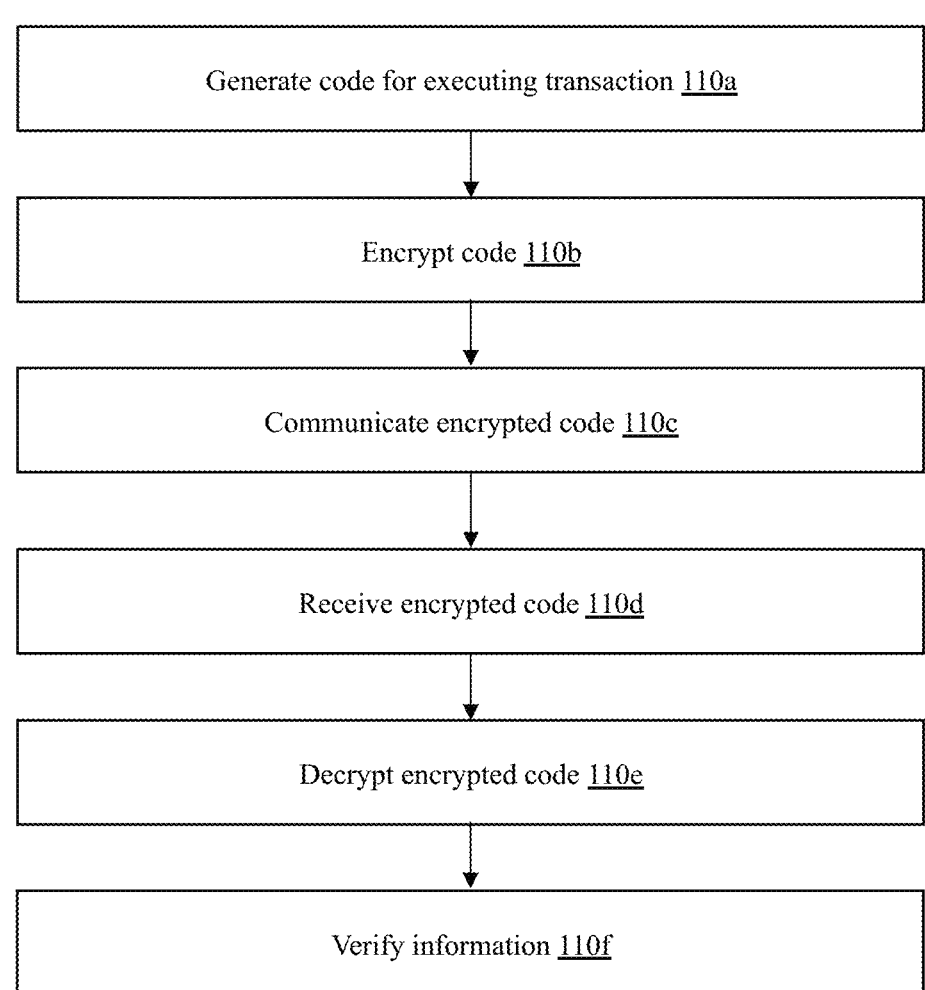
100B
Generate code for executing transaction 110a
Encrypt code 110b
Communicate encrypted code 110c
Receive encrypted code 110d
Decrypt encrypted code 110e
Verify information 110f
FIG. 1B

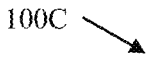
100C
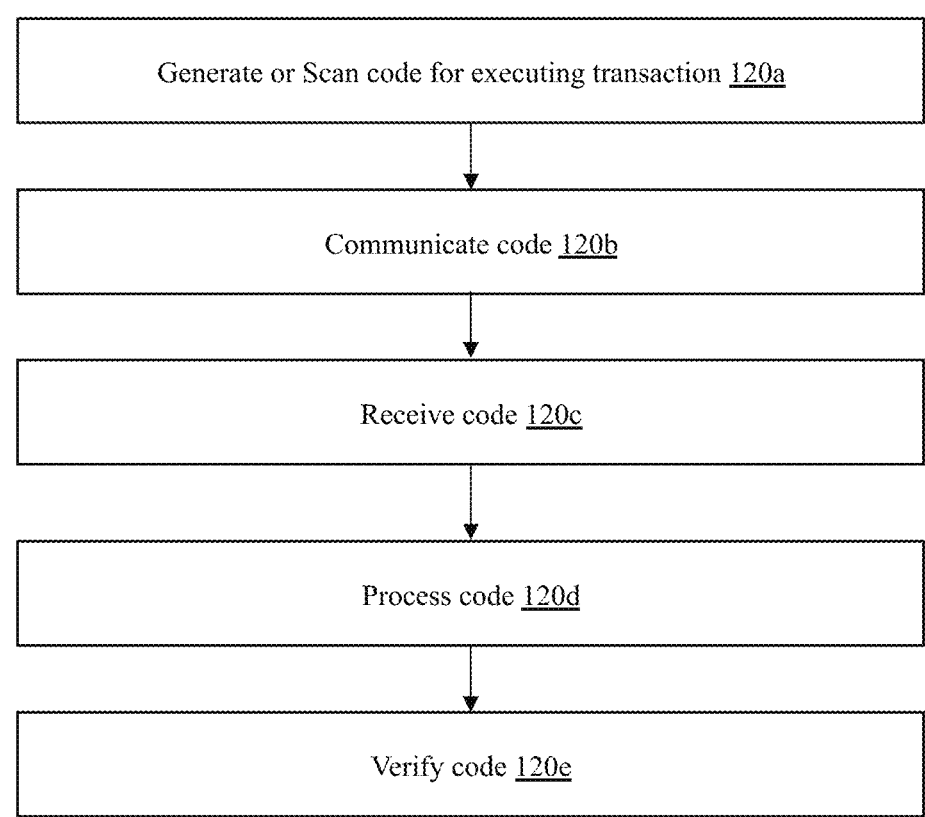
Generate or Scan code for executing transaction 120a
Communicate code 120b
Receive code 120c
Process code 120d
Verify code 120e
FIG. 1C

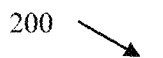
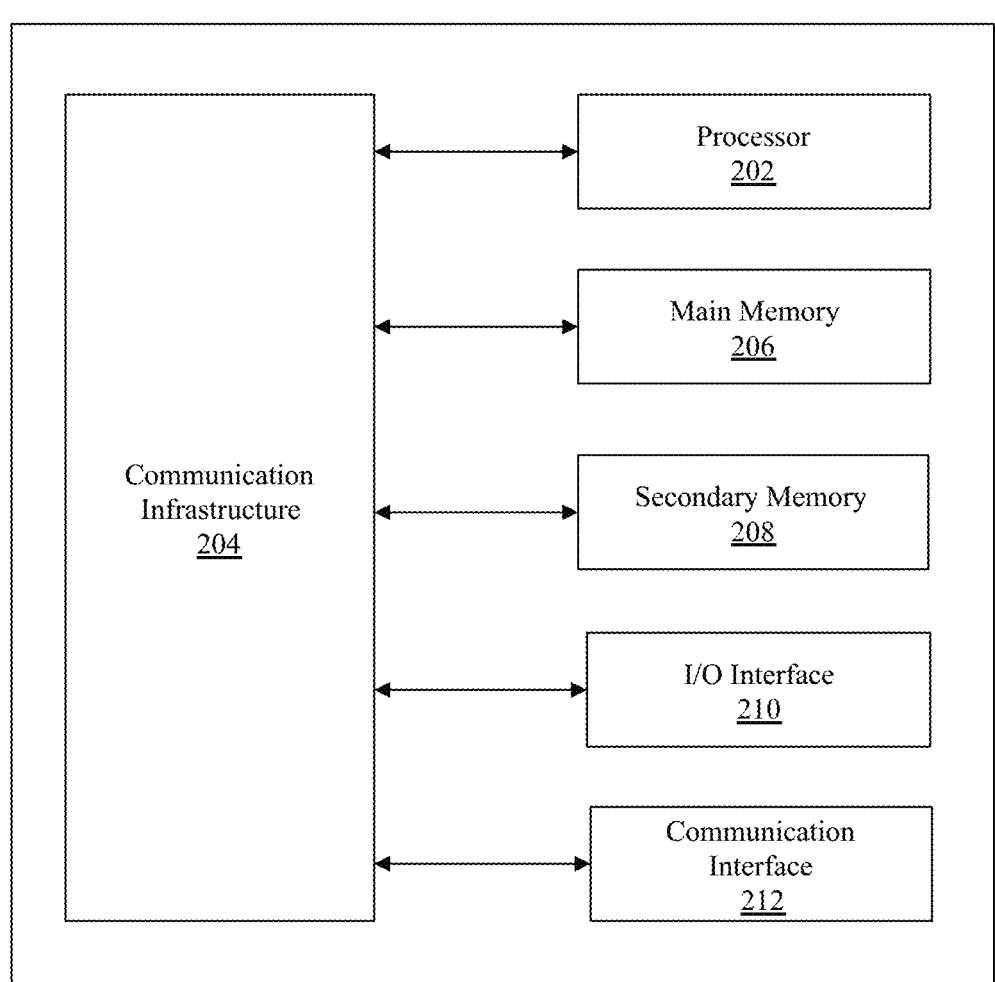
FIG. 2

500

Electronic Device gets Code1

Electronic Device Gets Code2

Electronic Device Gets Code(n)

Electronic Device Generates Unique Code

600

Electronic Device gets Code1

Electronic Device Gets Code2

Electronic Device Gets Code(n)

Electronic Device Generates Unique Code

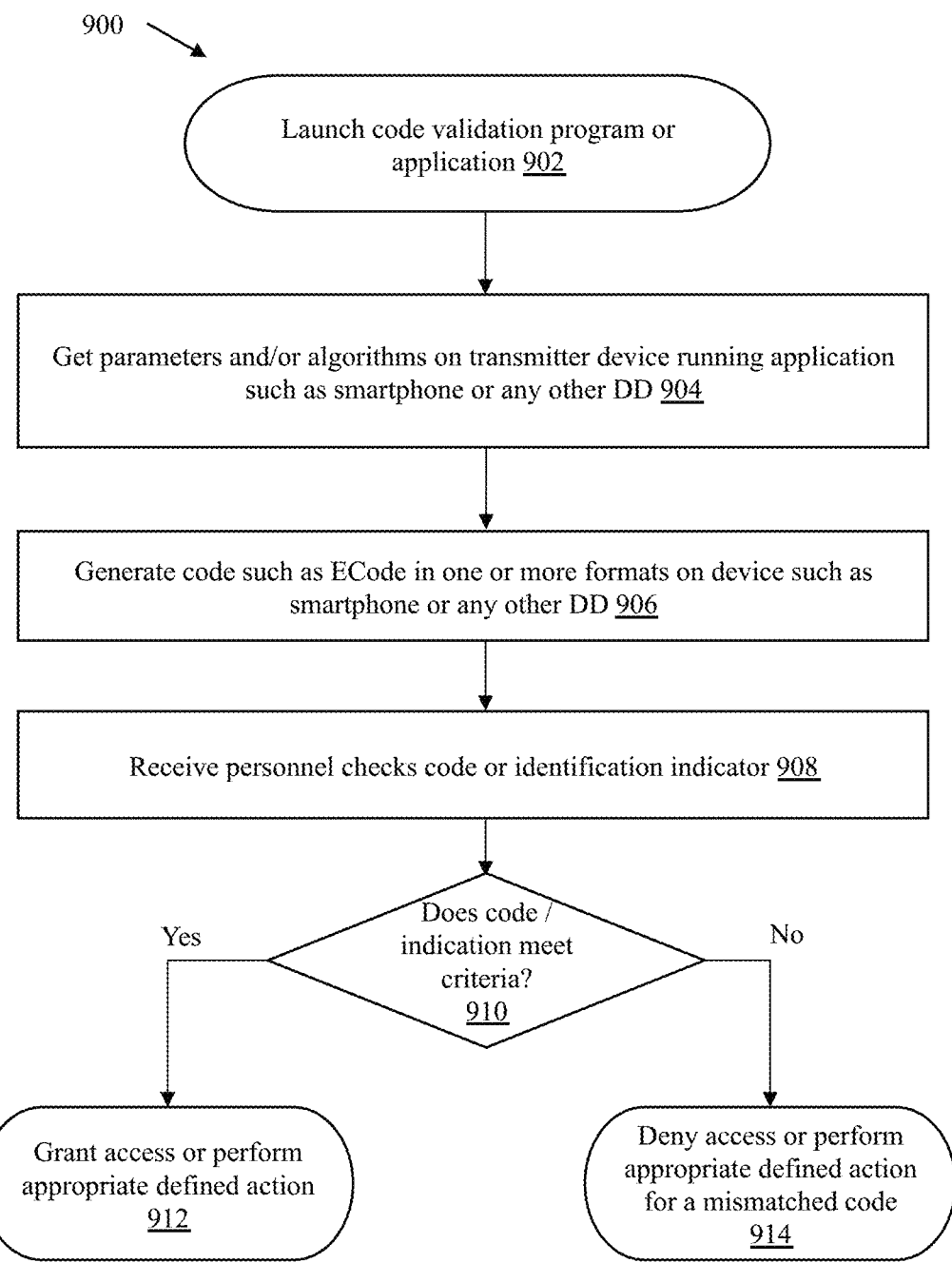

900

Launch code validation program or application 902

Get parameters and/or algorithms on transmitter device running application such as smartphone or any other DD 904

Generate code such as ECode in one or more formats on device such as smartphone or any other DD 906

Receive personnel checks code or identification indicator 908

Does code / indication meet criteria? 910

Yes

No

Grant access or perform appropriate defined action 912

Deny access or perform appropriate defined action for a mismatched code 914

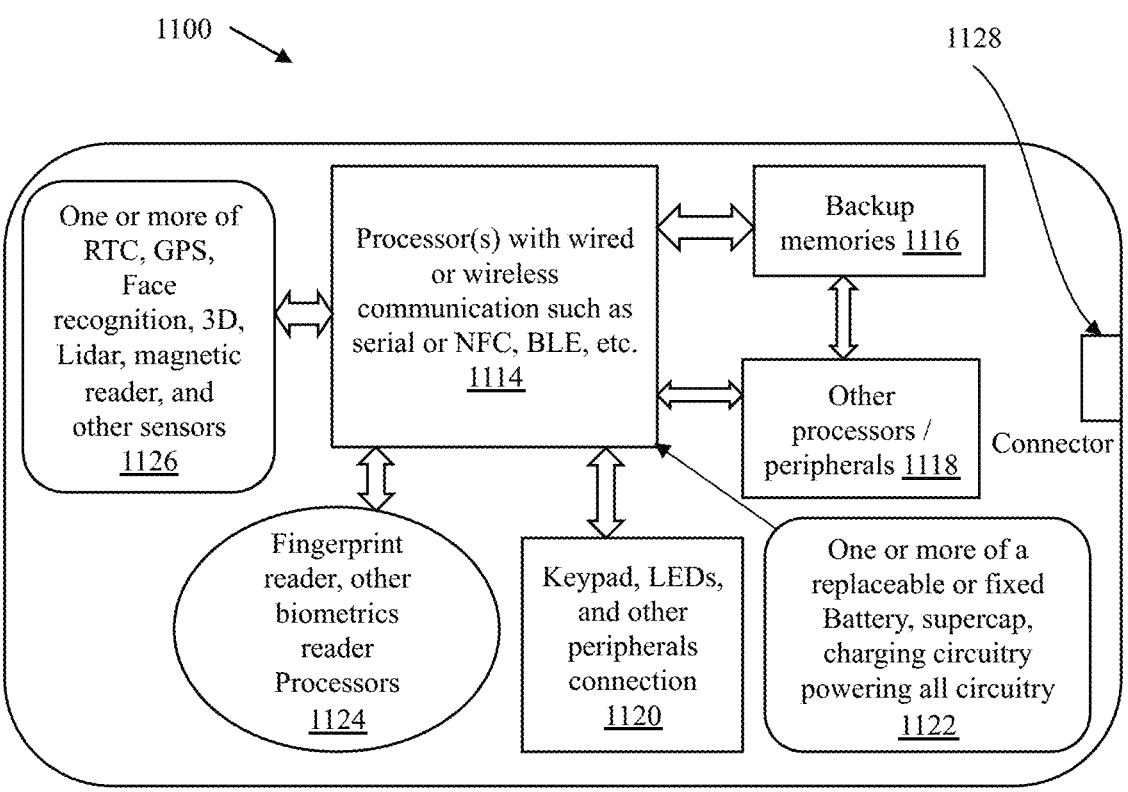

One or more of RTC, GPS, Face recognition, 3D, Lidar, magnetic reader, and other sensors 1126

Processor(s) with wired or wireless communication such as serial or NFC, BLE, etc. 1114

Backup memories 1116

Other processors / peripherals 1118

Connector

Fingerprint reader, other biometrics reader Processors 1124

Keypad, LEDs, and other peripherals connection 1120

One or more of a replaceable or fixed Battery, supercap, charging circuitry powering all circuitry 1122

Device with Code

"I am a Verifier" is selected

Code Verifier Device
With Verification Key

2400

Verifier selects cause

User Device with Code

Code Verifier Device
With Verification Key

2500

102

104

Peron's Name and other identity information such a picture shown here.

Send Code

Wireless communication

Event Logo

Verifier's Info

Random Text/Pattern1

Verify User

User Device with Code

Code Verifier Device With Verification Key

2600

102

104

Peron's Name and other identity information such a picture shown here.

Send Code

Camera or light based communication

Event Logo
Verifier's Info

Random
Text/Pattern1

Verify User

User Device with Code

Code Verifier Device
With Verification Key

2700

3000

User Device with Code

Code Verifier Device
With Verification Key

3100

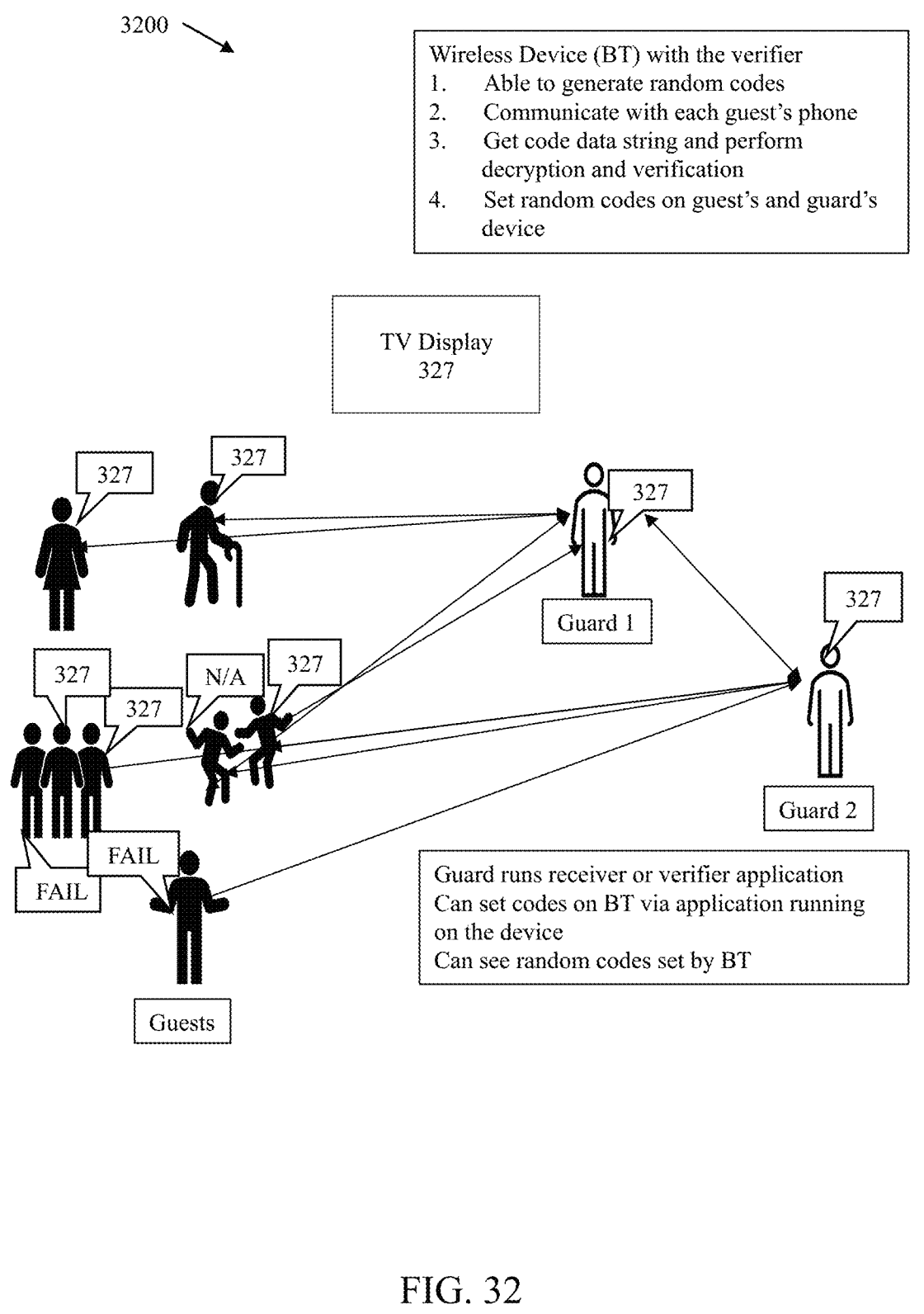

3200

Wireless Device (BT) with the verifier
1.  Able to generate random codes
2.  Communicate with each guest's phone
3.  Get code data string and perform decryption and verification
4.  Set random codes on guest's and guard's device TV Display
327

327

327

327

Guard 1

327

327

327

327

N/A

327

FAIL

FAIL

Guard 2

Guests

Guard runs receiver or verifier application
Can set codes on BT via application running on the device
Can see random codes set by BT

FIG. 32

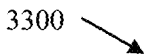
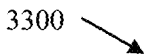
FIG. 33

3700

3502

3900

3502

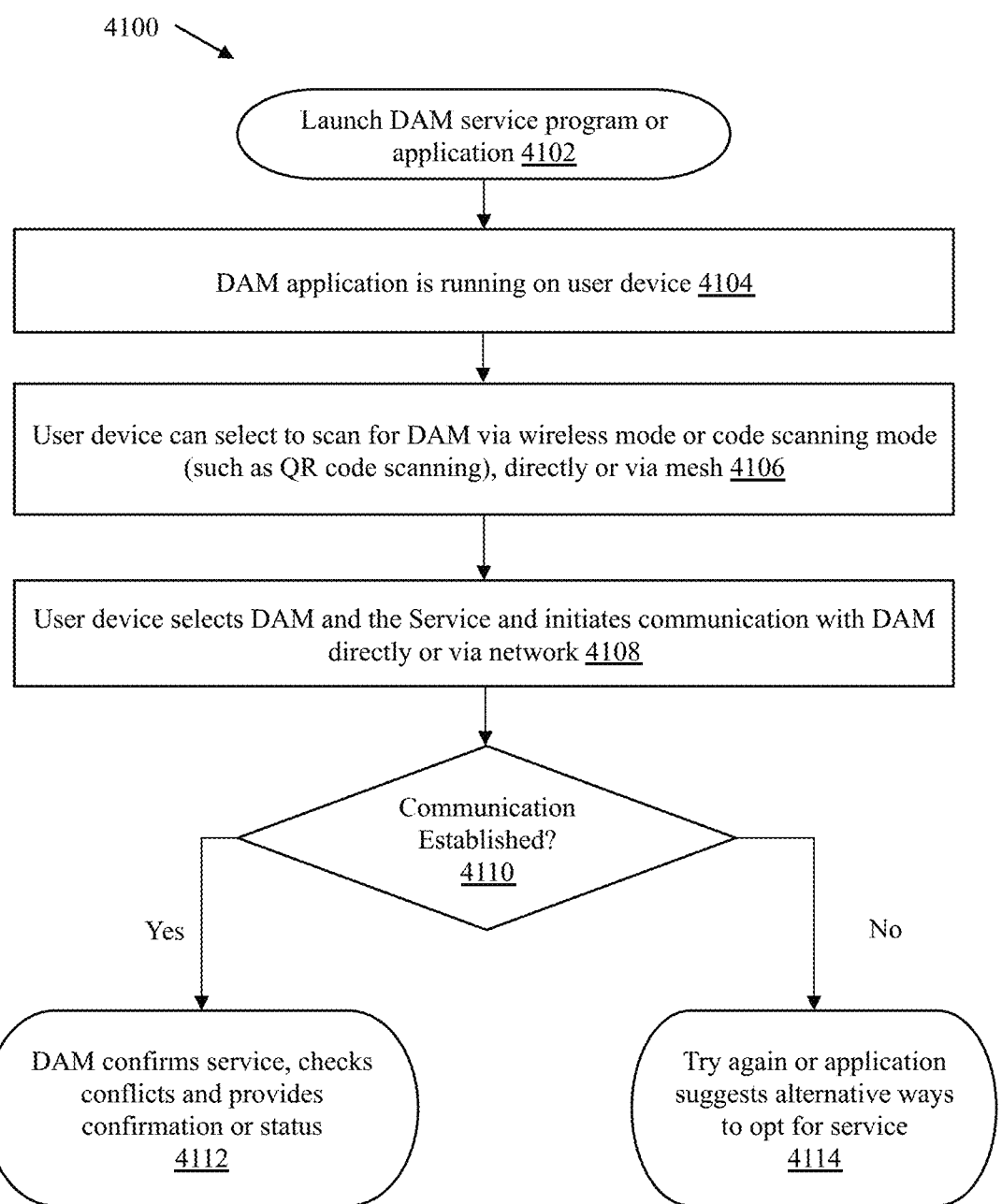

4100

Launch DAM service program or
application 4102

DAM application is running on user device 4104

User device can select to scan for DAM via wireless mode or code scanning mode
(such as QR code scanning), directly or via mesh 4106

User device selects DAM and the Service and initiates communication with DAM
directly or via network 4108

Communication
Established?
4110

Yes

No

DAM confirms service, checks
conflicts and provides
confirmation or status
4112

Try again or application
suggests alternative ways
to opt for service
4114

FIG. 41

METHODS AND SYSTEMS FOR FACILITATING SECURED COMMUNICATIONS AND TRANSACTIONS BETWEEN DEVICES

CROSS-REFERENCE TO RELATED APPLICATIONS

This application claims priority to and is a nonprovisional patent application of U.S. provisional patent application Ser. No. 63/141,052 filed on Jan. 25, 2021 and entitled "Hardware Based Solution of Secured Communication and Transaction Between Devices." The foregoing application is hereby incorporated by reference in its entirety.

STATEMENT OF FEDERALLY FUNDED RESEARCH

Not applicable.

TECHNICAL FIELD

The present disclosure relates in general to security systems. In particular, the present disclosure relates to methods and systems for facilitating secured communications and transactions between devices.

BACKGROUND

Generally, various types of computing devices are being put to an increasing variety of uses. These devices are capable of communicating over a wired or wireless network, including the communications of data over the network. The devices can include everyday objects such as mobile phones, thermostat systems, door locks, automobiles, printers, routers, and any other device able to connect to any type of network. Network communications for such devices may be used to facilitate device initialization, automation, data capture, security, providing alerts, personalization of settings, transactions, and other objectives. However, in today's world of communications, lack of data security as data flows between the devices presents problems when protecting users, devices, and networks. The primary issues often relate to communication security and integrity. In addition to communications between the devices, securing the devices themselves, such that the sender and receiver in a given communication are validated, is critical to overall protection. Numerous prior solutions have attempted to improve upon the network communications, device, and data security. However, despite these attempts, deficiencies still persist.

In prior art solutions, generally, a quick response (QR) code, a bar code, and various other codes are used in various industries for data management, accesses, communication, transactions, storage, computation, security purposes, and the like. However, these codes are static, and it is highly possible that the same code can be used by multiple individuals. That brings various limitations in the uses of such codes such as for access applications, transaction applications, or any other applications as applied. For example, when a code is assigned to an individual, other individuals (who have access to the same code) can also use it, leading to fraudulent access. Even though more sophisticated codes exist where the codes can be encrypted with the individual's data such as name or address so that when a receiver scans or reads it at an access point, some personal data such as a name of the individual must match with the individual's identity proof. Basically, in such a case, the receiver personnel must verify the code with the identity proof and the individual must carry the identity proof such as driving license. When the individual must present the identity proof at the access location, it means that the access location needs to have a person or a mechanism to verify the identity proof. Generally, this is done by personnel at the entry point, such as a receptionist at a hotel or a security guard at a bank. Such process takes time of the individual and the personnel at the access point, thereby making the whole process costly and time consuming. In addition, a computing device such as a personal computer, tablet, or smartphone with Internet access may also be required by the personnel at the entry point which further makes the whole process costlier.

In light of the foregoing, there exists a need for a technical and reliable solution that solves the abovementioned problems and helps in facilitating secured communication and transaction between devices in an efficient and effective manner.

SUMMARY

Certain embodiments of the disclosure may be found in a disclosed apparatus for facilitating secured communication and transaction. Exemplary aspects of the disclosure provide a method and a system for facilitating the secured communication and transaction between devices. The disclosed system may include one or more devices, servers, and networks but should not be construed as limiting to the scope of the present invention. The method includes one or more operations that are executed by circuitry of the disclosed system to facilitate the secured communication and transaction.

In an embodiment of the present disclosure, hardware-based security systems with various types of codes, such as QR codes, Bar codes, Near Field Communication (NFC) codes, Bluetooth Low Energy (BLE) codes, Radio Frequency Identification (RFID) codes, or other codes, may be used that can enhance security, privacy, simplicity, and efficiency of various communication and transactions between devices such as data or command transmitting and receiving parties. Real time attributes or parameters such as time, date, and location, which keep changing for everyone are easily accessible because of the advancements in communication and computational devices such as a smartphone, smartwatch, or the like. Such attributes or parameters may be used for a new security protocol and system, wherein the associated devices can encrypt or decrypt the communication using regularly changing attributes or parameters that makes communication highly decentralized and harder to hack or figure out. Furthermore, various algorithms of encryption, decryption, or cryptography may be used in association with the attributes or parameters to further enhance the communication security. The methodologies and processes of implementing such security system along with various solutions including travel passport such as with respect to vaccination, securely storing data or files on local or remote servers, enhanced financial or transaction system, entry access to a restricted area, offline cash wallet for making a transaction, and possible hardware devices and applications for such solutions are disclosed herein in the present invention.

In another embodiment of the present disclosure, a security method includes: generating, by one or more first applications running on a first device, a code for executing a transaction corresponding to one or more actions or events; encrypting, by the one or more first applications, the code based on at least one or more parameters comprising at least one of a location, time, or date on the first device at a specific time, wherein the specific time is a current time or within a specific time duration; communicating, by the one or more first applications, the encrypted code to a second device over a communication network; receiving, by one or more second applications running on the second device, the encrypted code; decrypting, by the one or more second applications, the encrypted code and retrieving an information from the decrypted code; verifying, by the one or more second applications, the retrieved information; and executing the transaction after a successful verification of the retrieved information.

In one aspect, the code corresponds to a Quick Response (QR) code, a bar code, a graphical or visual code, or any other digital code comprising at least a Near Field Communication (NFC) code, a Bluetooth Low Energy (BLE) code, or a Radio Frequency Identification (RFID) code. In another aspect, the information comprises at least one of personal information, user credentials, payment information, ticket information, health records, purchase information, parking information, historical event information, future event information, product information, service information, access information, or any other information related to the one or more actions, events, or status. In another aspect, the method further includes selecting a code generation program or application from the one or more first applications. In another aspect, the method further includes selecting one or more encryption algorithms from the one or more first applications, wherein the one or more encryption algorithms change from time to time. In another aspect, the method further includes: accessing, by the one or more second applications, the one or more parameters used by the encryption algorithm; selecting one or more decryption algorithms from the one or more second programs that can decrypt the encrypted code; and wherein the encrypted code is decrypted by the one or more decryption algorithms based on the one or more accessed parameters. In another aspect, the communication network is a wireless communication network or a wired communication network. In another aspect, the one or more parameters further comprise personal data of a first user of the first device comprising at least one of a name, date of birth, universally unique identifier (UUID), device ID, phone number, email ID, other verification ID(s) that ensures identity of the first user by various verification means, nationality and related parameters, event types and related parameters, address, identity numbers such as license number, and duration of visit. In another aspect, the one or more parameters further comprise company parameters of a first user of the first device comprising at least one of a company name, company identification numbers, company address, employee ID, event ID, and any other company parameters. In another aspect, the one or more parameters further comprise one or more technical parameters comprising at least one of a signal strength between two devices, one or more random numbers, GPS coordinates of one or more devices comprising at least one of the first device or the second device, transmission power of the one or more devices, relative signal strength indicator (RSSI) value, sensor data comprising at least one of temperature, humidity, air quality, or any other data generated by the one or more devices, and security parameters comprising one or more types of biometrics comprising at least one of thumb print, facial recognition parameter, or voice parameter. In another aspect, the method further includes choosing, by the one or more first applications, the one or more parameters and one or more encryption algorithms to generate the encrypted code. In another aspect, the one or more parameters and the one or more encryption algorithms are chosen based on one or more predefined rules, as per a program on the first device, as entered by a first user of the first device, or taken from the second device before or while generating the encrypted code. In another aspect, the code comprises a single code, a combination of multiple codes, or multiple sequential codes. In another aspect, the encrypted code is valid for a time duration according to a type of the one or more actions or events associated with the transaction. In another aspect, the method further includes: selecting the code; selecting the transaction; and assigning the selected code to the selected transaction. In another aspect, the method further includes: scanning for the second device using the first device; or scanning for the first device using the second device. In another aspect, the method further includes sending a message from the second device to the first device requesting the code or permission to receive the code. In another aspect, the method further includes exchanging an algorithm identifier between the first device and the second device. In another aspect, the method further includes denying the transaction after an unsuccessful verification of the retrieved information. In another aspect, executing the transaction after the successful verification further includes: sending a message from the second device to the first device to set or display a random text/pattern known by the second device; setting or displaying the random text/pattern on the first device; and executing the transaction after a successful viewing of the random text/ pattern. In another aspect, the first device includes: a digital device card, or the digital device card connected to a user device, or the digital device card integrated into the user device; and the digital device card comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors. In another aspect, the second device comprises: a digital access meter, or the digital access meter connected to a verifying device, or the digital access meter integrated into the verifying device; and the digital access meter comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors.

In another embodiment of the present disclosure, a security method includes: generating or scanning, by one or more first applications running on a first device, a code for executing a transaction corresponding to one or more actions or events; communicating, by the one or more first applications, the code to a second device over a wireless communication network; receiving, by one or more second applications running on a second device, the code from the first device over the wireless communication network; processing, by the one or more second applications, the received code; verifying, by the one or more second applications, an information in the received code; and executing the transaction after a successful verification of the information.

In one aspect, the code corresponds to a Quick Response (QR) code, a bar code, a graphical or visual code, or any other digital code comprising at least a Near Field Communication (NFC) code, a Bluetooth Low Energy (BLE) code, or a Radio Frequency Identification (RFID) code that is scannable by a camera device of the first device. In another aspect, the method further includes: selecting the information by a first user of the first device; generating the code by a code generation program or application from the one or more first applications running on the first device based on the selected information; and wherein the selected information comprises at least one of personal information, user credentials, payment information, ticket information, health records, purchase information, parking information, historical event information, future event information, product information, service information, access information, or any other information related to the one or more actions, events, or status. In another aspect, the method further includes: acknowledging a first user of the first device with a random confirmation code when the information is successfully verified; wherein one or more user devices comprise at least the first device, and one or more verifier devices comprise at least the second device that each display the random confirmation code simultaneously; and wherein the random confirmation code is valid for a short, limited time to avoid fraudulent actions, and the random confirmation code changes every time the information is verified. In another aspect, the code is a single code, a combination of multiple codes, or multiple sequential codes. In another aspect, the method further includes: selecting the code; selecting the transaction; and assigning the selected code to the selected transaction. In another aspect, the method further includes: scanning for the second device using the first device; or scanning for the first device using the second device. In another aspect, the method further includes sending a message from the second device to the first device requesting the code or permission to receive the code. In another aspect, the method further includes exchanging an algorithm identifier between the first device and the second device. In another aspect, the method further includes: encrypting, by the one or more first applications, the code based on at least one or more parameters comprising at least one of a location, time, or date on the first device at a specific time, wherein the specific time is a current time or within a specific time duration; the received code comprises the encrypted code; and decrypting, by the one or more second applications, the encrypted code. In another aspect, the method further includes denying the transaction after an unsuccessful verification of the retrieved information. In another aspect, executing the transaction after the successful verification further includes: sending a message from the second device to the first device to set or display a random text/pattern known by the second device; setting or displaying the random text/pattern on the first device; and executing the transaction after a successful viewing of the random text/pattern. In another aspect, the first device includes: a digital device card, or the digital device card connected to a user device, or the digital device card integrated into the user device; and the digital device card comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors. In another aspect, the second device comprises: a digital access meter, or the digital access meter connected to a verifying device, or the digital access meter integrated into the verifying device; and the digital access meter comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors.

In another embodiment of the present disclosure, a security system includes: one or more user devices comprising at least a first device; and one or more verifier devices comprising at least a second device. The first device is configured to generate or scan a code for executing a transaction corresponding to one or more actions or events, and communicate the code to the second device over a wireless communication network. The second device is configured to receive the code from the first device over the wireless communication network, process the received code, and verify an information in the received code. The transaction is executed after a successful verification of the information.

In one aspect, the code corresponds to a Quick Response (QR) code, a bar code, a graphical or visual code, or any other digital code comprising at least a Near Field Communication (NFC) code, a Bluetooth Low Energy (BLE) code, or a Radio Frequency Identification (RFID) code that is scannable by a camera device of the first device. In another aspect, the first device is further configured to select the information by a first user, and generate the code by a code generation program or application based on the selected information, and the selected information comprises at least one of personal information, user credentials, payment information, ticket information, health records, purchase information, parking information, historical event information, future event information, product information, service information, access information, or any other information related to the one or more actions, events, or status. In another aspect, the second device is further configured to acknowledge a first user of the first device with a random confirmation code when the information is successfully verified; the first device and second device display the random confirmation code simultaneously; and the random confirmation code is valid for a short, limited time to avoid fraudulent actions, and the random confirmation code changes every time the information is verified. In another aspect, the code is a single code, a combination of multiple codes, or multiple sequential codes. In another aspect, the first device is further configured to scan for the second device; or the second device is further configured to scan for the first device. In another aspect, the second device is further configured to send a message to the first device requesting the code or permission to receive the code. In another aspect, the first device and the second device are further configured to exchange an algorithm identifier. In another aspect, the first device is further configured to encrypt the code based on at least one or more parameters comprising at least one of a location, time, or date on the first device at a specific time, wherein the specific time is a current time or within a specific time duration; the received code comprises the encrypted code; and the second device is further configured to decrypt the encrypted code. In another aspect, the second device is further configured to deny the transaction after an unsuccessful verification of the retrieved information. In another aspect, the second device is further configured to send a message to the first device to set or display a random text/pattern known by the second device; the first device is further configured to set or display the random text/pattern; and the transaction is executed after a successful viewing of the random text/pattern. In another aspect, the first device includes: a digital device card, or the digital device card connected to a user device, or the digital device card integrated into the user device; and the digital device card comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors. In another aspect, the second device includes: a digital access meter, or the digital access meter connected to a verifying device, or the digital access meter integrated into the verifying device; and the digital access meter comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the disclosure are illustrated by way of example, and not limited by the appended figures, in which like references indicate similar elements:

FIG. 1A is a block diagram that illustrates an exemplary system environment for facilitating secured communication and transaction between devices in accordance with an exemplary embodiment of the disclosure;

FIG. 1B is a process flow diagram that illustrates an exemplary process for a security method in accordance with an exemplary embodiment of the disclosure;

FIG. 1C is a process flow diagram that illustrates another exemplary process for a security method in accordance with an exemplary embodiment of the disclosure;

FIG. 2 is a block diagram that illustrates an architecture of a computing system in accordance with an exemplary embodiment of the disclosure;

FIG. 9 is a process flow diagram that illustrates code comparison and validation without the receiver device in accordance with an exemplary embodiment of the disclosure;

FIG. 12 is a block diagram that illustrates the DD card electronics in accordance with an exemplary embodiment of the disclosure;

FIG. 32 is a diagram that illustrates two or more verifiers at an event venue for user verification in accordance with an exemplary embodiment of the disclosure;

FIG. 33 is a process flow diagram that illustrates two or more verifiers at an event venue for user verification with one or more BT devices in accordance with an exemplary embodiment of the disclosure;

FIG. 41 is a process flow diagram that illustrates interaction between a user device and a DAM in accordance with an exemplary embodiment of the disclosure;

Figure 3:
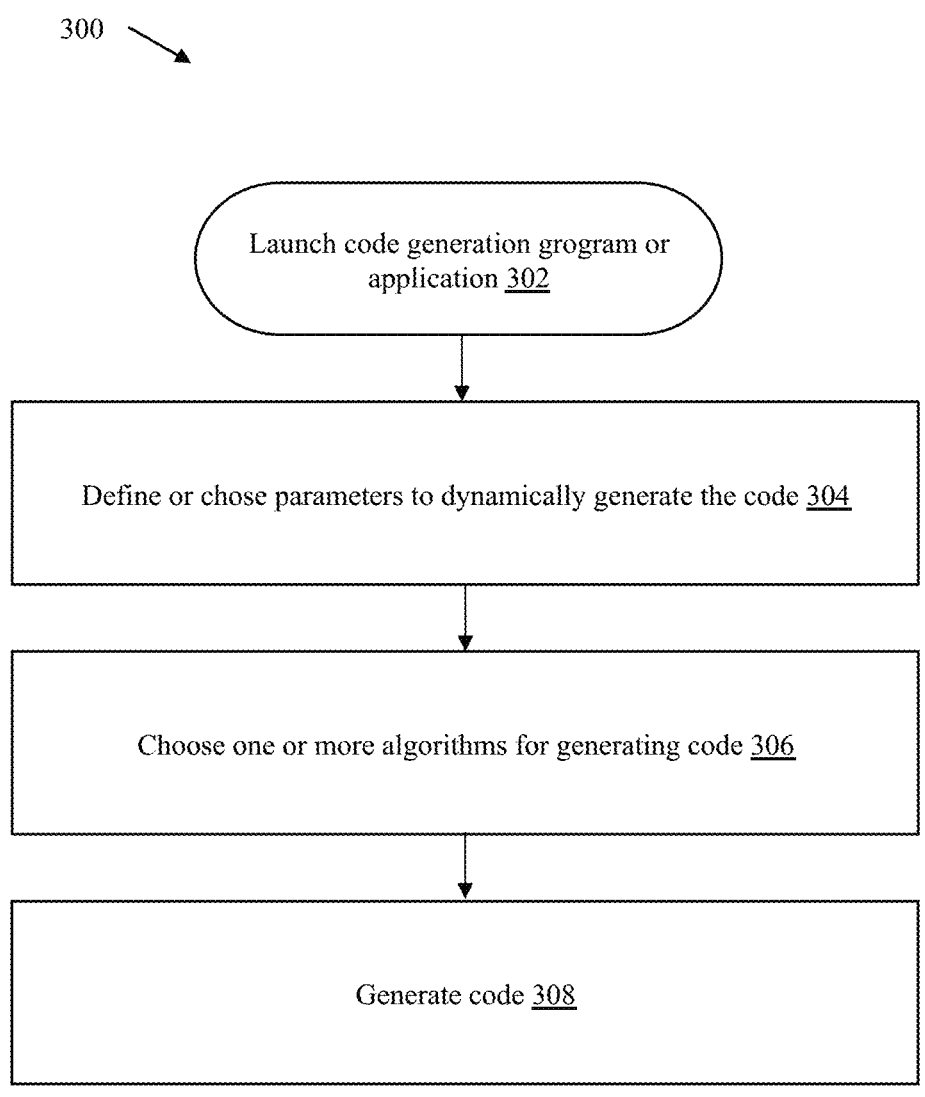
FIG. 3 is a process flow diagram that illustrates an exemplary process for generating a code by a computing or processing device in accordance with an exemplary embodiment of the disclosure.

Further areas of applicability of the disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented, and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

As used in this specification and claim(s), the word "a" or "an" when used in conjunction with the term "comprising" may mean "one," but it is also consistent with the meaning of "one or more," "at least one," and "one or more than one". For example, the term "an article" may include a plurality of articles. The use of the term "or" in the claims is used to mean "and/or" unless explicitly indicated to refer to alternatives only or the alternatives are mutually exclusive, although the disclosure supports a definition that refers to only alternatives and "and/or." The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used in this specification and claim(s), the term "about" is used to indicate that a value includes the inherent variation of error for the device, the method being employed to determine the value, or the variation that exists among the study subjects. As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

As used in this specification and claim(s), reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Those with ordinary skill in the art will appreciate that the elements in the figures are illustrated for simplicity and clarity and are not necessarily drawn to scale. There may be additional components or processes described in the foregoing application that are not depicted on the described drawings. In the event such a component or process is described, but not depicted in a drawing, the absence of such component and process from the drawings should not be considered as an omission of such design from the specification.

Before describing various embodiments of the present invention in detail, it should be observed that the present invention utilizes a combination of components or processes, which constitute a method and a system for facilitating the secured communication and transaction between devices. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

FIG. 1A is a block diagram that illustrates an exemplary system environment 100A for facilitating secured communication and transaction between devices in accordance with an exemplary embodiment of the disclosure. The system environment 100A includes one or more devices and/or servers such as a first device 102, a second device 104, and a server 106. In an embodiment, the first device 102, the second device 104, and the server 106 may communicate with each other via one or more communication networks such as a network 108. The network 108 may be a wired or wireless communication network. Examples of the communication network may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a Bluetooth network, a Bluetooth Low Energy (BLE) network, Near-field communication (NFC) network, or any combination thereof. In some embodiments, various entities (such as the first device 102, the second device 104, the server 106, and any other devices as applicable) in the system environment 100A may be coupled to the communication network 108 in accordance with various wired and wireless communication protocols such as, but are not limited to, Transmission Control Protocol and Internet Protocol (TCP/IP), User Datagram Protocol (UDP), Long Term Evolution (LTE) communication protocols, or any combination thereof.

The first device 102 is a computing or processing device including suitable logic, circuitry, interfaces, and/or code, executable by the circuitry, that may be configured to perform one or more operations. The one or more operations may be facilitated by one or more programs or applications running on the first device 102. These programs or applications may be hosted fully or partially by the first device 102 or the server 106 (or in conjunction with each other) so that the programs or applications can run efficiently on the device in an online or offline mode. In the online mode, the programs or applications may run on the first device 102 to perform the one or more operations with the Internet connectivity. In the offline mode, the programs or applications may run on the first device 102 to perform the one or more operations without requiring the Internet connectivity. The one or more operations may include generation of one or more types of codes (such as QR code, Bar code, Graphical or Visual code, NFC code, BLE code, RFID code, or the like, or any combination thereof), communication with other devices or users in its vicinity, comparisons and validations of data, or the like. These operations may be executed by the first device 102 by using the one or more programs or applications with or without Internet connectivity.

In an embodiment, the first device 102 may be associated with an individual or user who can trigger the one or more programs or applications to perform the one or more operations. Various modes of input that may be used by the user for performing the related operations may include, but are not limited to, a touch-based input, a text-based input, a voice-based input, a gesture-based input, or any combination thereof. In an embodiment, the first device 102 may be used by the user as a transmitter that is configured to transmit one or more codes generated by the program(s) or application(s) to a receiver such as the second device 104 or allow the second device 104 to scan and read the information from the one or more codes. The information may include at least one of personal information, user credentials, payment information, ticket information, health records, purchase information, parking information, historical event information, future event information, product information, service information, access information, or any other information related to the one or more actions, events, or status but should not be construed as limiting to the scope of the present invention. Examples of the first device 102 may include, but are not limited to, a personal computer, a laptop, a smartphone, a smartwatch, a smartcard, a tablet computer, a transmitter, and a processor, but should not be construed as limiting to the scope of the present invention.

The second device 104 is a computing or processing device including suitable logic, circuitry, interfaces, and/or code, executable by the circuitry, that may be configured to perform one or more operations. The one or more operations may be facilitated by one or more programs or applications running on the second device 104. These programs or applications may be hosted fully or partially by the second device 104 or the server 106 (or in conjunction with each other) so that the programs or applications can run efficiently on the device in an online or offline mode. In the online mode, the programs or applications may run on the second device 104 to perform the one or more operations with the Internet connectivity. In the offline mode, the programs or applications may run on the second device 104 to perform the one or more operations without requiring the Internet connectivity. The one or more operations may include reception of one or more types of codes (such as QR code, Bar code, or the like, or any combination thereof), communication with other devices or users in its vicinity, scanning and reading information from the codes, comparisons and validations of data, or the like. These operations may be executed by the second device 104 by using the one or more programs or applications with or without Internet connectivity.

In an embodiment, the second device 104 may be a standalone device and does not require any supporting individual(s) or user(s) or may be associated with an individual or user who can trigger the one or more programs or applications to perform the one or more operations. In some embodiment, the second device 104 may be handled and operated by a remote individual or user. In an embodiment, the second device 104 may be used by the user as a receiver that is configured to receive the one or more codes from a transmitter such as the first device 102 or scan and read the information from the one or more codes displayed on the first device 102. Thereafter, the second device 104 may further run or execute the programs or applications to process the received codes to extract the information or the read information. The second device 104 may further run or execute the programs or applications to compare and validate the information. Examples of the second device 104 may include, but are not limited to, a personal computer, a laptop, a smartphone, a smartwatch, a smartcard, a tablet computer, a transmitter, and a processor, but should not be construed as limiting to the scope of the present invention.

The server 106 may include suitable logic, circuitry, interfaces, and/or code, executable by the circuitry, that may be configured to perform one or more operations. The server 106 may be a computing device, which may include a software framework, that may be configured to create the application implementation and perform the one or more operations. In an embodiment, the server 106 may be configured to host the program(s) or application(s) on the first device 102 and the second device 104 and facilitates one or more online services associated with one or more requests or transactions initiated by the users of the first device 102 and the second device 104. In an embodiment, the server 106 may be realized through various web-based technologies, such as, but are not limited to, a Java web-framework, a .NET framework, a PHP framework, a python framework, or any other web-application framework. The server 106 may be realized through various web-based technologies, such as, but are not limited to, a Java web-framework, a .NET framework, a professional hypertext preprocessor (PHP) framework, a python framework, or any other web-application framework. The application server 106 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the application server 106 may include, but are not limited to, a personal computer, a laptop, a mini-computer, a mainframe computer, a cloud-based server, a network of computer systems, or a non-transient and tangible machine executing a machine-readable code.

In an exemplary embodiment, a first user wants to send digital coins (say, 100 coins) to a second user. The first user may open the application on the first device 102. Since the application knows the surrounding logged devices such as the second device 104, the application presents or displays all the nearby logged devices. The first user may select the second device 104 associated with the second user, enter the coins to be sent, say 100 coins, and send it to the second user. The second user opens the application on the second device 104 and sees the fund transfer request from the first device 102 of the first user. The second user may then accept the fund transfer request and get the coins in his/her account or wallet. Alternatively, the second user directly receive the coins without requiring his/her acceptance from the first device 102 of the first user. After receiving the coins from the first user, the second user may send an acknowledgement to the first user.

In another exemplary embodiment, a second user (say, verifier associate with the second device 104) may scan a surrounding for one or more guests (such as a first user associated with first device 102) who are looking to verify their credentials. The guests such as the first user, upon seeing the request from the second user, may allow his/her credentials to be verified by the second user. The application on the first device 102 may generate a code, say a QR code, corresponding the user's credentials and then may encrypt the QR code using the static and/or dynamic parameter(s) by using the suitable encryption algorithm(s). Here, encryption is an optional step and thus in few instances the QR code may not be encrypted. The application on the first device 102 may then send the user's credentials in the form of the QR code to the second user (i.e., the verifier) via a wireless network such as Bluetooth network. Many guests can do this simultaneously at distance. The application on the second device 104 receives the encrypted QR code (or the QR code directly, if not encrypted) and then scans and decrypts (only when the QR code is in encrypted form) it to read the original information (i.e., the credentials of the first user). The application on the second device 104 may then verify the credentials of the first user. If successful, the application on the second device 104 acknowledges the first user with a random confirmation code which is valid for a short, limited time, say 10-60 seconds, to avoid any fraudulent activities. The code changes every time the credentials are verified again. The first user may then show this code to the second user at an entry point of a restricted arena. The second user may then visually compare this code and if the code matches, then the second user may grant access or entry to the first user. In case the code has expired, the first user can send the code again via Bluetooth and the same verification process will follow as describe above. In case of the first user with invalid credentials, the verification status remains the same (i.e., failed verification) and a failure message indicating failed verification is displayed or presented to the first user. In such a case, the first user may have to perform a manual verification to get an entry.

FIG. 1B is a process flow diagram 100B that illustrates an exemplary process for a security method in accordance with an exemplary embodiment of the disclosure.

At step 110a, a code for executing a transaction corresponding to one or more actions or events is generated. In an embodiment, one or more first programs or applications running on the first device 102 may be configured to generate the code for executing the transaction(s) corresponding to the one or more actions or events. More specifically, the code is generated by a code generation program or application selected from the one or more first applications running on the first device 102. The code may correspond to a Quick Response (QR) code, a bar code, a graphical or visual code, or any other digital code including at least a Near Field Communication (NFC) code, a Bluetooth Low Energy (BLE) code, or a Radio Frequency Identification (RFID) code. The code may include or represent information such as but is not limited to personal information, user credentials, payment information, ticket information, health records, purchase information, parking information, historical event information, future event information, product information, service information, access information, or any other information related to the one or more actions, events, or status. In an embodiment, the code may be a single code, a combination of multiple codes, or multiple sequential codes. In combination of multiple codes, two or more codes (of the same type or different types) may be combined to form a unique code. In multiple sequential codes, two or more codes (of the same type or different types) may be communicated one after the other.

At step 110b, the code is encrypted. In an embodiment, the one or more first programs or applications may be configured to encrypt the code based on at least one or more parameters including at least one of a location, time, or date on the first device 102 at a specific time. The specific time may be a current time or within a specific time duration. The one or more parameters further include personal data of a first user of the first device including at least one of a name, date of birth, universally unique identifier (UUID), device ID, phone number, email ID, other verification ID(s) that ensures identity of the first user by various verification means, nationality and related parameters, event types and related parameters, address, identity numbers such as license number, and duration of visit. The one or more parameters further include company parameters of a first user of the first device including at least one of a company name, company identification numbers, company address, employee ID, event ID, and any other company parameters. The one or more parameters further include various technical parameters including at least one of a signal strength between two devices, one or more random numbers, GPS coordinates of one or more devices including at least one of the first device or the second device, transmission power of the one or more devices, relative signal strength indicator (RSSI) value, sensor data including at least one of temperature, humidity, air quality, or any other data generated by the one or more devices, and security parameters including one or more types of biometrics including at least one of thumb print, facial recognition parameter, or voice parameter. In an embodiment, the code may be encrypted by the one or more first applications based on the one or more encryption algorithms, and the encryption algorithm(s) may change from time to time. Prior to the encryption, the one or more first applications may be configured to choose the one or more parameters and the one or more encryption algorithms for generating the encrypted code. The one or more parameters and the one or more encryption algorithms may be chosen based on one or more predefined rules, as per a program on the first device, as entered by a first user of the first device or taken from the second device before or while generating the encrypted code. Post the encryption, the encrypted code may be valid for a time duration according to a type of the one or more actions or events associated with the transaction. For example, a code related to payment corresponding to purchase of item(s) may be valid for few seconds to few minutes. In another example, a code related to an entry access in a restricted area like airport may be valid for few hours.

At step 110c, the encrypted code is communicated to the second device 104. In an embodiment, the one or more first applications may be configured to communicate the encrypted code the second device 104 over the communication network 108. The communication network 108 may be a wireless communication network or a wired communication network.

At step 110d, the encrypted code is received. In an embodiment, the one or more second applications running on the second device 104 may be configured to receive the encrypted code from the first device 102.

At step 110e, the encrypted code is decrypted. In an embodiment, the one or more second applications may be configured to decrypt the encrypted code to retrieve the information. The information may include at least one of personal information, user credentials, payment information, ticket information, health records, purchase information, parking information, historical event information, future event information, product information, service information, access information, or any other information related to the one or more actions, events, or status. Prior to the decryption, the one or more second applications may be configured to access the same parameter(s) and decryption algorithm(s) that can decrypt the encrypted code set by the encryption algorithm(s). Thereafter, the encrypted code may be decrypted by the one or more second applications based on the accessed parameter(s) and decryption algorithm(s).

At step 110f, the retrieved information is verified. In an embodiment, the one or more second applications may be configured to verify the retrieved information, and then the transaction may be executed based on successful verification of the retrieved information. Without limiting the scope of the present invention, the transaction may correspond to a payment transaction, an access transaction, data or certificate verification-based transaction, parking-based transaction, or the like.

FIG. 1C is a process flow diagram 100C that illustrates another exemplary process for a security method in accordance with an exemplary embodiment of the disclosure.

At step 120*a*, a code is generated or scanned for executing a transaction. In an embodiment, the one or more first applications running on the first device 102 may be configured to generate or scan code for executing the transaction corresponding to the one or more actions or events. The code may correspond to a Quick Response (QR) code, a bar code, a graphical or visual code, or any other digital code including at least a Near Field Communication (NFC) code, a Bluetooth Low Energy (BLE) code, or a Radio Frequency Identification (RFID) code that is scannable by a camera device of the first device 102. In an embodiment, the code may be generated by the code generation program or application from the one or more first applications running on the first device 102, based on the information selected by the first user of the first device 102. The information may include at least one of personal information, user credentials, payment information, ticket information, health records, purchase information, parking information, historical event information, future event information, product information, service information, access information, or any other information related to the one or more actions, events, or status. In an embodiment, the code is a single code, a combination of multiple codes, or multiple sequential codes.

At step 120*b*, the code is communicated to the second device 104. In an embodiment, the one or more first applications may be configured to communicate the code to the second device 104 over the wireless communication network such as a Bluetooth network.

At step 120*c*, the code is received. In an embodiment, the one or more second applications running on the second device 104 may be configured to receive the code from the first device 102 over the wireless communication network.

At step 120*d*, the code is processed. In an embodiment, the one or more second applications may be configured to process the received code.

At step 120*e*, at least the information in the received code is verified. In an embodiment, the one or more second applications may be configured to verify at least the information in the received code, and then the transaction may be executed based on successful verification of the information. In an embodiment, the first user of the first device 102 may then be acknowledged with a random confirmation code when the information is successfully verified. The random confirmation code may be valid for a short, limited time to avoid fraudulent actions. Further, the random confirmation code may change every time the information is verified again. In an exemplary embodiment, the one or more user devices including at least the first device 102 and the one or more verifier devices including at least the second device 104 may display the same random confirmation code simultaneously.

FIG. 2 is a block diagram that illustrates an architecture of a computing system 200 in accordance with an exemplary embodiment of the disclosure. An embodiment of disclosure, or portions thereof, may be implemented as computer readable code on the computer system 200. In one example, the first device 102 or the second device 104 or the server 106 may be implemented as the computer system 200.

The computer system 200 may include a processor 202 that may be a special purpose or a general-purpose processing device and may be configured to perform or execute one or more operations of the first device 102 or the second device 104 or the server 106. The processor 202 may be a single processor, multiple processors, or combinations thereof. The processor 202 may have one or more processor "cores." Further, the processor 202 may be coupled to a communication infrastructure 204, such as a bus, a bridge, a message queue, the communication network 108, multi-core message-passing scheme, and the like. The computer system 200 may further include a main memory 206 and a secondary memory 208 and may be configured to store the one or more parameters, attributes, and/or algorithms. Examples of the main memory 206 may include RAM, ROM, and the like. The secondary memory 208 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media. The computer system 200 may further one or more types of sensors such as global positioning system sensor(s) (GPS to track position, velocity, and timing information), face recognition sensor(s) (such as 3D sensors to capture information about the shape of a face of a user), light detection and ranging sensor(s) (Lidar to determine variable distances), and magnetic reader sensor(s) (such as magnetic stripe reader to read information encoded in a magnetic strip) but should not be construed as limiting to the scope of the present invention The computer system 200 may further include an input/output (I/O) interface or port 210 and a communication interface 212. The I/O port 210 may include various input and output devices that are configured to communicate with the processor 202. Examples of the input devices may include a keyboard, a mouse, a joystick, a touchscreen, a microphone, and the like. Examples of the output devices may include a display screen, a speaker, headphones, and the like. The communication interface 212 may be configured to allow data to be transferred between the computer system 200 and various devices that are communicatively coupled to the computer system 200. Examples of the communication interface 212 may include a modem, a network interface, i.e., an Ethernet card, a communications port, and the like. Data transferred via the communication interface 212 may be signals, such as electronic, electromagnetic, optical, or other signals as will be apparent to a person of ordinary skill in the art. The signals may travel via a communications channel, such as the communication network 108, which may be configured to transmit the signals to the various devices that are communicatively coupled to the computer system 200. Examples of the communication channel may include a wired, wireless, and/or optical medium such as cable, fiber optics, a phone line, a cellular phone link, a radio frequency link, and the like. The main memory 206 and the secondary memory 208 may refer to non-transitory computer readable mediums that may provide data that enables the computer system 200 to implement the methods and processes disclosed herein.

In operation, the first device 102 may be configured to generate a code (such as a QR code, a Bar code, a Graphical or Visual code, an NFC code, a BLE code, a RFID code, or the like, or any combination thereof) for executing one or more requests or transactions corresponding to one or more actions or events. For example, the code may be generated to get an entry into a restricted area, to complete a payment transaction, to access restricted information, to share personal information with other user(s), to download an application from the Internet, to upload files or documents to a restricted cloud server, database, or a website, to purchase a ticket, and to perform other applications without limiting the scope of the present invention. In an embodiment, a first user of the first device 102 may utilize a code generation program or application running on the first device 102 to generate the code. The code may be a single code, a combination of multiple codes, or multiple sequential codes. In some examples, the code may be generated by combining multiple types of codes, for example, a QR code may be combined with a Bar code to generate the unique code. The code may represent or include information related to the first user of the first device 102. The information may include at least personal information, payment information, historical event information, future event information, or any other information related to the first user. In an embodiment, the first device 102 may be further configured to encrypt the code. The encrypted code may be valid for a predefined time duration according to a type of the one or more actions or events associated with the transaction. Prior to the encryption, the first device 102 may choose or select one or more parameters and one or more encryption algorithms for generating the encrypted code. The parameters and encryption algorithms may be chosen based on one or more predefined rules, as per a program on the first device 102, as entered by the first user of the first device 102 or taken from the second device 104 before or while generating the encrypted code. The encryption algorithm(s) may change from time to time.

In an embodiment, the code may be encrypted by the first device 102 by using the one or more encryption algorithms based on the one or more parameters including at least a current location, time, and date on the first device 102. Here, at least one parameter from the one or more parameters may be varying with respect to time. The one or more parameters may further include at least one of personal data of the first user including at least one of a name, date of birth, universally unique identifier (UUID), device ID, phone number, email ID, other verification ID(s) that ensures identity of the first user by various verification means, nationality and related parameters, event types and related parameters, address, identity numbers such as license number, and duration of visit. The one or more parameters may further include company parameters of the first user including at least one of a company name, company identification numbers, company address, employee ID, event ID, and any other company parameters. The one or more parameters may further include one or more technical parameters including at least one of a signal strength between two devices, one or more random numbers, GPS coordinates of one or more devices including at least one of the first device 102 or the second device 104, transmission power of the one or more devices, relative signal strength indicator (RSSI) value, sensor data including at least one of temperature, humidity, air quality, or any other data generated by the one or more devices, and security parameters including one or more types of biometrics including at least one of thumb print, facial recognition parameter, or voice parameter. After generating or retrieving the code and then encrypting the code, the first device 102 may be configured to communicate the encrypted code to the second device 104 over the wired or wireless communication network 108.

In an embodiment, the second device 104 may be configured to receive the encrypted code from the first device 102 or scan the encrypted code. Thereafter, the second device 104 may be further configured to decrypt the encrypted code to retrieve the information related to the first user. The second device 104 may be further configured to access the same parameters and respective one or more decryption algorithms that can decrypt the encrypted code set by the one or more encryption algorithms. The encrypted code is then decrypted by the second device 104 by using the one or more decryption algorithms. A person having ordinary skills in the art would understand that the first device 102 may use any encryption algorithm known in the art (such as one or more encryption algorithms or techniques based on Advanced Encryption Standard (AES), Triple Data Encryption Standard (3DES), Twofish, or the like) to encrypt the code and should not be construed as limiting to the scope of the present invention. Similarly, the second device 104 may use any known decryption algorithms to decrypt the encrypted code and should not be construed as limiting to the scope of the present invention. Post the decryption of the encrypted code, the second device 104 may be configured to verify the retrieved information. The second device 104 may perform comparison and validation to verify the retrieved information. In an embodiment, the request or transaction may be executed based on successful verification of the information. For example, the first user may be allowed to enter a restricted area (such as an airport) once the information (such as certificate indicating successful vaccination) of the first user is successfully verified by the second device 104. In another example, the first user may complete a payment transaction (such as at a shop or restaurant) once the information (such as payment information) of the first user is successfully verified by the second device 104. In another example, the first user may enter a restricted area (such as a zoo) once the information (such as purchased ticket information) of the first user is successfully verified by the second device 104 (such as a beacon system). In this application, the first user may connect the first device 102 to a zoo beacon. Once connected, the first device 102 will fetch information such as zoo entry rate. Using the application or program running on the first device 102, the first user may select a count of users (who want to go to the zoo), validate the total amount based on the count, and make the payment. In another scenario, the first user may already have zoo tickets. In such instances, the first user uses the zoo beacon system for scanning the ticket QR codes. Once the codes are verified by the beacon system of the zoo, the first user may get an entry into the zoo. Other applications may include standalone access such as parking meter device with LED, Solar, BLE, and payment happening via mobile phone. QR code adjacent to the device may be used for the payment purpose. The parking meters can work standalone where the first user can use the first device 102 such as a smartphone to pay for the parking.

FIG. 3 is a process flow diagram that illustrates an exemplary process 300 for generating a code by a computing or processing device such as the first device 102 in accordance with an exemplary embodiment of the disclosure.

At step 302, the code generating program or application is launched. In an embodiment, the first device 102 may be utilized by the first user to launch the code generating program or application. During such launch, the first device 102 may or may not be connected to the Internet.

At step 304, the one or more parameters to dynamically generate the code are defined or chosen. In an embodiment, the code generating program or application launched and running on the first device 102 may be utilized by the first user to define or choose the one or more parameters to dynamically generate the code. The one or more parameters may be defined or chosen based on one or more predefined rules, as per a program on the first device 102, as entered by the first user of the first device 102 or taken from the second device 104 before or while generating the encrypted code.

The one or more parameters may include at least the current location, time, and date on the first device 102. The one or more parameters may further include at least one of the personal data of the first user including at least one of a name, date of birth, universally unique identifier (UUID), device ID, phone number, email ID, other verification ID(s) that ensures identity of the first user by various verification means, nationality and related parameters, event types and related parameters, address, identity numbers such as license number, and duration of visit. The one or more parameters may further include the company parameters of the first user including at least one of a company name, company identification numbers, company address, employee ID, event ID, and any other company parameters. The one or more parameters may further include the technical parameters including at least one of a signal strength between two devices, one or more random numbers, GPS coordinates of one or more devices including at least one of the first device 102 or the second device 104, transmission power of the one or more devices, relative signal strength indicator (RSSI) value, sensor data including at least one of temperature, humidity, air quality, or any other data generated by the one or more devices, and security parameters including one or more types of biometrics including at least one of thumb print, facial recognition parameter, or voice parameter. With respect to RSSI value, if two or more devices are paired with each other, they will have RSSI values and only these paired devices will know their respective RSSI value. Thus, if the devices are paired, then the RSSI value can be used to encrypt the code or decrypt the encrypted code.

At step 306, one or more algorithms are chosen for generating the code. In an embodiment, the code generating program or application launched and running on the first device 102 may be utilized by the first user to choose the one or more algorithms for generating the code.

At step 308, code is generated. In an embodiment, the code generating program or application launched and running on the first device 102 may be configured to generate the code based on at least one of the one or more parameters and the one or more algorithms.

Figure 4:
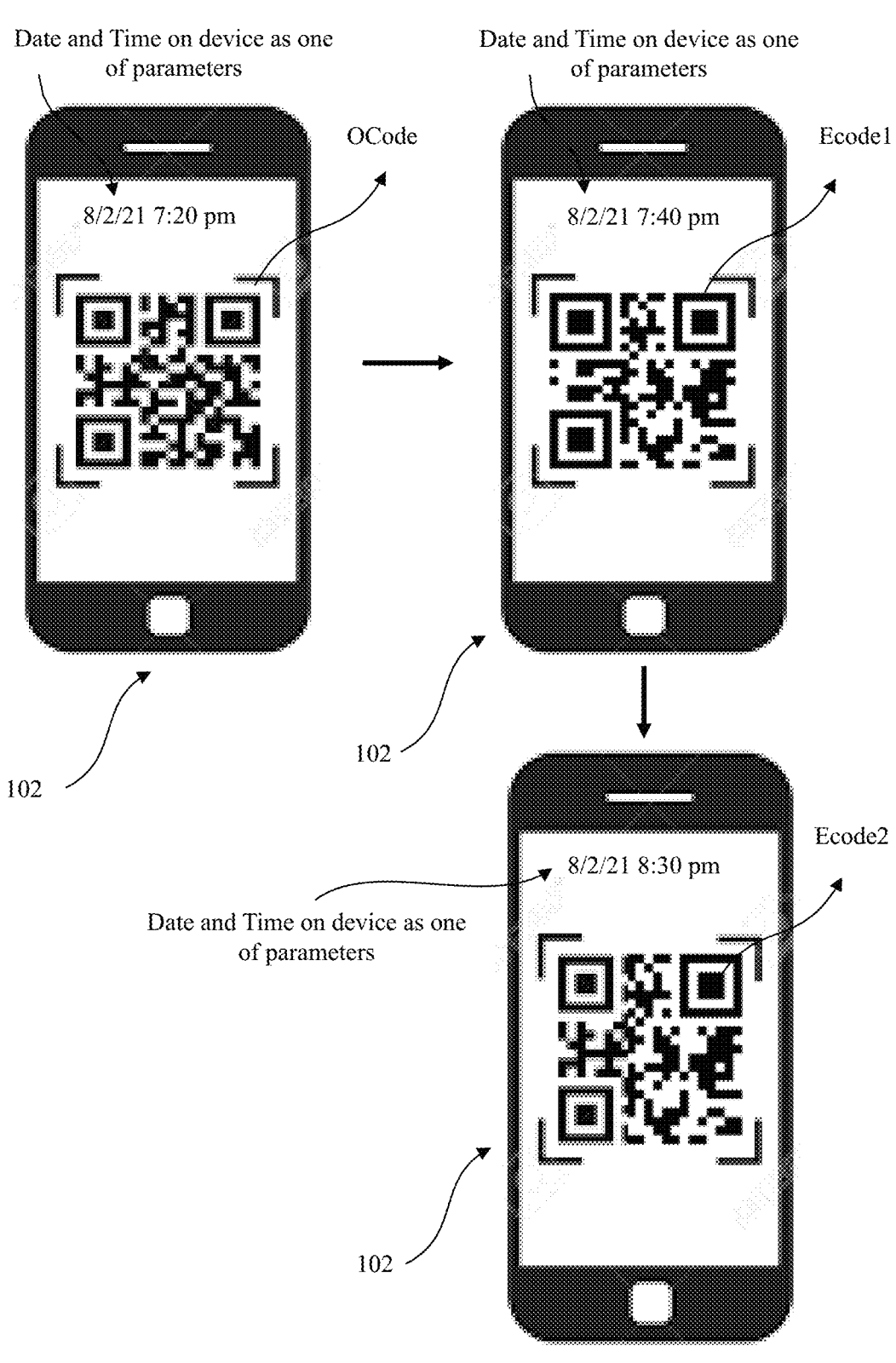
FIG. 4 is a diagram that illustrates a code generation program or application for generating a code with respect to a vaccination access in accordance with an exemplary embodiment of the disclosure.

FIG. 4 is a diagram that illustrates the code generation program or application for generating a code with respect to a vaccination access in accordance with an exemplary embodiment of the disclosure. In an embodiment, the first user is given a code that resides in the first device 102 such as a smart card, a smart phone, or the like. This code may represent the information related to the first user's vaccination, which may be important for the first user for getting an access to a restricted facility such as an airport, a sports arena, or the like. The information may include an indication of whether the first user's vaccination is complete or incomplete, or the first dose of the vaccination is complete and the second dose of the vaccination date is not yet passed, or any test results, personal information such as driving license, social security number, geographic limitation for the access, date of birth, name, a residential address, a vaccine address (where the vaccination was taken), a type of vaccination, a vaccination validity period or date, any new actions to be taken, reminder times, and any other relevant information or data related to the first user. In an embodiment, the code may be represented as a QR code, a bar code, a graphical or visual code, or any other digital code such as an NFC code, a BLE code, or the like, which can be scanned or read by the receiver device (such as the second device 104). The second device 104 may be configured to decrypt the code by using its processor with the one or more decryption algorithms or via other computing device (such as the server 106) com-municatively coupled to the second device 104. In some cases, the second device 104 may just do a specific check such as a check sum or extract specific parameters to confirm the validity of the code or understand the information or data required for the action to be taken, such as allowing the first user to enter the restricted facility. This code that is given to the first user has been referred to as an "Original Code" or "OCode".

The first device 102 where the code is represented may use at least one of the parameters or algorithms and modify the code locally. Thus, the new code changed using one or more parameters and/or algorithms may be referred to as an "Enhanced Code" or "ECode".

The one or more parameters and/or algorithms chosen for generating the ECode may be predefined, chosen as per the program on the first device 102, entered by the first user or other personnel, or taken from other electronic devices such as the second device 104 before or while generating the ECode. The algorithms may be chosen based on an ID given to each algorithm or it can be chosen randomly or in some predefined sequence.

The ECode may be generated on the first (transmitter) and/or second (receiver) device independently. The one or more parameters and/or algorithms may be exchanged to generate the ECode by transmitter and receiver devices (i.e., the first and second devices 102 and 104) before or while generating the ECode. Note that the parameters/algorithms may be stored on receiver device, transmitter device, or other communicably coupled devices such as an external memory (wireless or wired) such as cloud server and only specific IDs (Identification numbers) of specific parameters and/or algorithms may be exchanged, that in turn, can be used to run the encryption and decryption process at those devices.

Figure 5:
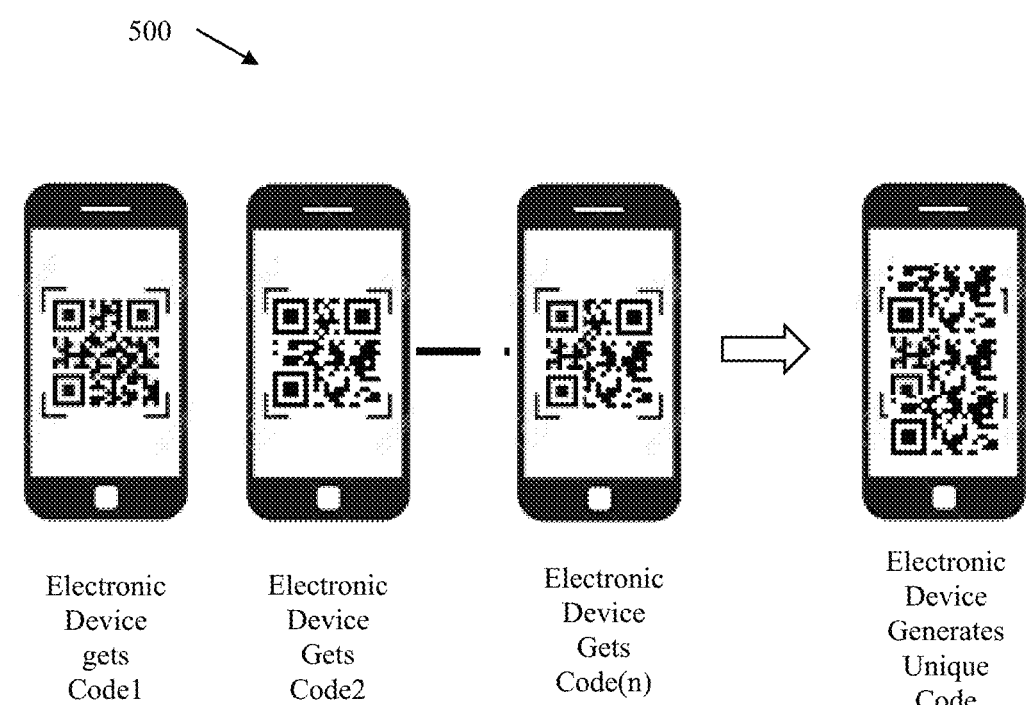
FIG. 5 is a diagram that illustrates the code generation program or application for combining two or more codes of the same type to generate a unique code in accordance with an exemplary embodiment of the disclosure.

FIG. 5 is a diagram 500 that illustrates the code generation program or application for combining two or more codes of the same type to generate a unique code in accordance with an exemplary embodiment of the disclosure. For simplicity of the ongoing discussion, the same application i.e., the verification or access or travel or vaccination passport or card (as discussed above in FIG. 4) will be considered here as well to describe the solution to generate the unique code by combining two or more codes. With vaccination records or infection testing results, various solutions to use a digital coding system such as QR codes may be used. However, there could be various types of coding system with various entities coming up with different QR code system, wherein, generation of the QR code may be dependent upon different methods such as encryption methods, algorithms, inputs, and data. This means, a QR code technique or solution placed for the travel industry may be different from the healthcare industry in the same jurisdiction, which may be different in different jurisdictions globally. For a user, it means, he/she needs to maintain various QR codes which in turn represent say access passports or card, for each different type of venue or entity. However, by virtue of the present invention, the disclosed application may be configured to scan or read such codes (ECodes, OCodes) and then combine the relevant data and generate a new Code that can act as OCode which in turn, can generate ECode as explained previously. As shown in FIG. 5, two or more codes (Code1, Code2, . . . , Code(n)) of the same type may be combined to generate the unique code. Note that the new code may be generated with the one or more parameters, attributes, algorithms including encryption, cryptographic algorithms. The unique code may be acceptable by various entities or venues for giving the access to the first user and this is possible as the second device 104 or the application (running on the second device 104) only can decrypt and extract the required information or perform checksum, CRC (Cyclic Redundancy Check) type of verification. Furthermore, the unique code may be used as OCode to generate ECodes (such as ECode1 and ECode2) as explained previously for access, verification, and other secured communication and data transfer applications.

While the device or application reading/scanning the codes is getting the specific codes, it can be verified by contacting the verifying system such as the cloud server which can confirm the validity of the code with respect to a specific user. The device or application getting the codes can also verify the user with respect to the code by asking verification question including, but are not limited to, name, date of birth, vaccination type, date when the vaccination was taken in case of vaccination application, etc. Email verification, text verification, biometric verification, or verification by authorized personnel or entity can also be performed to ensure the user and the code are matching for the verification purposes.

Figure 6:
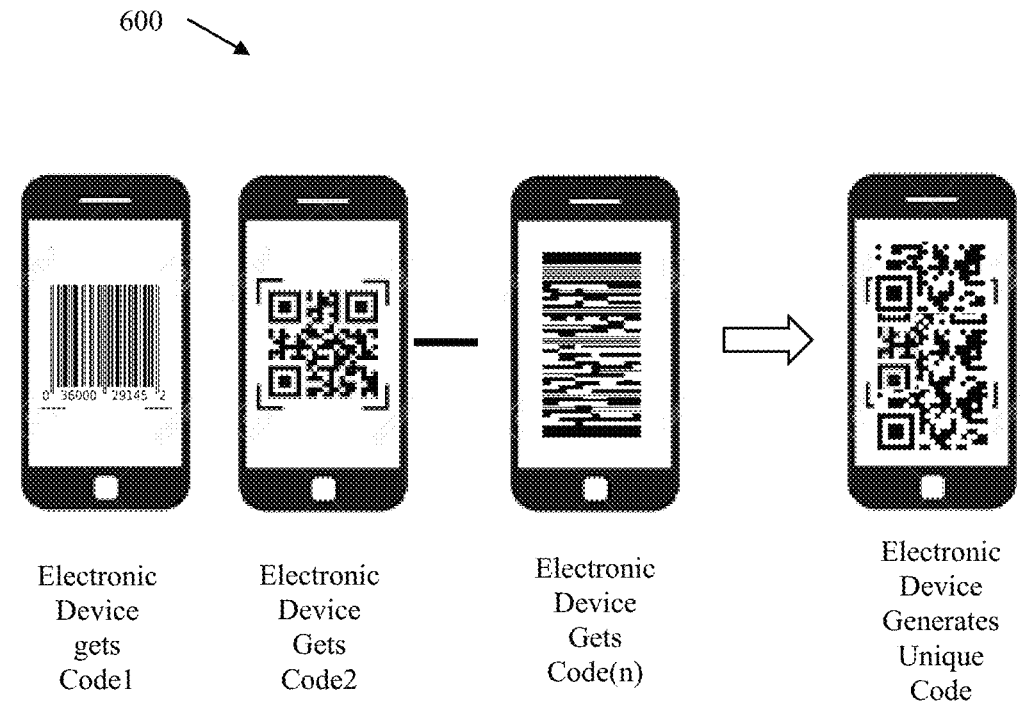
FIG. 6 is a diagram that illustrates the code generation program or application for combining two or more codes of different types to generate a unique code in accordance with an exemplary embodiment of the disclosure.

FIG. 6 is a diagram 600 that illustrates the code generation program or application for combining two or more codes of different types to generate a unique code in accordance with an exemplary embodiment of the disclosure. In This embodiment, two or more codes (Code1, Code2, . . . , Code(n)) of different types may be combined to generate the unique code. Note that the new code may be generated with the one or more parameters, attributes, algorithms including encryption, cryptographic algorithms. The unique code may be acceptable by various entities or venues for giving the access to the first user and this is possible as the second device 104 or the application (running on the second device 104) only can decrypt and extract the required information.

In an exemplary scenario, an individual visit a store to buy a mobile device. The individual likes the mobile device and scans an associated code (such as a bar or QR code including device information) of the mobile device. This code is then combined with another code (including individual's details and payment information) to generate a unique code. The unique may be generated with the one or more static and/or dynamic parameters, attributes, algorithms including encryption, cryptographic algorithms. This unique code may then be processed by a store owner to complete the checkout of the mobile device. The store may receive this unique code, decrypt it to retrieve the original code, validate it, and then process it to complete the transaction.

Figure 7:
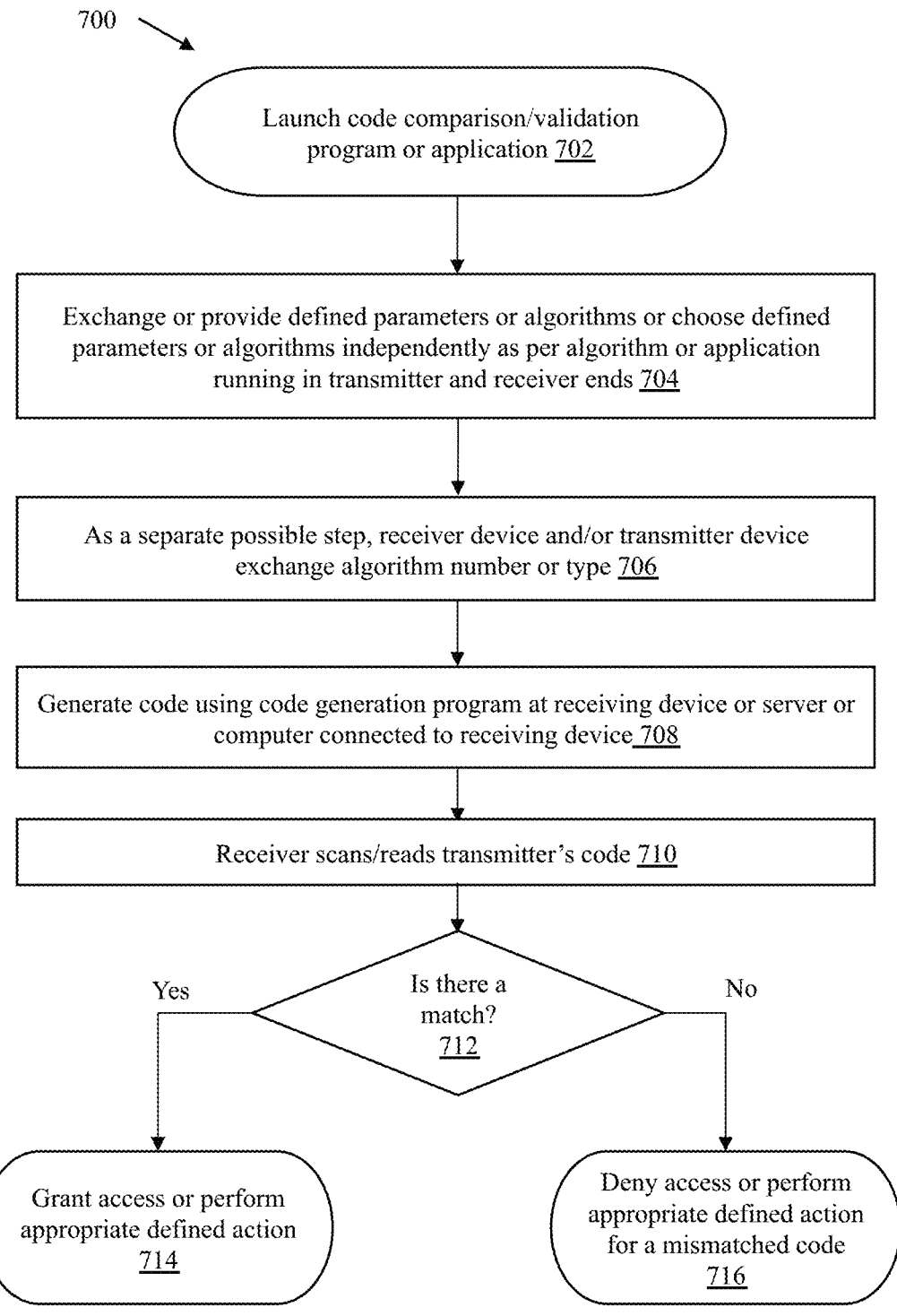
FIG. 7 is a process flow diagram that illustrates code comparison and validation with a code generation program or application on a receiver device in accordance with an exemplary embodiment of the disclosure.

FIG. 7 is a process flow diagram 700 that illustrates the code comparison and validation on the receiver device such as the second device 104 in accordance with an exemplary embodiment of the disclosure.

At step 702, the code comparison and validation program or application is launched. In an embodiment, the second device 104 may be configured to launch the code comparison and validation program or application.

At step 704, the defined parameters or algorithms are exchanged or provided, or the defined parameters or algorithms are chosen independently as per algorithm or application running in the transmitter and receiver ends i.e., the first and second devices 102 and 104. In an embodiment, the defined parameters or algorithms are exchanged (i.e., the transmitter and receiver exchange the parameters or algorithms) or provided (i.e., the transmitter provides to the receiver, or the receiver provides to the transmitter). Alternatively, the defined parameters or algorithms are chosen independently as per the algorithm or application running in the transmitter and receiver ends, or the transmitter and receiver gains the parameters and/or algorithms from device itself or from one or more other devices communicably coupled to the transmitter and receiver.

At step 706, as a separate possible step, the first (receiver) device 102 and/or the second (transmitter) device 104 exchange an algorithm identifier (e.g., algorithm number, type, etc.).

At step 708, the code is generated. In an embodiment, the code may be generated using the code generation program at the second device 104 or the server 106 or any other computer connected to second device 104.

At step 710, the receiver (i.e., the second device 104) scan and reads the transmitter's (i.e., the first device's 102) code.

At step 712, a check is performed to determine whether there is a match or not. In an embodiment, the second device 104 (i.e., the receiver) may be configured to perform the check. If, at 812, a match is determined, then step 814 is executed, else step 816 is executed.

At step 714, the access is granted to the first user, or an appropriate defined action is performed or executed.

At step 716, the access is denied to the first user, or an appropriate defined action for a mismatched code is performed or executed.

In an exemplary scenario, when the first user generates the ECode on the first device 102, the second device 104 scans and reads ECode or the part of the ECode. The second device 104 may then compare the received ECode with the ECode it generated by itself or with the help of other connected devices and take the predefined action such as access grant or deny access based on an outcome of the comparison. In an embodiment, the second device 104 after receiving the ECode may also extract the required information or the data set from the received ECode required for the comparison with the information or data set it has itself or on the other connected devices such as the cloud server 106. The extraction or comparison of such information or data set may be based upon the one or more parameters/algorithms used at the first and second devices 102 and 104 described previously.

In an embodiment, the codes, OCodes, ECodes can be shown in any form such as a QR code, bar code, numbers, characters, digital bits, any images including colorful images, personnel image, or any other form or representation, or any combination thereof. The images may have user's picture, name, or other personal information as part of the code. Such image makes it easier for the scanning personnel to verify the identity of the code with the person having such code. The codes, OCodes, ECodes can also be wired signals such as, but are not limited to, UART, SPI, I2C, Serial, ETHERNET protocols or wireless protocols such as, but are not limited to, Bluetooth, NFC, Wi-Fi, RF, SMS, Cellular, ZigBee, ZWave, Li-Fi, Digital Voice, or the like.

In an embodiment, the attributes for which the code is valid may be defined by a user, application, parameters, algorithms, or authorized entity. An example of an attribute is a duration for which the generated code is valid, for example, an ECode generated in a vaccination application running on the smartphone may be valid only for 1 minute and any previous ECodes will be deemed invalid. The one or more attributes may include, but are not limited to, a specific time, specific date, duration, location, zip code, UUID, Mac ID, email, phone number, other verification code, local temperature, humidity and the likes, geofencing area, country, state, county, city, type of venue, network the device is connected to, person using the device, biometrics inputs, passkeys, application the code is being used for, personnel specific such as but not limited to age, ethnicity, type of vaccination taken in case of vaccination application, personnel behavior such as he is wearing a mask or not in case of vaccination application, how long the device was active, last time the device was unlocked or biometrics used, employment related attributes such as employer, or the like. The attributes are also changeable by the user, authorized agency such as CDC if it is managing the vaccination application in that case, authorized private or public entities, or the like. The ECodes may be considered invalid, expired, or older version for other analysis in case any of the attributes are not met or failed the comparison per the specification of that application.

In an embodiment, to validate the codes such as ECode generated by first device 102 and received or scanned by the second device 104, firstly, the second device 104 may decrypt the received or scanned code such as the ECode. The second device 104 may access the same parameters and/or respective decryption algorithm(s) that are able to decrypt the code set by encryption algorithm(s). This is possible while setting the software or application on the first and/or second devices 102 and 104, the parameters and/or algorithms are set or selected. The second device 104 may give itself access to the parameters/algorithms when communicating with the first device 102. The parameters/algorithms may change based on the parameters/algorithms running at specific times, or they can be sequential or programmed. Further, the second device 104 reads or scans the code (OCode/ECode) and decrypts it. The second device 104 uses the decrypted code for the comparison of the message, information, or data from the received code and proceeds with the action defined as per the outcome of the comparison. The second device 104 reads or scans the code (OCode/ECode) for specific dataset or information in the code for verification or verify one or more other parameters extracted from the code including but are not limited to checksum, signature, hash, CRC, checking specific data at specific locations in the message and take an action based on the outcome of such verification.

Figure 8:
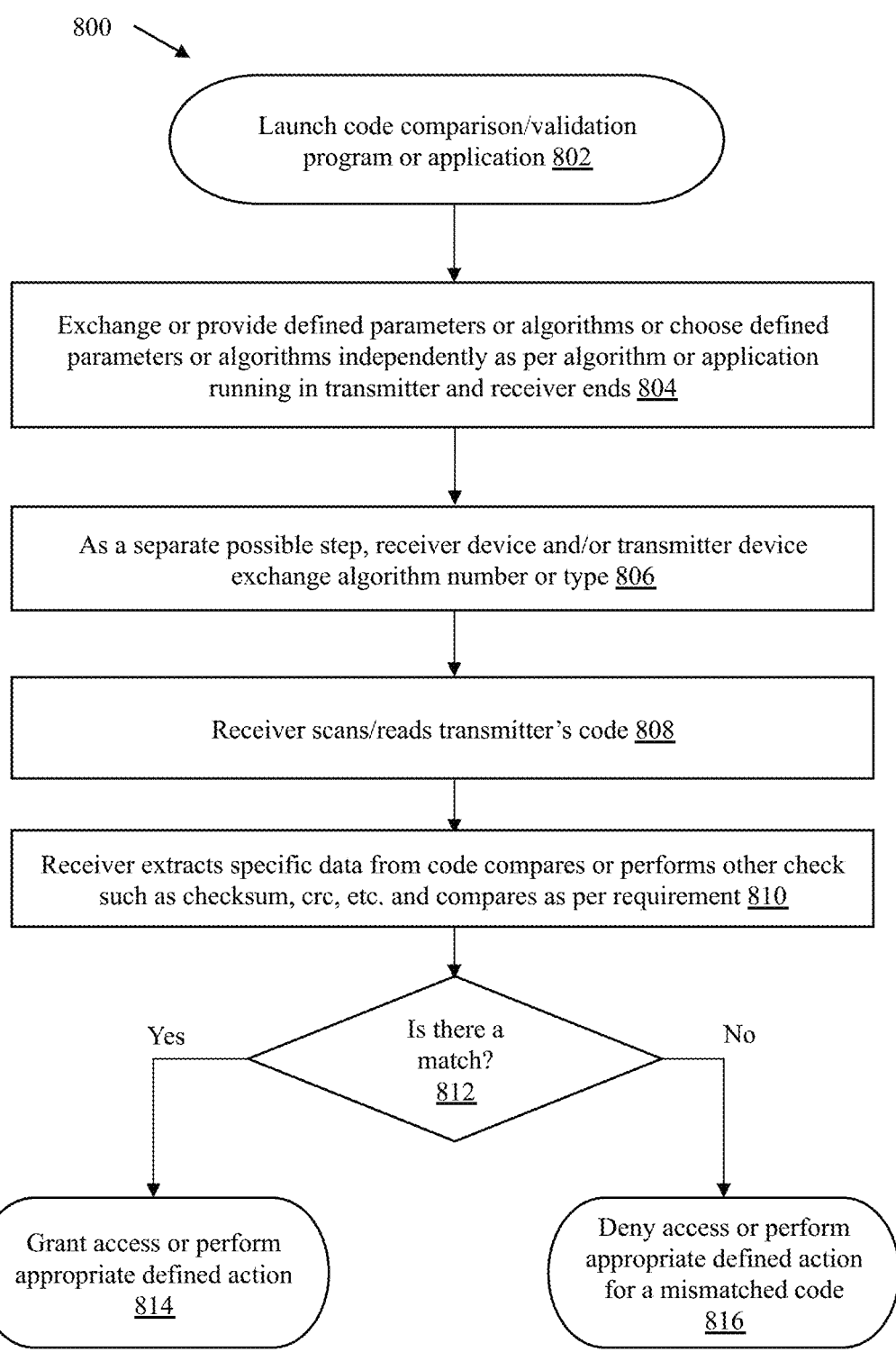
FIG. 8 is a process flow diagram that illustrates code comparison and validation on the receiver device in accordance with another exemplary embodiment of the disclosure.

FIG. 8 is a process flow diagram 800 that illustrates code the comparison and validation on the receiver device such as the second device 104 in accordance with another exemplary embodiment of the disclosure.

At step 802, the code comparison and validation program or application is launched. In an embodiment, the second device 104 may be configured to launch the code comparison and validation program or application.

At step 804, the defined parameters or algorithms are exchanged or provided, or the defined parameters or algorithms are chosen independently as per algorithm or application running in the transmitter and receiver ends i.e., the first and second devices 102 and 104. In an embodiment, the defined parameters or algorithms are exchanged (i.e., the transmitter and receiver exchange the parameters or algorithms) or provided (i.e., the transmitter provides to the receiver, or the receiver provides to the transmitter). Alternatively, the defined parameters or algorithms are chosen independently as per the algorithm or application running in the transmitter and receiver ends, or the transmitter and receiver gains the parameters and/or algorithms from device itself or from one or more other devices communicably coupled to the transmitter and receiver.

At step 806, as a separate possible step, the first (receiver) device 102 and/or the second (transmitter) device 104 exchange an algorithm identifier (e.g., algorithm number, type, etc.).

At step 808, the receiver (i.e., the second device 104) scan and reads the transmitter's (i.e., the first device's 102) code.

At step 810, the receiver (i.e., the second device 104) extracts specific data from the code and compares or performs other check such as checksum, CRC, etc. and compares as per requirement.

At step 812, a check is performed to determine whether there is a match or not. In an embodiment, the second device 104 (i.e., the receiver) may be configured to perform the check. If, at 912, a match is determined, then step 914 is executed, else step 916 is executed.

At step 814, the access is granted to the first user, or an appropriate defined action is performed or executed.

At step 816, the access is denied to the first user, or an appropriate defined action for a mismatched code is performed or executed.

FIG. 9 is a process flow diagram 900 that illustrates the code comparison and validation without the receiver device such as the second device 104 in accordance with an exemplary embodiment of the disclosure. In many cases, the second device 104 may not have the computation capabilities, or the need for very simple check or verification is required such as personnel at an entry point doing a visual check of the code or a specific part of it or an outcome of the code shown in various visual parameters displayed on the first device 102 itself, and then take an action based on the visual check. To have such visual verification, the first device 102 such as the smartphone should be capable of generating and verifying such codes locally i.e., on the same device. More importantly, the verifier should be able to verify it without having device's owner fraudulently or mistakenly have verifier verify the code. The fraudulent activities can happen in many ways such as: (1) The user/owner copies such as by taking a screenshot of the code to be verified and showing it to the verifier to get an access, especially a static code such a QR code or the bar code. (2) The user/owner replicates the potential dynamic codes or enhanced codes or continuously changing codes on the display screen say that of the smartphone such as but not limited to a video, GIF, changing picture, animation, changing text or figures or colors, or the like, or any combination thereof. The various ways how such transmitter device-based verification while preventing the fraudulent activities will now be explained below. This is possible with the help of some computation methods and/or processes on the transmitter and with the help of the one or more attributes.

The process flow diagram 900 will now be described in detail as below:

At step 902, the code comparison and validation program or application is launched.

At step 904, the parameters and/or algorithms is gotten on the first device 102 running the application such as the smartphone or any other digital device.

At step 906, the code such as ECode is generated in one or more formats on first device 102 such as the smartphone or any other digital device.

At step 908, the personnel checks code or identification indicator is received.

At step 910, a check is performed to determine whether the code/indication meet the criteria. If, at 910, it is determined that the code/indication meet the criteria, then step 912 is executed, else step 914 is executed.

At step 912, the access is granted to the first user, or an appropriate defined action is performed or executed.

At step 914, the access is denied to the first user, or an appropriate defined action for a mismatched code is performed or executed.

In an embodiment, the first device (transmitter) 102 may be configured to read the code (OCode/ECode) and confirm the validity of the read code (such as not invalid, not expired, or someone else's code) locally. In an exemplary embodiment, this confirmation may be achieved by communicating the cloud server (such as the server 106) owned by trustworthy entities or agencies such as an authorized central server or a government agency, and then changing the code (OCode or ECode). In another exemplary embodiment, this confirmation may be achieved by comparing the validity of the code with respect to the one or more attributes as explained above, and then displaying or transmitting only the valid code in specific ways as defined and not showing/transmitting or showing/transmitting error message if the code is invalid. This valid code is accessible by the first device 102 only. The comparison process may include extracting the data from the code and comparing the extracted data with the set specifications derived from the one or more attributes for the validity. In one example, if the first vaccination dose is valid only for 30 days and it was taken on Jan. 10, 2021, then the validity ends on Feb. 10, 2021. The date on the device can be read and compared on the local device such as the smartphone where the code is stored or accessed. In another example, if the ECode was generated and its validity attribute is one minute, then the comparison of the time when it was generated with the current time on the device can confirm if the code is valid or not. The time when it was generated may be extracted from the ECode itself by performing decryption or reading specific data within the ECode. In another exemplary embodiment, this confirmation may be achieved by having a receiver or other device (such as the second device 104) that can communicate with the first device 102 (i.e., the transmitter) and then providing it the one or more parameters which in case the code is valid, makes the first device 102 show a specific message, image, animation, current time, changing parameter, code, or any combination thereof. In case, the first device 102 has other ways of indication such as, but are not limited to, LED, sound, vibration, or the like, it will use such indicators to indicate the validity or related information. If the code is invalid, then it is reflected in the displayed code or indication. In another exemplary embodiment, this confirmation may be achieved by showing a picture or other personal information of the first user having the code as some part of the overall code on the display of the first or second device 102 or 104 so that the receiver personnel can see and confirm the identity of the first user with respect to the code. In another exemplary embodiment, this confirmation may be achieved by another parameter that is when the first device 102 was last operated by reviewing activity related to unlocking of the first device such as the smartphone that may have been unlocked with biometrics or passkey security applications.

In an embodiment, the first device 102 may be feed with one or more messages or data such as the user's name or other parameters so that the first device 102 shows or indicates specific indication in accordance with such messages, data, or parameters. This may be accomplished by the application running on the first device 102 that can use the one or more parameters such as current time, current location, zip code, network it is connected to, sensors it has, or the like, and the pass on such parameters to the first device 102.

Thus, the offline verifications, transactions, exchange, communication, and storage of data is very much possible with the above solution where the first device 102 (i.e., the transmitter) and the second device 104 (i.e., the receiver) has the application(s) running and no network connection or third device is required.

In an embodiment, sensors, such as an accelerometer sensor, light sensor, proximity sensor, magnetic field sensor, or the like, in the first device 102 (such as the smartphone) may be used to generate the code(s). Device access security programs such as face recognition, fingerprint recognition, other biometrics programs, passcode, based on which it is possible to determine when the last time was for using any of such programs on the first device 102 and this may be used to confirm that the first device 102 is owned by the individual and the code (ECode, OCode) is active or valid or invalid or expired, or any other status as applicable. For example, if the application showing the code will show the invalid message on the display in case the first device 102 or the application on the first device 102 was not unlocked or was idle for specific duration such as more than 2 minutes. The application running on the first device 102 can also go into a mode such as an idle mode based on a specific parameter reaching some threshold such as a duration the application was running, a time since when the accelerometer reached its threshold value, a time since the biometrics program was used, or the like. Such mode may be used to ensure that the application showing the code such as OCode or ECode is running.

Figure 10:
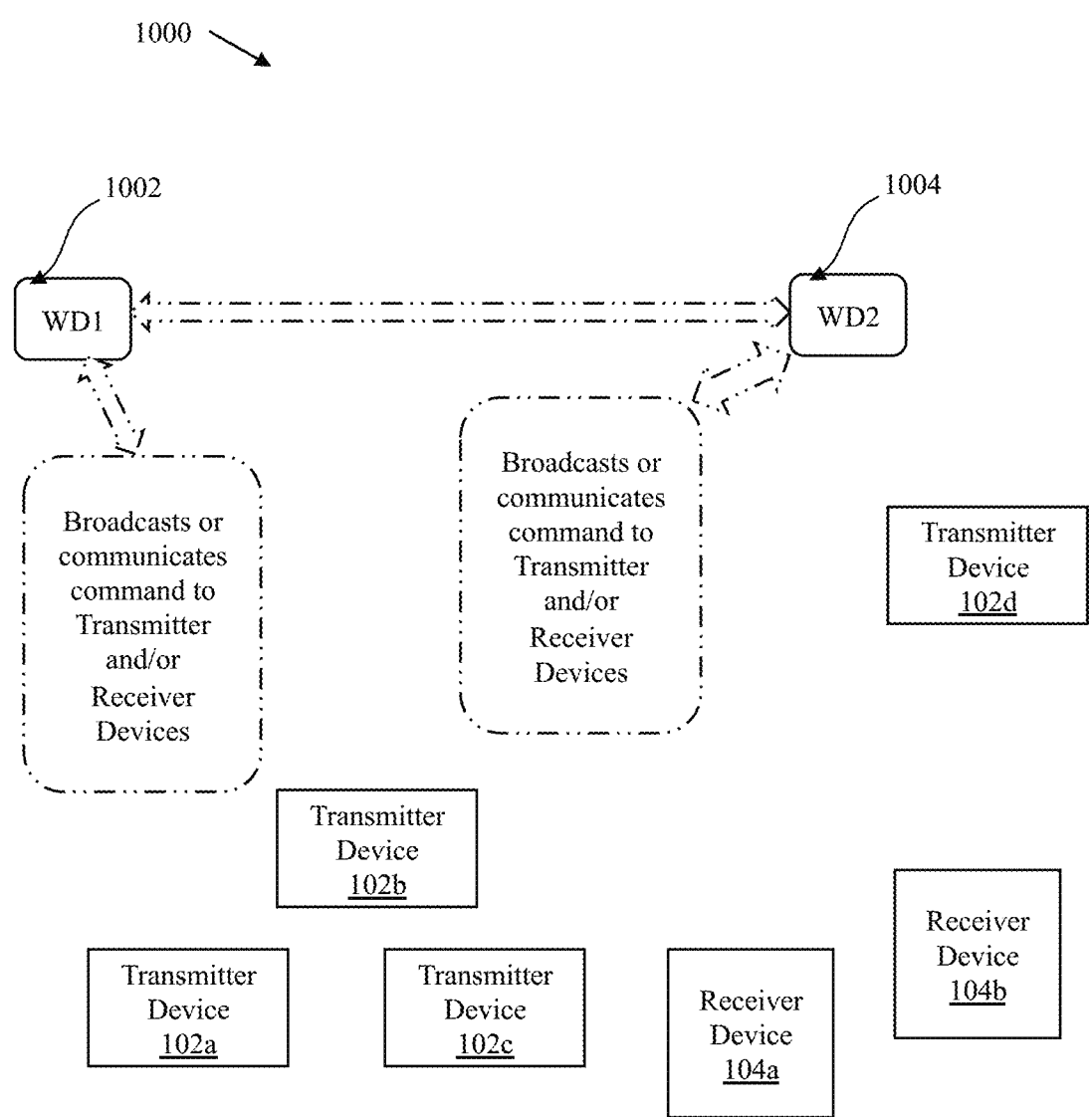
FIG. 10 is a block diagram that illustrates a system environment in which devices are in communication via broadcast or a network topology in accordance with an exemplary embodiment of the disclosure.

FIG. 10 is a block diagram that illustrates a system environment 1000 in which devices are in communication via a broadcast or a network topology in accordance with an exemplary embodiment of the disclosure. The system environment 1000 includes one or more wireless devices (WD1 and WD2 as shown by 1002 and 1004, respectively), one or more transmitter devices (as shown by 102*a*, 102*b*, 102*c*, and 102*d*), and one or more receiver devices (104*a* and 104*b*). The wireless devices 1002 and 1004 may be configured to broadcast or communicate commands or messages to at least one of the one or more transmitter devices (as shown by 102*a*, 102*b*, 102*c*, and 102*d*), and the one or more receiver devices (104*a* and 104*b*). In an embodiment, the one or more wireless devices (WD1 and WD2 as shown by 1002 and 1004, respectively) such as, but are not limited to, BLE or Wi-Fi device(s) at a venue may broadcast a message or a command that makes the device(s) (such as on the smartphone, beacon, other digital device (DD) (like the transmitter devices shown by 102*a*, 102*b*, 102*c*, and 102*d*) on which the code is to be scanned or read) automatically displays or indicates a specific message, animation, a code such as GREEN QR Code, PASS, ACCEPT, INVALID, VALID, FAIL, or other such messages, or any LED or sound indicators, animation showing status such as pass or active, or other dynamically changing codes, picture, etc. based on the code status on the device such as validated, verified, or unverified. Such mechanisms may help the receiver device (s) (such as the devices shown by 104*a* and 104*b*) read multiple devices simultaneously such as but are not limited to visually, via NFC, BLE, etc. and the personnel can also do just a visual check/reading the display for verification than reading/scanning with any receiver device or even having any internet access. The message transmitter device 102*a*, 102*b*, 102*c*, or 102*d* would be showing can be changed via the receiver's application or the application that controls the wireless device's broadcast message command. Only the receiver device 104*a* or 104*b* or the personnel verifying the transmitter's display would know what message the transmitting device 102*a*, 102*b*, 102*c*, or 102*d* should show. In case of no device with the user, a beacon or transmitter device such as a beacon that has a LED(s), LCD display, or the like, or any DD for indicating various situations such as PASS with green blinking light, not allowed with red light, or the like can be used, different situations can be shown with different indications, effects, messages displayed or colors.

In an embodiment, the WD1 1002 and WD2 1004 may be connected to the external memory or computation device including a server on a local or remote network (such as the server 106). The WD1 1002 and WD2 1004 may get commands or data to be broadcasted or communicated or attributes to be used for such commands or data. One or more of the WDs, transmitters, receivers, including DDs, or the like, may assist in command or data communication with rebroadcasts, acknowledgements, any networked communication, etc.

Methods discussed above can also be used for encrypted/cryptographic communication between the two devices. The encryption and decryption computation may happen on the transmitter and receiver devices (102a-102d and 104a-104b) locally using the one or more parameters and/or the one or more algorithms. Such computation may also be a part of the edge computing or communicable coupled device such as the server 106 (shown in FIG. 1A) or other computation device but should not be construed as limiting to the scope of the present invention. The encryption and decryption parameters and/or algorithms may be selected or keep changing based on the current or the set or the previous parameters and/or algorithms. The parameters and algorithms can also be exchanged between the transmitter and receiver devices (102a-102d and 104a-104b) as and when required such as before transmitting the codes, messages, or data. Such parameters and/or algorithms may be used for encryption and decryption for the data being exchanged.

Figure 11:
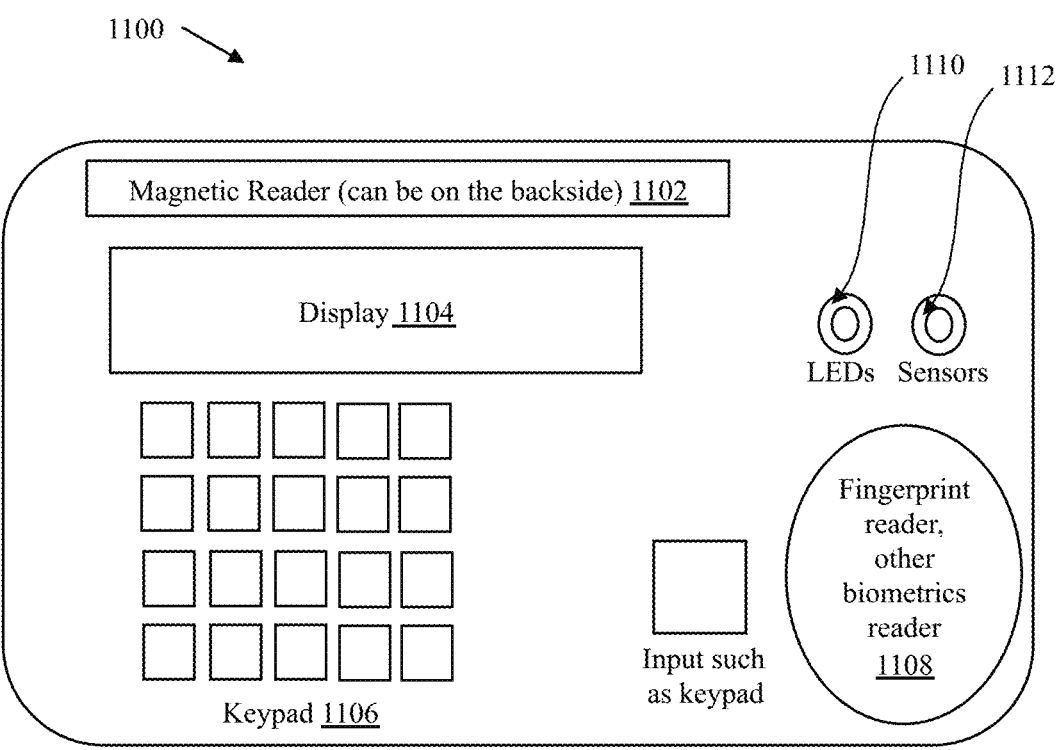
FIG. 11 is a block diagram that illustrates a front side of a digital device (DD) card in accordance with an exemplary embodiment of the disclosure.

FIG. 11 is a block diagram that illustrates a front side of a digital device (DD) card 1100 in accordance with an exemplary embodiment of the disclosure. The DD card 1100 may be configured as a mobile wallet local cash or payment system that uses the similar technology as in ECode generation and verification. The DD card 1100 may include a magnetic reader 1102. Though the magnetic reader 1102 has been shown on the front side of the DD card 1100, it may be located on the back side of the DD card 1100. The DD card 1100 may further include a display 1104, a keypad 1106, a fingerprint or other biometric reader 1108, LED(s) 1110, and sensor(s) 1112.

FIG. 12 is a block diagram that illustrates the electronics of the DD card 1100 in accordance with an exemplary embodiment of the disclosure. Here, the DD card 1100 may include one or more processors 1114 with wired or wireless communication such as, but are not limited to, NFC, BLE, or the like. The DD card 1100 may further include backup memories 1116 along with other processors or peripherals 1118. The DD card 1100 may further include keypad, LEDs, and other peripherals connection 1120. The DD card 1100 may further include one or more of a replaceable or fixed Battery, super cap, charging circuitry powering all circuitry 1122. The DD card 1100 may further include fingerprint reader and other biometrics reader processors 1124. The DD card 1100 may further include one or more sensors 1126 such as real-time clock (RTC used to track the current date and time), global positioning system (GPS to track position, velocity, and timing information), face recognition (such as 3D sensors to capture information about the shape of a face of a user), light detection and ranging (Lidar to determine variable distances), magnetic reader (such as magnetic stripe reader to read information encoded in a magnetic strip), and other sensors but should not be construed as limiting to the scope of the present invention. The DD card 1100 may further include one or more connectors such as a connector 1128.

The hardware-based encryption, decryption including cryptography or other related protocols technique with respect to the parameters such as time and/or date and/or algorithms will now specifically be discussed. The digital device (DD) 1100 may have one or more of but should not be considered as limiting to the scope of the present invention:

1. electrical connectors including but are not limited to USB connector, magnetic connector for easy fit (can be with electrical connection), or any other connector that is known in the art,
2. one or more buttons, keypad including but are not limited to touch keypad, resistive keypad, capacitive keypad, or the like, or any other keypad that is known in the art,
3. one or more LED indicators,
4. one or more memories including backup one or more memories (removable or affixed),
5. one or more security sensors including biometric sensor such as fingerprint sensor, face recognition sensor, touch sensor, voice sensor, etc., passkey, LIDAR, 3D, etc.,
6. antenna for wireless communication,
7. one or more displays such as LCD display, LED display, paper display, or any other display that is known in the art,
8. batteries (rechargeable or non-rechargeable, replaceable),
9. super capacitors,
10. solar panels or solar stickers for charging,
11. charging circuit,
12. one or more sensors such as light, vibration, 3D sensing sensor, microphone, camera, or any other sensor that is known in the art,
13. integrated circuits including but not limited to such as for NFC, microcontrollers, microprocessors, crypto controllers, Bluetooth, Wi-Fi, other RF protocols ICs, cellular ICs, serial communication ICs, USB communication, encryption ICs, ethernet communication, internet communication, RTC (real time clock), GPS sensing, accelerometer sensing, temperature sensing, any other wireless or wired communication protocol, etc., and
14. memory ICs including but are not limited, to RAM, ROM, Flash, or any other memory that is known in the art.

In an embodiment, the DD card 1100 may be in any form such as but are not limited to a rectangular, circular, oval, flexible, non-flexible, or bendable card, or other device such as a beacon, wearable, smartphone, smartwatch, computer, tablet, gateway, router, power supply, television, or the like. In some embodiment, the DD card 1100 can also be implemented as a transmitter or receiver device as explained above with the previous applications.

Generally, the financial system used for the payment and money transactions is expensive with credit cards, or other payment services charging few percentages of the transaction value, essentially increasing the price for the consumer. However, if the cash currency is used, there will be no such few percentage points deducted from any part performing the transactions. The way cash and banking system works can easily be adopted digitally as explained below in detail:

1. An individual, say the first user, has a digital device (DD), say the DD card 1100 or the first device 102, with the one or more encryption/decryption capabilities including as explained above.

2. The DD can get cash currency in it via suitable bank transactions such as using online tools, cloud server, or machines such as or equivalent to ATM (automated teller machine), financial transaction equipment, or other similar machines, in person visits to exchange physical cash or legal tender, or goods against Digital Cash (DC). In other words, the DD gets the digital cash (DC) in it as a physical wallet would get physical cash in it. The first user's "account" such as a bank account or account with other authorized organization that is allowed to transfer the actual cash via any device, or other monetary valuables such as but are not limited to digital coins, crypto currencies, digital points, tokens, or the like, to the DD in terms of DC can be used to transfer the DC to the DD. As the first user spends or transfers the DC to other DDs, an equivalent amount from the account would get subtracted with the amount spent or transfer, similarly, the DC will increase in the DD as the DD gets the DC from accounts or other DDs.

3. The first user can also transfer the DC from the DD to the accounts via the Internet, other authorized and communicably coupled device communication, applications on the computing device such as the smartphone, or other communication methods explained above.

4. Each DC transaction between DDs and/or accounts can be stored in the respective DDs. The stored transaction records can be downloaded to the computer, smartphone, external memory (wireless or wired) such as the could server, accounts, or another secured device.

5. The DC transfer and transaction records can be communicated via wired or wireless protocol in real time or as per the limitations or requirements.

6. Biometrics on DD such as face recognition, passkeys, or other input mechanism for security purposes can be used to authorize the transactions.

7. The encryption/decryption techniques as explained in this invention or codes such as ECodes, OCodes can be used for any transaction authorization or the data transfer among the DDs and Banks.

8. Edge computing i.e., computing at the device level including encryption/decryption, Code, OCode, ECode generation may also be used.

9. Same or similar techniques of using Codes (ECode, OCode, etc.) for authorization, verification, information transmission, or data transmission between receiver and transmitter devices, as explained earlier, may be used for any data transmission including related to the actual DC transfers or transactions, transaction records or related data or information among one or more DDs and/or accounts. This way the transactions are highly secured as codes which can also have keys for encryption/decryption are dynamically or regularly changing with respect to the one or more parameters and/or algorithms.

10. This way, the transactions may be executed securely and without any Internet or network communication. All the transactions and the DC balance at a particular time remains only on the DD. The data can be synced or transferred to one or more servers or other memory or networking devices as per the first user's wish or requirements.

11. One or more accesses may be provided using various authorization, encryption, decryption mechanisms for various reasons:

a. Limiting an amount of DC allowed for one or more transactions. This may include, but are not limited to, daily limit, maximum limit, and tiered limits with tiered authorization or approval requirements.
b. Limiting number of transactions.
c. Limiting transactions to specific one or more DDs or Accounts.
d. Various people for e.g., family members, employees can have various limits, accesses for the same DD being used among multiple people.
e. Master device access vs other ordinary devices access.

In case, an owner of the DD is unable to access or incapable of accessing or not willing to access or use the DD, there needs to be a way to get the amount available in the DD to the first user's account or other authorized DD, or to the account the legal system or authorized agencies may allow. The below solution can be applied to solve it.

1. Authorized personnel or organizations can transfer the DC amount in DD to corresponding Account or the authorized financial account where such DC can be stored via other DDs with some network connectivity. The transfer can happen only to owners authorized Accounts.

2. The owner of the DD can be assigned his/her DD to one or more secondary owners.
a. In this case, the DD of the secondary owner may have the capabilities to exchange the transaction records, or other related data, or DC or a combination thereof.
b. The parameters or assigned access can be changed by the owner at his DD or via the application that can communicate to DD or by communicating with the secondary owner's DD.

The owner of the DD can have a will to another person or entity for his/her DD. In this case, the organization managing the Account or authorized organizations can transfer the DD via their special transfer solution. The analogy is if the physical wallet with physical cash is left by an owner, it is transferred to the person on owner's will.

In instances when the DD may get lost or inaccessible for any reason including failure, damage, connectivity, or the like, the below mechanism may be used to restore the DD or the information/data stored in it, and use it as required.

1. The DD may have one or more backups (data/information backup or copied and stored)
a. Such backups may be internal secondary memory units or processing units or a combination thereof which can be accessed by its owner by
i. Same secured way of accessing the DD such as by using the passkey, biometrics secured login, pattern, or the like, or any combination thereof, or
ii. Setting another way of accessing the DD with different passkey or biometrics secured login, pattern, or the like, or any combination thereof, or
iii. Accessing by a secondary owner's DD as explained above with respect to the primary owner, or
iv. Accessing by the bank or financial institution or their DD or transaction devices as authorized by the DD owner or as per the policies set in various jurisdictions or by banks or financial institutions or governments.
b. Secondary backup as a separate device altogether that replicate/copies all or part of the information or data from the primary DD c. Such backup may also be part of the secondary owner's DD or another device capable of storing such backup.

d. Any authorized personnel or entity can connect the DD to a device with an application that allows DD's transaction and DC transfer to the DD's account in a one way. The DD when communicably connected to such device, would initiate such one-way transfer after recognizing the connection with such device. The recognition may confirm a specific connection to the account via a networked communication such as the Internet.

2. The DD whenever connected to the Internet may store such data/information, or the like on the server storage connected to the Internet or a local network. The server storage space may be provided by the bank, financial institution, third parties, or the user can himself create such server space.

3. Notifications by the account (account management organization) may be sent to the DD's owner or authorized personnel about any transaction that are recorded by the account. Such notifications may be sent to the DD's owner via email, text, or other similar standard notification services that are available in the art.

Figure 13:
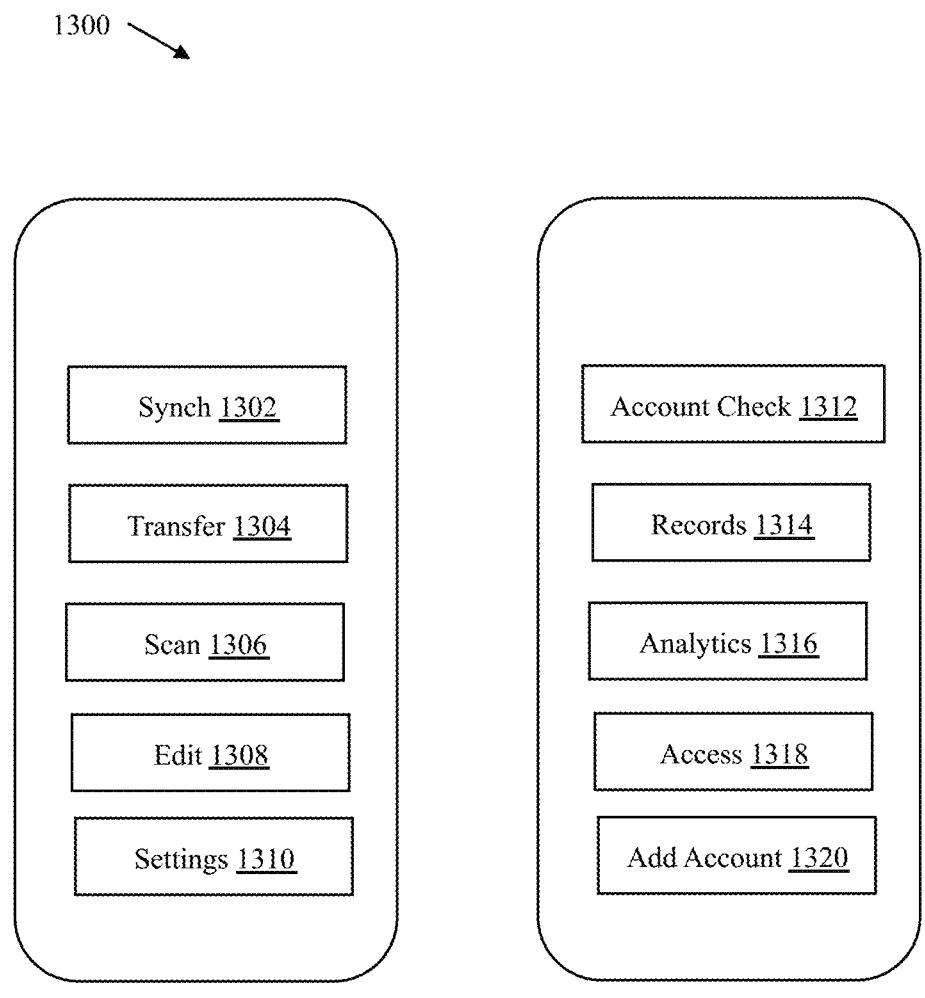
FIG. 13 is a block diagram that illustrates user interface options on a DD application in accordance with an exemplary embodiment of the disclosure.

FIG. 13 is a block diagram that illustrates user interface options on a DD application 1300 in accordance with an exemplary embodiment of the disclosure. The DD application 1300 may include various functionality options such as a synch option 1302, a transfer option 1304, a scan option 1306, an edit option 1308, a settings option 1310, an account check option 1312, a records option 1314, an analytics options 1316, an access option 1318, and an add account option 1320.

In an embodiment, the synch option 1302 may allow a user to synch account or data. Any changes or updates made by the user (or an admin) in an offline mode may be automatically synched to the account or data when the DD (such as the first device 102 or the DD card 1100) is online i.e., connected over the Internet to a service providing server such as the server 106 shown in FIG. 1A. The synch option 1302 may be triggered, either manually or automatically, to synch transaction records and amounts with accounts, MDs, and other authorized entities systems.

In an embodiment, the transfer option 1304 may allow the user to transfer funds from one account to another account. Such transfer may be processed in an offline or online manner. In case of offline transfer, a buyer may use a buyer device (such as the first device 102 or the DD card 1100 that is connected to a seller device via Bluetooth beacon) to open an application and then initiate a fund transfer transaction. This transaction request is communicated to the seller device over the Bluetooth beacon. The seller may validate the details and then acknowledge the transaction request if satisfied, else may reject the transaction request. Here, although there has been initiation and acknowledgement of the transaction request between the buyer and seller devices, the actual transfer of funds from the buyer's account to the seller's account has not been completed since at least one of the buyer device and the seller device was operating in the offline mode (i.e., no Internet connectivity). However, both the devices may store the recorded transaction request. When the devices are online (i.e., connected to the Internet), then the actual transfer of funds may take place based on the recorded transaction request. In one example, say, the buyer device was offline, and the seller device was online at the time of initiating the transaction request. In that case, after the acknowledgement, when the buyer device is online, based on the recorded transaction request, the device application may process the fund transfer. Thus, an amount (according to the recorded transaction request) may be debited from the buyer's account and may then be credited to the seller's account if the seller device is also online. In another example, say, the buyer device was online, and the seller device was offline at the time of initiating the transaction request. In that case, an amount (according to the recorded transaction request) may be debited from the buyer's account but is not credited to the seller's account until the seller device is online. However, without limiting the scope of the present invention, it may so happen that the debit from the buyer's account and the credit to the seller's account will only occur when both the devices are online together.

In an embodiment, the scan option 1306 may allow the user to scan one or more types of codes (such as a QR code, a bar code, a graphical or visual code, an NFC code, a BLE code, or an RFID code). When the scan option 1302 is selected, the DD (such as the first device 102 or the DD card 1100) may enable its image-capturing unit (such as a camera) to scan the code, for example, from the seller's device or a standalone code plate available at the seller's place.

In an embodiment, the edit option 1308 may allow the user to edit one or more types of information such as address, contact details, or the like.

In an embodiment, the settings option 1310 may allow the user to customize the DD application according to his/her preferences. For example, the user may change the theme or font or language without limiting the scope of the present invention.

In an embodiment, the account check option 1312 may allow the user to check the account balance. The user may further utilize the account check option 1312 to check recent transaction details including at least one of pending transactions or completed transactions.

In an embodiment, the records option 1314 may allow the user to see one or more transaction records including at least one of pending transaction records or completed transaction records.

In an embodiment, the analytics option 1316 may allow the user to analyze the spends on a daily, weekly, monthly, or yearly timeframe basis. The user may also review the fund transfer to/from the user's account.

In an embodiment, the access option 1318 may allow the user to transfer access of his/her account to other(s) (such as one or more relative or friends). The user may also set a limit to use his/her account by other(s).

In an embodiment, the add account option 1320 may allow the user to add two or more accounts from the same or different financial institutions. The two or more accounts may of the same type or different types, for example, saving account, current account, business account, or the like.

For executing or processing any type of transactions or requests, the DD may be used by the user to scan one or more types of codes and accordingly read information from the scanned code(s) such as the ECodes and OCodes. There are many ways of generating these codes. In an exemplary embodiment, let's consider a billing system where an invoice is generated. In this case, when a bill or invoice is generated, a code may be generated by an invoice generator's DD. The generated code may include individual items and their quantities, rates, and prices, taxes, a total amount to be paid in the form of DC, other parameters, attributes, algorithm numbers, or any combination thereof. The DD of a payer may scan or read such code and confirm if the DD reads it successfully or not. In case not successful, the payer may try again. The payer's DD may now generate a code which can have an actual payment authorization based on the read information, or a payment decline for reasons including insufficient funds, wrong billing or payment information, decryption error, invalid code, or the like. Thereafter, the DD of the invoice generator may read the payer's code. The DD of the invoice generator may then generate a code that can be an acknowledgement of the payment received or decline for reasons such as mentioned above. The DD applications on the invoice generator's DD and the payer's DD may be configured to generate the code(s) irrespective of whether the DDs are connected to the Internet or not i.e., the code(s) may be generated in the offline mode as well as in the online mode. There could be multiple communications between the DDs until the entire data is communicated, consensus is reached and accepted and until the transaction is complete. The communication may be with a direct communication link between the devices such as via BLE or Wi-Fi established link between the two devices or via a one side communication at a time such as with the use of the code communication, it is also known as full duplex or half duplex communication. After successful completion of such transaction, the DC amount may change in both the DDs. The codes may have all the information related to the bill, payer, invoice generator, transaction type, transaction code such as donation, payment for food, service, material, duties, taxes, gate or entry passes, or the like, and any other necessary data required by the law of land. The codes can also have information about the goods or service purchased, specific breakdown of the payments, item numbers or IDs, item types, or the like. The codes may also have information about the payer and the invoice generator such as tax ID, address, any license, name, contact details, or the like.

In an embodiment, the DDs can also separate and put the amount collected in different internal sub-accounts such as a tax account, a tip account, an earning account, or other fees-related account(s). The sub-accounts may be created for various reasons and may have various processes. In one example, the sub-accounts may be created for different types of spending such as food, travel, goods, or the like. In this case, each transaction may be assigned to such types by having a specific identification (ID) for each type. In another example, the sub-accounts may be created for different users who may use the same DD and may have different way to gain access to it, for example, by using passkey(s), biometric (s), pattern(s), or the like, or any combination thereof. The owner may have the ability to delete, edit, change types, or change access of such sub accounts by using the various functionality options as discussed above in conjunction with FIG. 13. In an embodiment, the sub-accounts may also have their own internal backups or external memory such as cloud server backups. Similarly, any DC transaction between two or more DDs and/or accounts may take place using similar one or more processes explained above.

A person having ordinary skills in the art would understand that the DD or account may initiate the transfer so that the other DD or account may see the amount to be transferred and accept or deny such transfer. The receiving DD may also receive the parameters and/or algorithms for various purposes including encryption, decryption. The parameters and/or algorithms may be selected by the user, by using predefined rules, or randomly selected as well.

In an embodiment, the disclosed system can record every transaction that can be consolidated by another DD, server owned by a DD owner, or an authorized third party. The identification of the owner or organization can be anonymous and/or encrypted ID and only the authorized organization such as government revenue services (e.g., IRS in the USA) or a bank can relate to the personal or organizational identification. The anonymous or encrypted ID may also keep changing with a specific one or more parameters and/or algorithms and only the authorized server or computation device can be shared with such parameters and/or algorithms for decrypting and relating the identification with the personal or organizational identification. In an embodiment, the transaction records may be useful to take out the illegal or black money or corruption out of the system. While it may help the users to use actual cash in the digital form helping in multiple ways including not having to pay any percentage fees to the banks or money transfer providers. In addition, the edge computing at the device level with the parameters and/or algorithms for encryption and/or decryption involvement can make it secured, decentralized, and truly local and digital cash transaction without requiring any Internet or network access or server to store various transactions all the time. Any user does not have to necessarily carry cash in a wallet which can be limited amount, limited changes in currency such as dollar bills, quarters, etc., susceptible for losing the physical value, and unnecessary weight to carry around, not to mention the amount of time transaction parties would take to exchange physical cash/currency and then deposit it to the banking system later. With the proposed solution, the digital cash may be withdrawn and deposited to the banking system or the digital safe as and when required by the users. Smart devices such as smartphones, smartwatches, smartcards, or others with biometrics security and communication channels such as NFC, BLE, Wi-Fi, or Cellular network can also be used without any issues. In an embodiment, any DC transactions or data/messages transfer between the transmitter and receiver devices including the DDs can happen via a wireless mesh networking or wired and wireless networking topologies and technologies as discussed above. The exposure notification system (ENS) where each user's ID can be anonymous and encrypted and which can also change regularly may be used. Furthermore, the one or more attributes may be used to change such ENS based IDs.

In an exemplary embodiment, the DC may be used by the users as a common currency for buying or selling one or more products or services. The DC may also be used in a way where the users or entities can purchase or trade one or more quantities of DC(s) with a local currency or any valuable including but not limited to Gold, Silver, cryptocurrency, or the like. For the sake of simplicity, such common currency may be referred to as a Global Common Currency (GCC). All processes, solutions, and applications as explained above with respect to the DC, DD, account, transactions among DDs, communication among DDs may remain same for use and application of the GCC. The only key difference here is that each country or jurisdiction may have a way to purchase the GCC (DC but for global stage) based on the exchange rates of the respective national currencies or based on the price of various valuables and load it into his/her DD or account as per the processes above. The user in any country/jurisdiction with the GCC may now freely purchase goods, services, and transact with other users and entities. Furthermore, because such transactions may be recorded by the respective jurisdictions banking or financial system, it helps to mitigate the risks of money laundering, illegal financial transactions, corruption, or other illegal activities. It can truly be a global currency with all the benefits of local currencies, security, fraud and corruption prevention, privacy protection, fast transactions including international transactions, without banking fee's structure, and other benefits. It may also help bring more customers to the banking system which can lead to the betterment of economies around the world.

In an exemplary embodiment, the DD may be used as a cash wallet (i.e., a digital wallet) that may or may not be connected to the Internet. A buyer may open the application on his/her DD when he/she is buying items at a shop. By using the application, the buyer may see the shop ID among other shop IDs in the same location. The buyer may select the shop from where he/she is buying the items based on the shop ID and request the shopkeeper for a secured communication channel via the application. The shopkeeper sees that the buyer's device has requested for the communication and accordingly establishes the communication via Bluetooth beacon. Post the establishment of the communication channel between the DDs of the buyer and the shopkeeper, the shopkeeper may enter an amount corresponding to the purchased items by the buyer. The buyer sees the amount and complete the transaction, and the shopkeeper receives an acknowledgement of the same. In case the buyer's DD or the shopkeeper's DD is not connected to the Internet, the actual fund transfer may not happen at the same time (i.e., at the time of transaction completion by the buyer or acknowledgement reception by the shopkeeper). However, irrespective of this, the transaction records are stored by the DDs' application and the actual fund transfer is executed when the offline DD is finally connected to the Internet.

In another exemplary embodiment, the DD may be used by a user to send multiple codes (such as 2 or more QR codes) together to a verifier device associated with a verifier via the wireless network. The DD may also be used to first combine the multiple QR codes to generate a group QR code by the DD application running. Thereafter, the DD application may send the group QR code to the verifier device via the wireless network for verification. After receiving the multiple QR codes or the group QR code, the verifier device may scan the group QR code or the multiple QR codes, one after the other. The verifier device verifies the group QR code(s) and allows the users associated with the group QR code or the multiple QR codes to enter a restricted area requiring entry ticket, such a movie theater.

Figure 14:
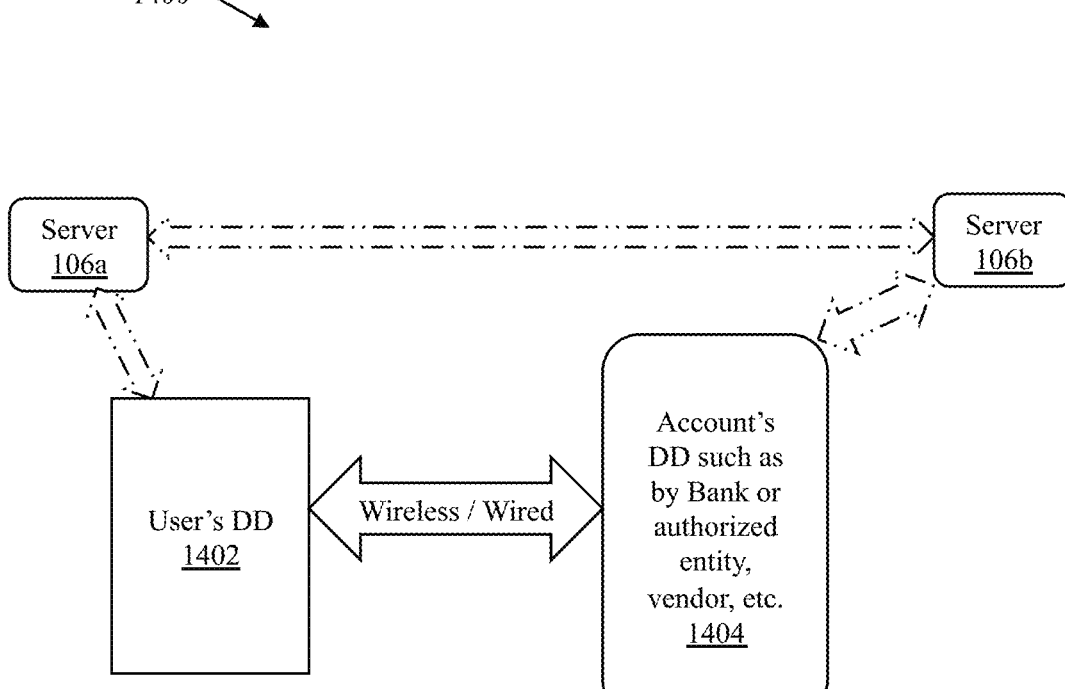
FIG. 14 is a block diagram that illustrates synching between the DD(s), account(s), and server(s) in accordance with an exemplary embodiment of the disclosure.

FIG. 14 is a block diagram 1400 that illustrates synching between the DD(s) 1402, account(s) 1404, and server(s) 106a and 106b in accordance with an exemplary embodiment of the disclosure. In an exemplary embodiment, for DC and GCC transactions, the synching with the one or more authorized servers (such as the server 106a and 106b) with respect to the accounts (such as the account 1404), especially for financial authorities of jurisdictions, revenue/tax services, might be required. Further, it can be mandated that any users or entities must synch the transactions with the server(s) 106a and 106b after every specific time duration to ensure the legality of the transactions and the DC/GCC amounts in their DDs 1402 or accounts 1404. If the transactions are not synched in the specific time duration, then the user may get penalized by the jurisdictions or sent a notice to do so within a defined time. The server(s) 106a and 106b may be owned by the financial/tax authority of the jurisdiction, banking systems, or other authorize entities systems. Furthermore, as the other parties synch the transactions and the DC/GCC amounts which are automatically linked to the jurisdiction's financial authorities, the transactions of the user who is having transactions with other parties automatically get notified to jurisdictions financial authorities. The applications on the DDs such as running smartphone could automatically synch transaction records and amounts with accounts, MDs, and other authorized entities systems. Furthermore, the Blockchain technology may be used for securing and storing the transactions records. Blockchain technology can be used in association with the encryption/decryption/ENS technology as explained above for some or all the transactions based on the importance of such transactions and accounts.

Secured Storage System Using DD Encryption/Decryption Techniques:

In an embodiment, the user's digital device (i.e., the DD 102, 1100, or 1402) may be capable of performing various other functionalities such as in smartphones, smartwatches, smartcards, computers, cameras, sensors, other computing, or communication devices, and it can store the data/messages on the memory communicably coupled to the DD (Memory Device (MD)) including but not limited to the external memory such as cloud server, flash drive, etc. with encryption technology explained above based on the one or more parameters and/or algorithms. Each file may include, but is not limited to, pictures, videos, documents, texts, or any other format-based files, which can be encrypted with the specific one or more parameters and algorithms that only the computational device communicably coupled to, or part of the external memory can decrypt. In such case, the encryption/decryption parameters and algorithms may be shared among one or more DDs, MDs. The user may define the parameters and/or algorithms as per the requirement. The parameters and/or algorithms may also automatically change as per the application running into the DDs or previous algorithms.

In an embodiment, the MD may be connected directly or indirectly to the network device including but are not limited to a router, computational device, other DD, other MD, or the like. This allows the user to have its own storage system or device instead of relying on other storage service providers such as Cloud service providers. The backups of such MDs may be taken on additional internal memory units (physical or internal partitions) of MD or other MD or DD, including backups as explained above. The MD may have various partitions such as for family, friends, other members, individual or group wise, which can be configured by the user, or anyone authorized by the user with various tiered access rights.

In an embodiment, the DD and MD may store the files with or without encryption process as explained above with respect to Codes, ECodes, and OCodes but may use the one or more parameters and/or algorithms-based encryption/decryption process as explained above to establish the communication. Such established communication may be valid only for a specific time or at specific times. Such established communication may be valid only for specific files or applications running on MDs or DDs. Such established communication may allow the file transfer between those devices. The MD and DD may be accessed based on security protocols as stated above including but not limited to such as biometrics, passkeys, patterns, or the like. The communication between one or more DDs and MDs can be established via local network protocols such as but not limited to LAN, BLE, NFC, or the like, or via remote network protocols such as Internet protocols, cellular, Wi-Fi, other wireless protocols, or various wired protocols such as via Ethernet, Serial ports, etc. Examples presented herein for the local network protocols and the remote network protocols are for illustrative purpose only and should be construed as limiting to the scope of the present invention.

With the above, only one or more DDs, MDs authorized by the user can communicate and access files from each other. The MD can act as a hardware secured non network connected decrypt whatever on your cloud server, it can be on your own cloud server instead of global one. Because the decryption parameters and algorithms are created by the user and change in real time and they are unique, only work for you based on your personal and account information and stay only on your phone.

In addition to the above applications and their related transactions, other transactions may include but are not limited to:

1. Ticket purchase at a venue such as a stadium, event, zoo, etc.
2. Checking in or a ticket verification at a venue such as stadium, event, zoo, etc.
3. Purchasing items at a venue such buying food in a stadium
4. Giving access to health records to a doctor in a hospital
5. Making payments or using vouchers at venues such as a shopping mall, restaurants, bus stations, etc.
6. At distance parking meters and similar devices requirements payment, management, control, commissioning aspects, without requiring the cellular networks.

To perform various applications stated above, various processes and solutions are involved which will be described below.

Figure 15:
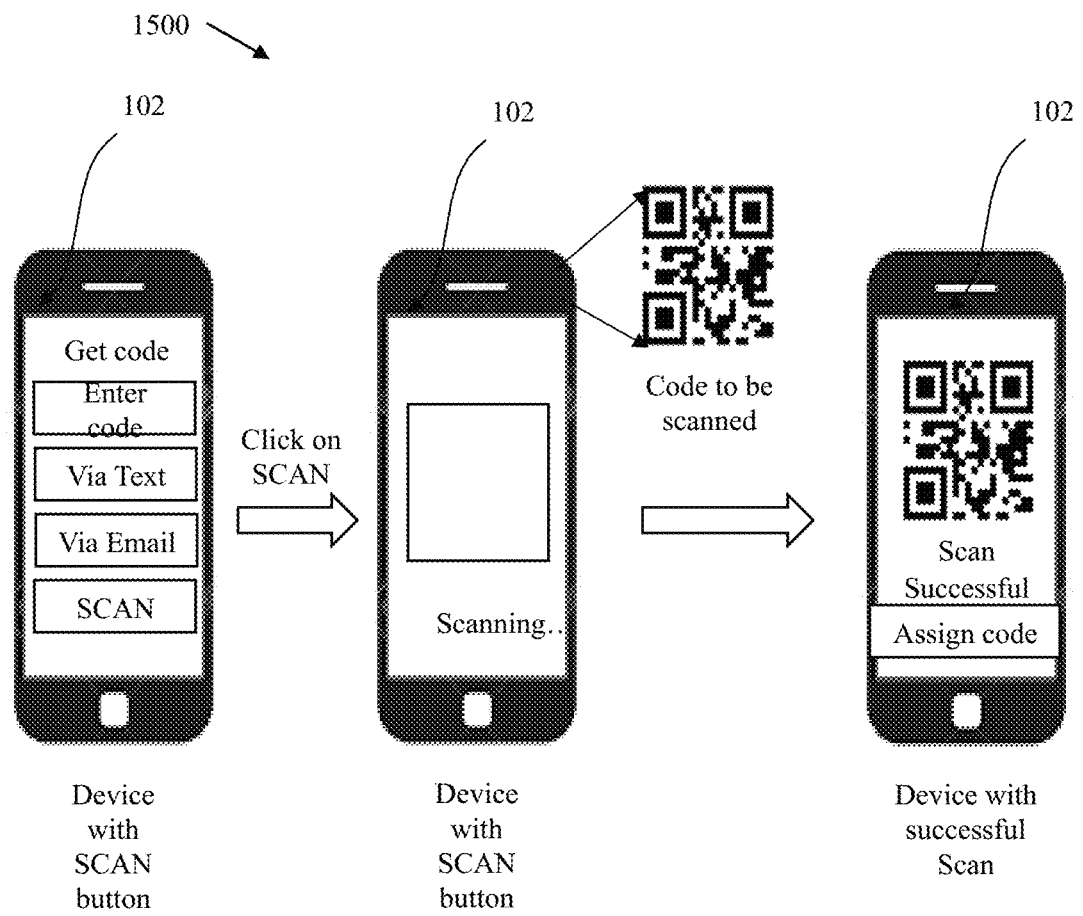
FIG. 15 is a block diagram that illustrates a user loading a code in accordance with an exemplary embodiment of the disclosure.

FIG. 15 is a block diagram 1500 that illustrates a user loading a code in accordance with an exemplary embodiment of the disclosure. The code may be loaded while using a mobile digital wallet such as a QR wallet. This is a wallet in the form of a software application or program running on various hardware devices such as the first device 102 or any other DD. As shown, the user (such as the first user of the first device 102) may use the wallet application or program running on the first device 102 to scan the code such as a QR code. The wallet application or program may provide one or more functionalities such as "get code" for getting or retrieving a code from a memory or another device, "enter code" for entering the code, "via text" for loading the code into the wallet via a text message, "via email" for loading the code into the wallet via an email, and "scan" for scanning the code. When the first user clicks on the "scan", the device's camera is turned ON and then the first user can adjust the device's camera to scan the code. Post the successful scanning of the code, the wallet application or program may ask the first user to assign the code. Thus, the first user may load the code into the wallet in various electronic, scanning, and wireless ways including via text, via email or websites, via scanning the code such as using wireless method or image sensor such as camera, light or laser-based sensor, or by entering it in the application, by using other means of inputs such as voice or visual based inputs.

Figure 16:
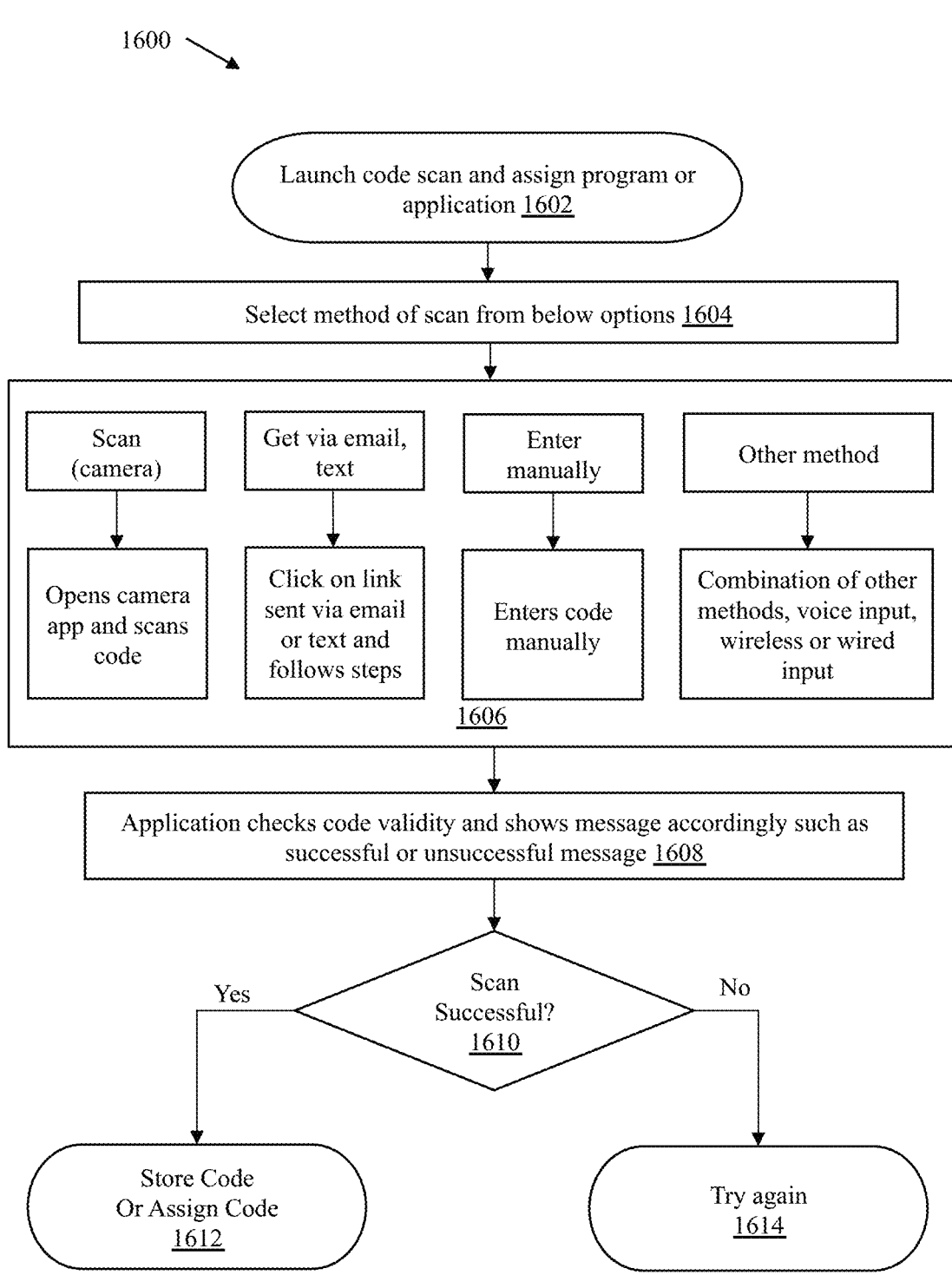
FIG. 16 is a process flow diagram that illustrates a process/algorithm for entering a code in accordance with an exemplary embodiment of the disclosure.

FIG. 16 is a process flow diagram 1600 that illustrates a process/algorithm for entering the code in accordance with an exemplary embodiment of the disclosure.

At step 1602, the code scan and assign program or application is launched. In an embodiment, the first user may use the first device 102 to launch the code scan and assign program or application.

At step 1604, a method of scan from the below options (described in step 1606) is selected.

At step 1606, various options of entering the code are described. In one option, the user may use the scan option to enter the code. In this embodiment, the user clicks the "scan" option which opens the camera application of the first device 102 and then uses it to scan the code. In another option, the user may use the "get via email or text" option to enter the code. In this embodiment, the user clicks on either "via text" or "via email" which will cause the server to generate a link.

The user may click on the link sent via email or text and follows the inline steps or instructions. In another option, the user may use the manual option to enter the code. In another option, the user may user other methods such as voice input, wired or wireless inputs, or any other combination of methods to enter the code.

At step 1608, the program or application checks the code validity and shows the message accordingly such as successful or unsuccessful message.

At step 1610, a check is performed to determine whether the scan is successful or unsuccessful. If, at 1610, it is determined that the scan is successful, then step 1612 is executed or processed, else step 1614 is executed or processed.

At step 1612, the code is stored or assigned.

At step 1614, the first user may try again and follow the steps as described above.

Figure 17:
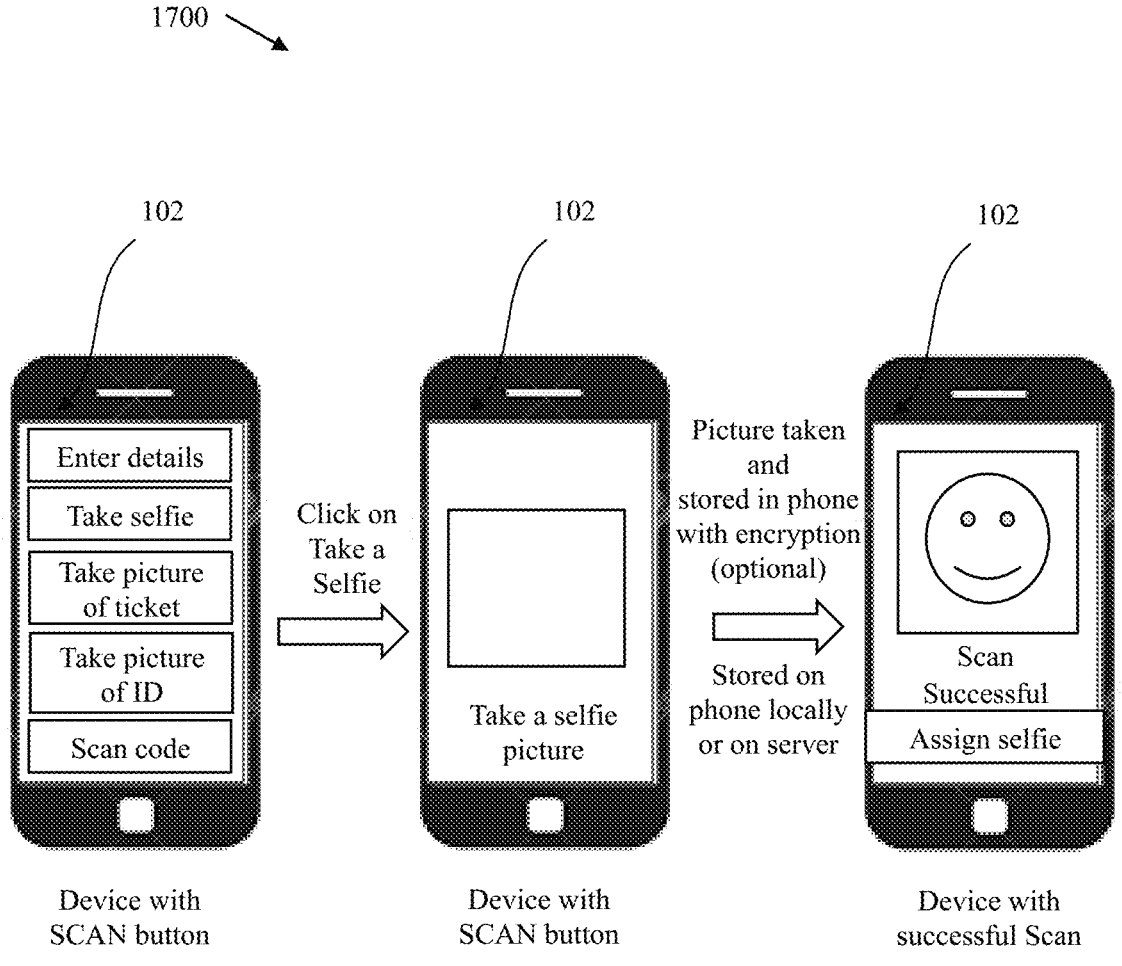
FIG. 17 is a block diagram that illustrates a user taking a selfie picture for the code in accordance with an exemplary embodiment of the disclosure.

FIG. 17 is a block diagram 1700 that illustrates the first user taking a selfie picture for the code in accordance with an exemplary embodiment of the disclosure. As shown, the application or program running on the first device 102 includes various functionalities such as "enter details", "take selfie", "take picture of ticket", "take picture of ID", and "scan code" options. In this embodiment, the first user selects or clicks on the option "take selfie". In response to the selection or click, the first device 102 opens the camera app (i.e., a front camera). This allows the first user to capture or take his/her selfie picture with the camera app. This picture is then stored in a local memory of the first device 102 (e.g., the smartphone) or on an external memory on the server 106 (as shown in FIG. 1A). Post the successful capturing of the user's selfie picture, the application or program may ask the first user to assign the selfie.

Figure 18:
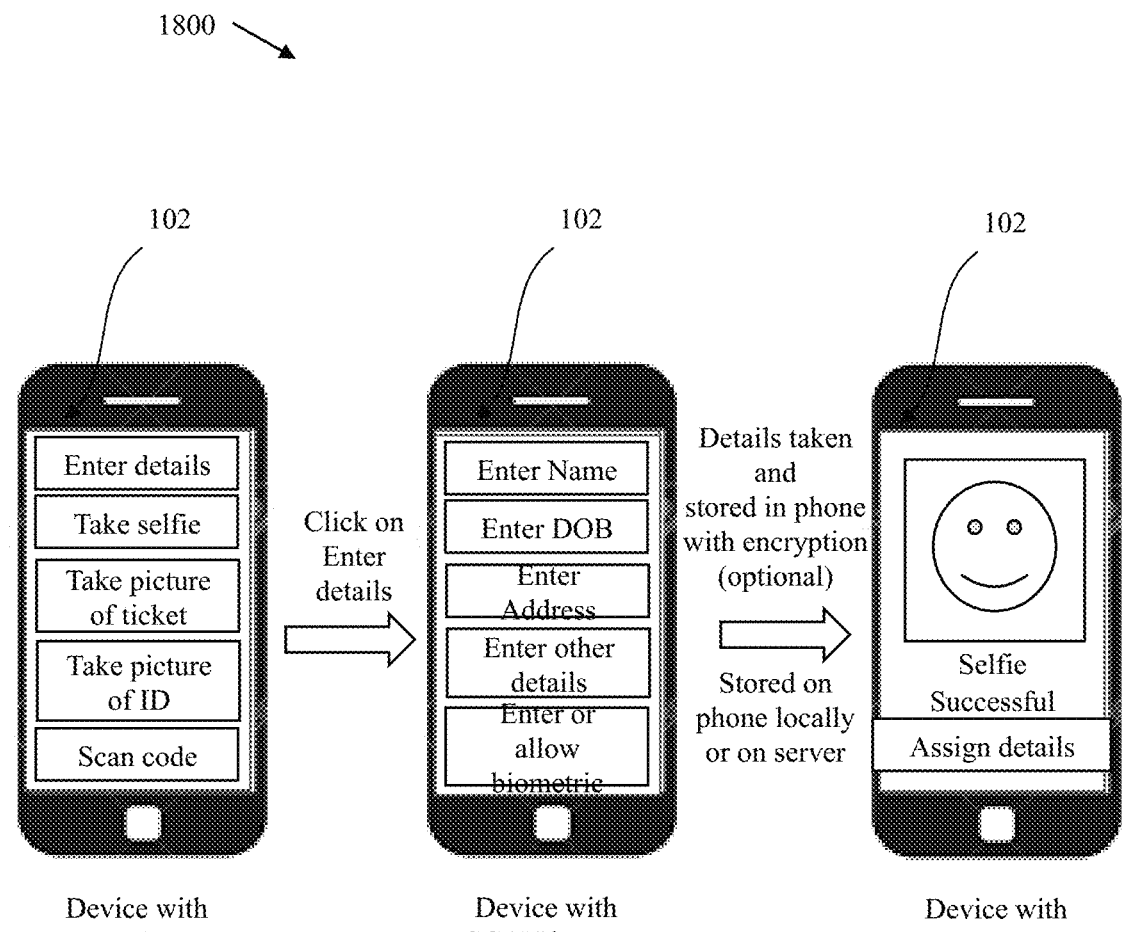
FIG. 18 is a block diagram that illustrates a user entering other details for the code in accordance with an exemplary embodiment of the disclosure.

FIG. 18 is a block diagram 1800 that illustrates the first user entering other details for the code in accordance with an exemplary embodiment of the disclosure. As shown, the application or program running on the first device 102 includes various functionalities such as "enter details", "take selfie", "take picture of ticket", "take picture of ID", and "scan code" options. In this embodiment, the first user selects or clicks on the option "enter details". In response to the selection or click, the application or program running on the first device 102 opens a page for allowing the first user to enter the details. This page may allow the first user to enter name, date of birth, address, other personal details, and biometric inputs. After the first user has entered the relevant and required details, the application or program takes the details and store the user details in a local memory of the first device 102 (e.g., the smartphone) or on an external memory on the server 106 (as shown in FIG. 1A). Post the successful capturing of the user's details, the application or program may ask the first user to assign the details.

Figure 19:
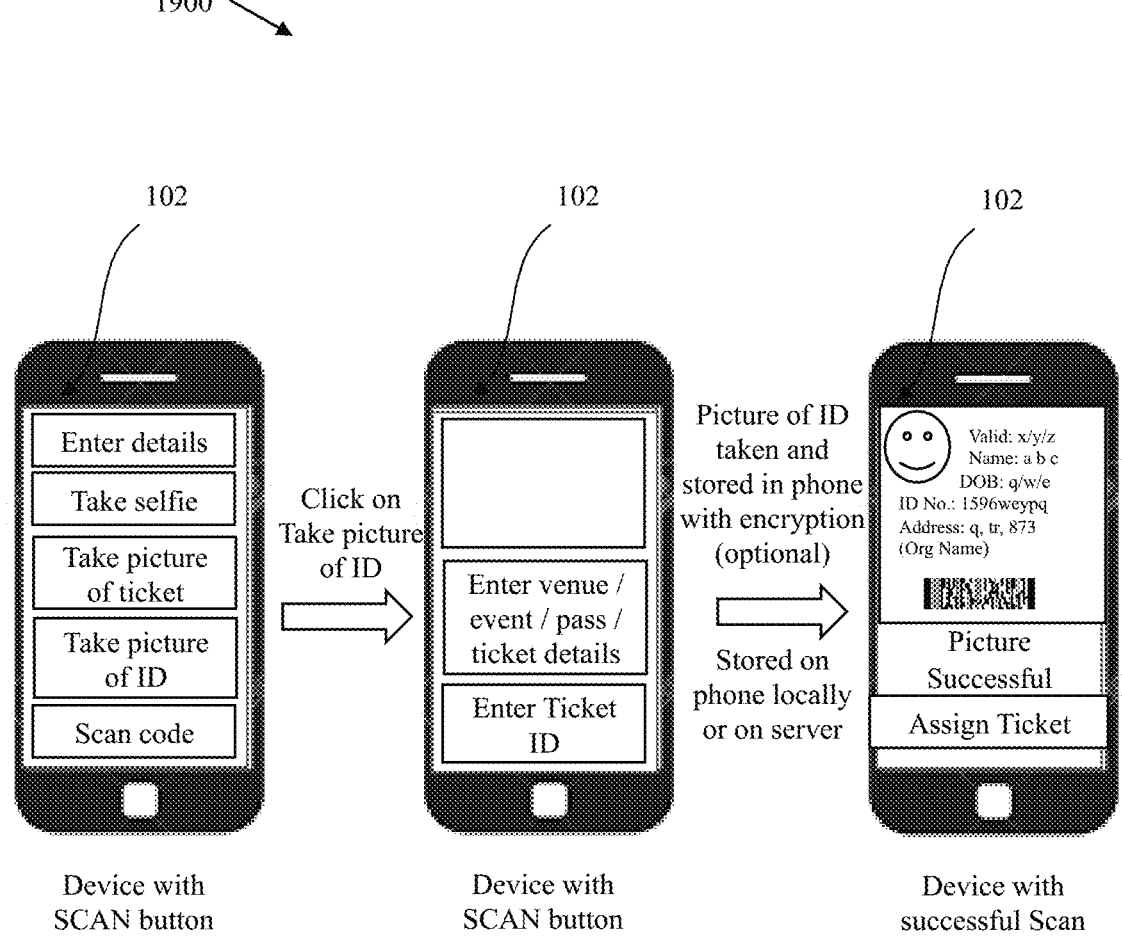
FIG. 19 is a block diagram that illustrates a user entering other identification details or a picture for the code in accordance with an exemplary embodiment of the disclosure.

FIG. 19 is a block diagram 1900 that illustrates the first user entering other identification details or a picture for the code in accordance with an exemplary embodiment of the disclosure. As shown, the application or program running on the first device 102 includes various functionalities such as "enter details", "take selfie", "take picture of ticket", "take picture of ID", and "scan code" options. In this embodiment, the first user selects or clicks on the option "take picture of ID". In response to the selection or click, the first device 102 opens the camera app (i.e., a rear camera). This allows the first user to capture or take a picture of his/her ID with the camera app. In addition, the first user may also provide other details such as venue, event, pass, or ticket details, and then may add a ticket ID. This picture along with other entered details, if any, may be stored in a local memory of the first device 102 (e.g., the smartphone) or on an external memory on the server 106 (as shown in FIG. 1A). Post the successful capturing of the user's ID picture, the application or program may ask the first user to assign the ticket.

Figure 20:
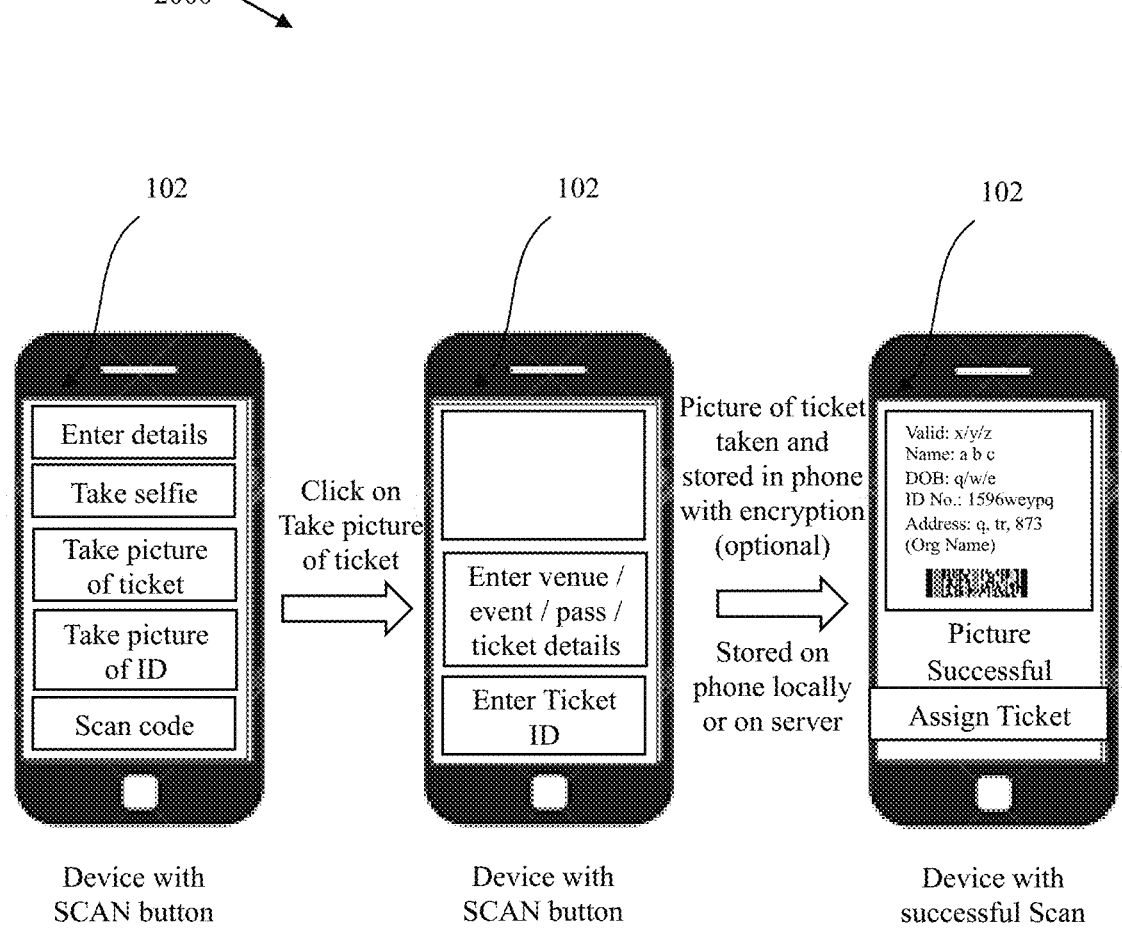
FIG. 20 is a block diagram that illustrates a user entering details or taking a picture of a ticket, voucher, or the like for the code in accordance with an exemplary embodiment of the disclosure.

FIG. 20 is a block diagram 2000 that illustrates the first user entering details or taking a picture of a ticket, voucher, or the like for the code in accordance with an exemplary embodiment of the disclosure. As shown, the application or program running on the first device 102 includes various functionalities such as "enter details", "take selfie", "take picture of ticket", "take picture of ID", and "scan code" options. In this embodiment, the first user selects or clicks on the option "take picture of ticket". In response to the selection or click, the first device 102 opens the camera app (i.e., a rear camera). This allows the first user to capture or take a picture of the ticket with the camera app. In addition, the first user may also provide other details such as venue, event, pass, or ticket details, and then may add a ticket ID. This picture along with other entered details, if any, may be stored in a local memory of the first device 102 (e.g., the smartphone) or on an external memory on the server 106 (as shown in FIG. 1A). Post the successful capturing of the user's ticket picture, the application or program may ask the first user to assign the ticket.

Figure 21:
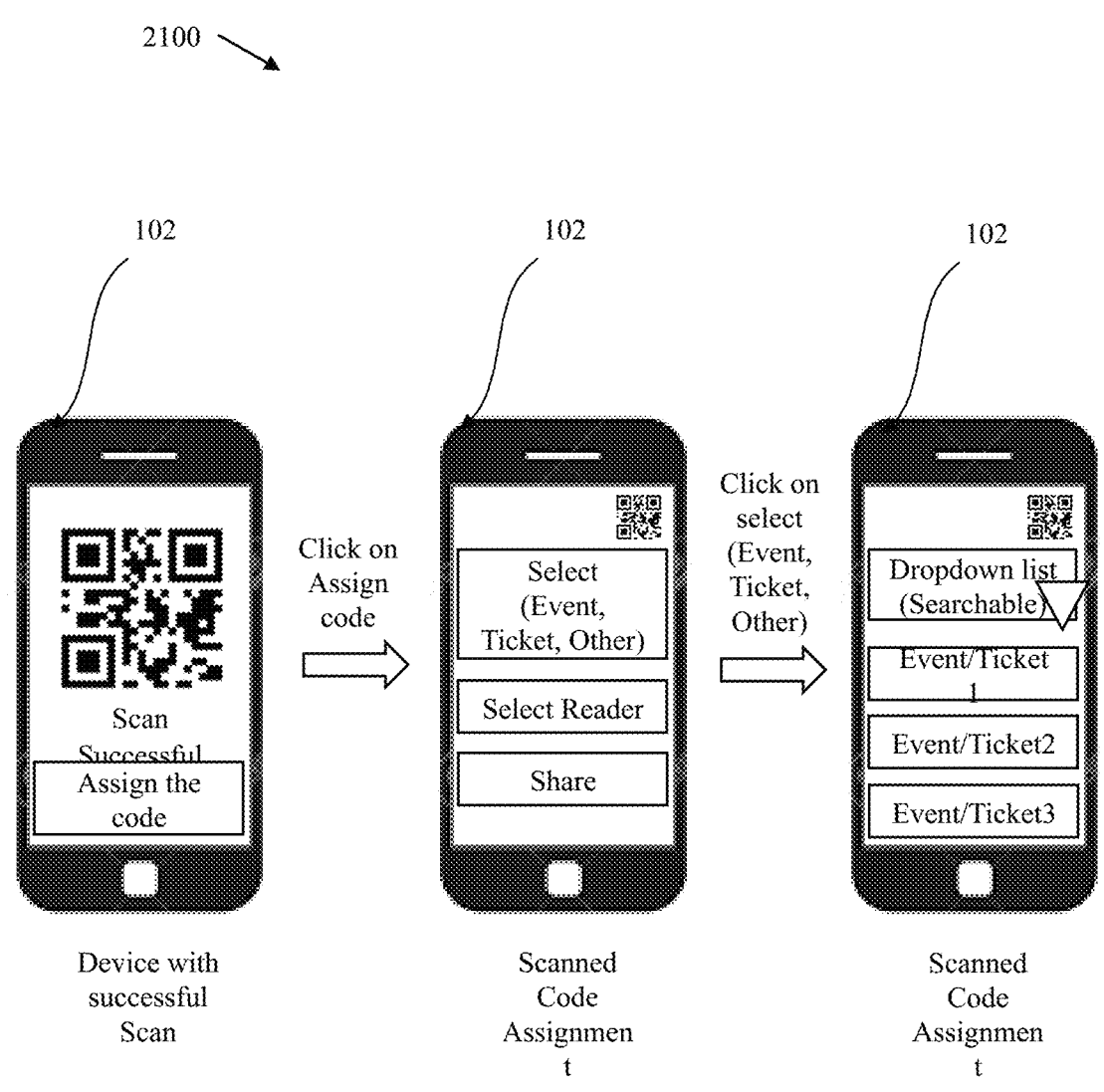
FIG. 21 is a block diagram that illustrates a user assigning the code in accordance with an exemplary embodiment of the disclosure.

FIG. 21 is a block diagram 2100 that illustrates the first user assigning the code in accordance with an exemplary embodiment of the disclosure. After successful scanning the code, the first user may select or click on "assign the code". In response to the selection or click, the application or program running on the first device 102 opens a page including functionalities such as "select event, ticket, or others", "select reader", and "share". The first user may select or click on the option "select event, ticket, or others". In response to this selection or click, the application or program running on the first device 102 opens another page including functionalities such as a dropdown list and one or more events with the corresponding tickets. The first user may then select an event and a corresponding ticket for access to the event.

In some embodiments, the first user may create the code by entering various parameters into the software application or program. Various such inputs and specific code generation algorithm would generate a specific code that can be read and decipher only by an authorized software. For example, the first user may enter his name, date of birth, picture ID, date, time, location, selfie picture, government issued identification document number, event details, ticket number, voucher number, or the like. Furthermore, the first user may scan or take a picture of the specific document, tickets, vouchers, and upload the picture(s) or video(s). One or more such entries or inputs in various combinations along with other readily available or the organization provided inputs may then be used to generate the code(s) for various purposes including as the listed above. Furthermore, the generated code may be enabled with the enhanced code or dynamic code features explained above. In this case, the code changes regularly and only the verifier with a digital decryption key or algorithm can decode the code, read it, and act upon it.

Figure 22:
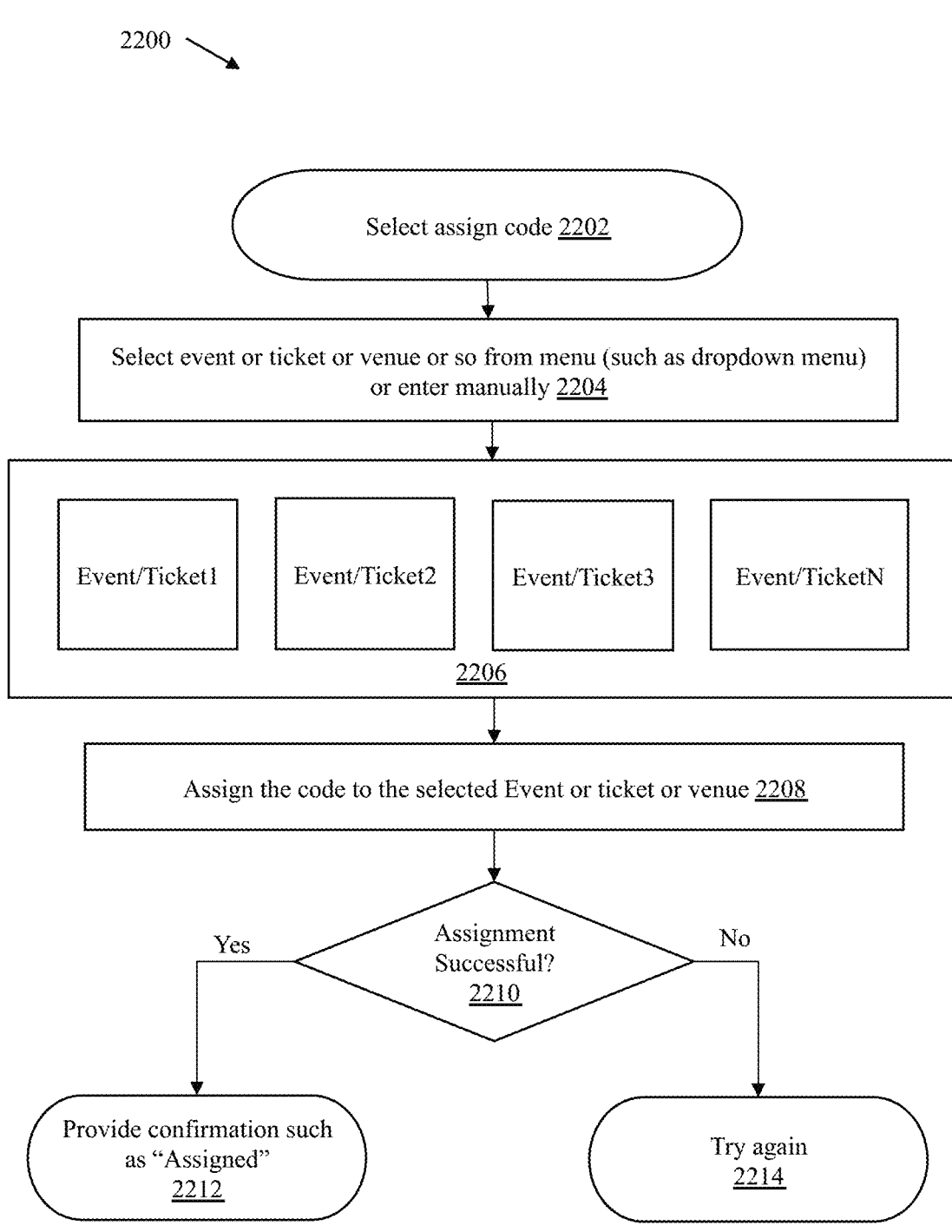
FIG. 22 is a process flow diagram that illustrates a process/algorithm for user assigning the code in accordance with an exemplary embodiment of the disclosure.

FIG. 22 is a process flow diagram 2200 that illustrates a process/algorithm for user assigning the code in accordance with an exemplary embodiment of the disclosure.

At step 2202, the assigned code is selected by the first user.

At step 2204, the event, ticket, or venue from the menu (i.e., the dropdown menu or list) is selected or manually entered by the first user.

At step 2206, one of the events and tickets combination is selected by the first user. For example, the first user may select "Event/Ticket1" from a group including "Event/Ticket1", "Event/Ticket2", "Event/Ticket3", . . . , "Event/TicketN".

At step 2208, the code is assigned to the selected event/ticket/venue.

At step 2210, a check is performed to determine whether the assignment is successful or unsuccessful. If, at 2210, it is determined that the assignment is successful, then step 2212 is executed or processed, else step 2214 is executed or processed.

At step 2212, confirmation such as "assigned" may be provided.

At step 2214, the first user may try again and follow the steps as described above.

In an embodiment, the first user may assign the code to applicable causes including but are not limited to:
1. Event
2. Ticket
3. Voucher
4. Access keys or other access control mechanism for any venue
5. Payment related application
6. Vaccination or other health records check
7. Digital passport requirements check at an entry point
8. Other organization or personal record checks The code may be a pass for various causes. To accomplish, the software application or program on the first device 102 already has a way to load the applicable one or more causes such as events into the system. For example, an event management can make the event available into the system using the first user or enterprise software application by manually entering the event details and assigning a name to it, which in turn gets stored on the server 106 and becomes available for various users based on various permission levels.

Now verification of the codes by a verifier using a verifier application as a separate application or the application within the QR wallet application will be described in detail as below.

Figure 23:
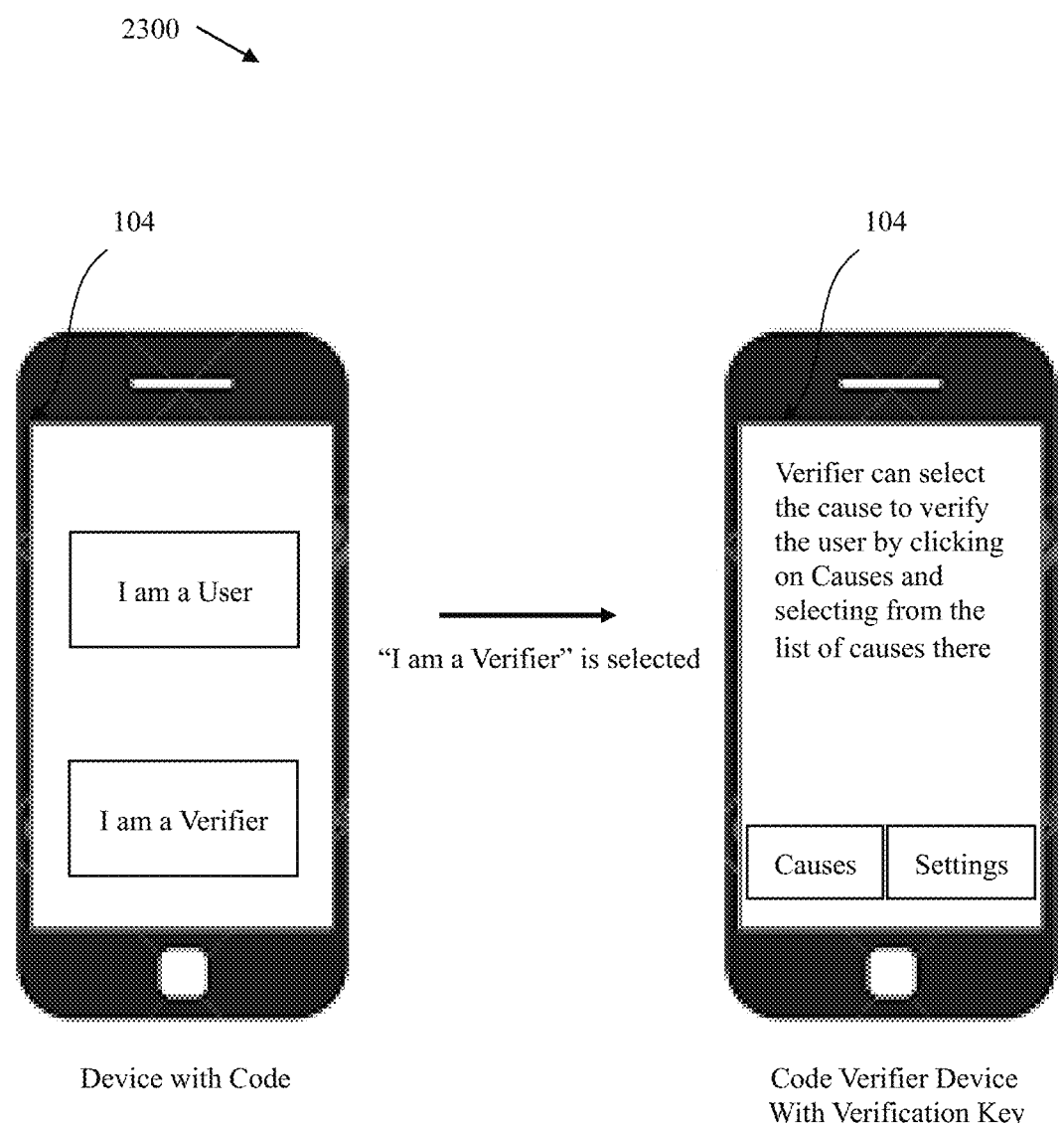
FIG. 23 is a block diagram that illustrates role selection in accordance with an exemplary embodiment of the disclosure.

FIG. 23 is a block diagram 2300 that illustrates role selection in accordance with an exemplary embodiment of the disclosure. As shown, the verifier selects or clicks on "I am a verifier" on the code verifier device (i.e., the second device 104). After this selection or click, the verifier can select one or more causes to verify the first user by clicking on "Causes" and selecting from the list of causes there.

Figure 24:
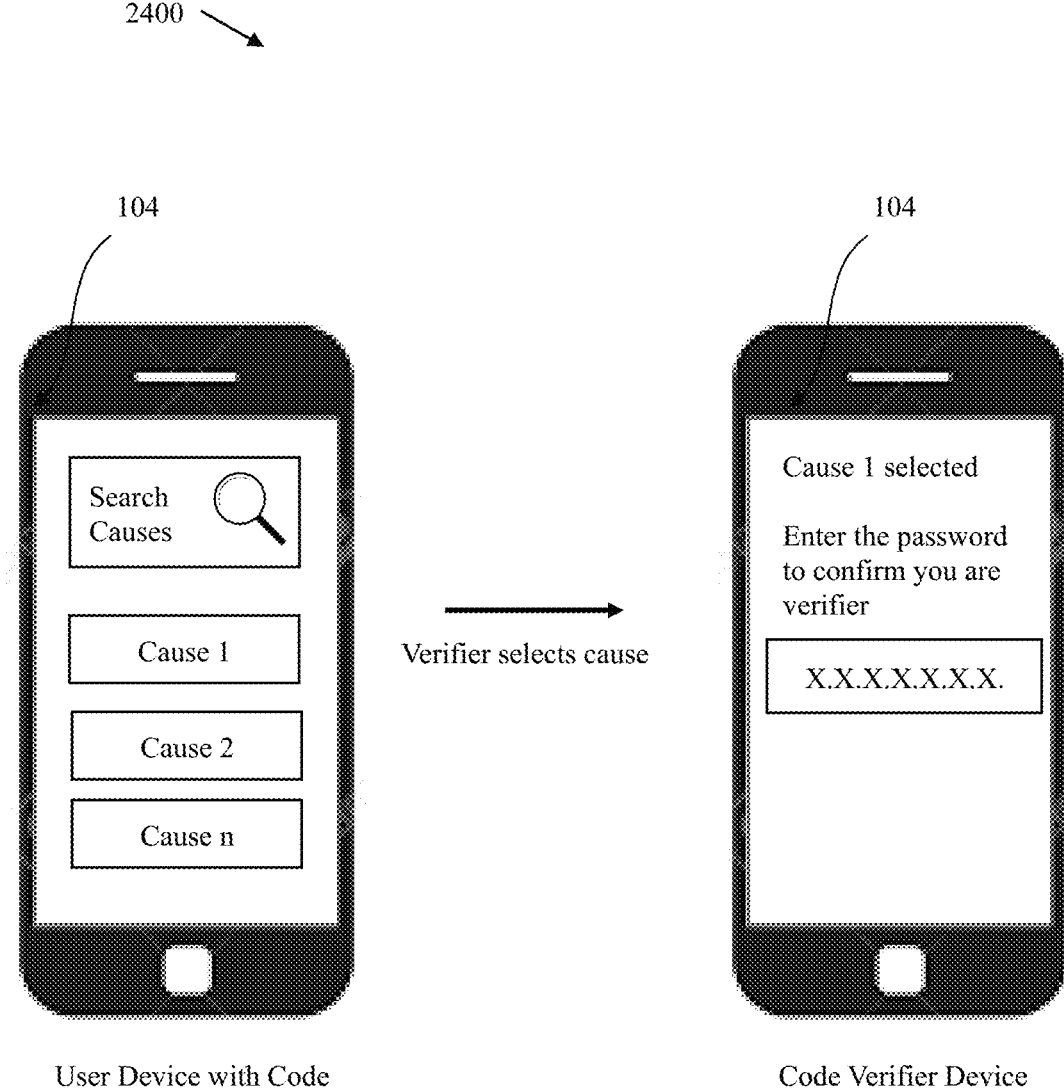
FIG. 24 is a block diagram that illustrates selection of cause and credentials in accordance with an exemplary embodiment of the disclosure.

FIG. 24 is a block diagram 2400 that illustrates selection of the one or more causes and credentials in accordance with an exemplary embodiment of the disclosure. The verifier may search the one or more causes and then select a cause, say, "Cause 1" from the list of causes including but not limited to "Cause 1", "Cause 2", and "Cause 3". Thereafter, the verifier may enter the password (i.e., a verification key) to confirm that he/she is an authentic verifier. The verifier may select the causes such as event in case he/she may have two more causes accessible for the verification at that time or in the future. The verifier may have to access such application using secured login process where the verifier creates or is given credentials to be able to access the verification application.

Figure 25:
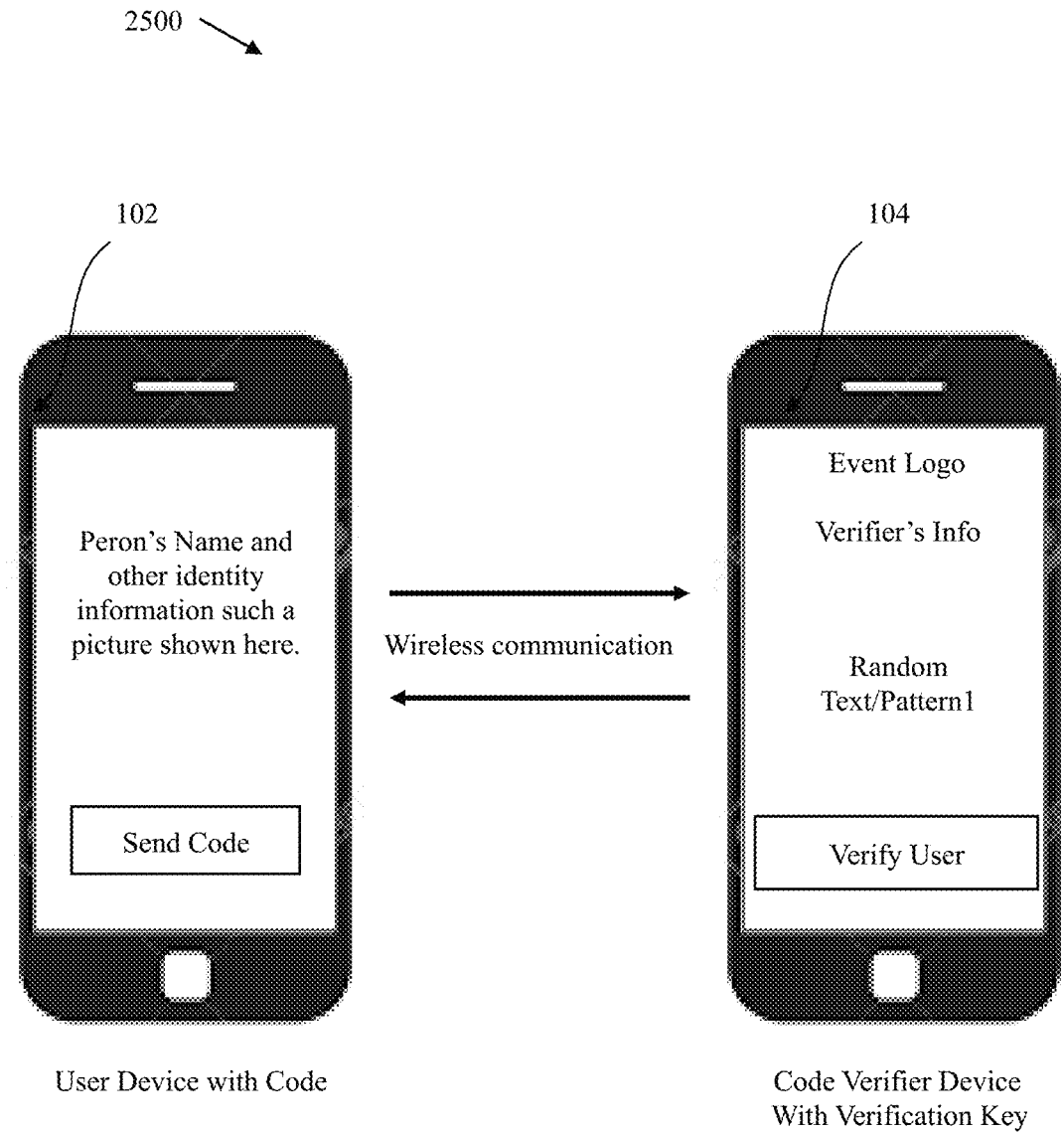
FIG. 25 is a block diagram that illustrates user and verifier communication in accordance with an exemplary embodiment of the disclosure.

FIG. 25 is a block diagram 2500 that illustrates the user and verifier communication in accordance with an exemplary embodiment of the disclosure. In this embodiment, the first device 102 and the second device 104 may communicate with each other over a wireless communication network. When the first user clicks on the "send code" option, the first device 102 may transmit the code to the second device 104. The code is received by the verifier in the wireless format such as via Bluetooth, which is then verified with the decryption algorithm. The wireless communication may be through multiprotocol wireless system or even via a wireless mesh networking such as Wi-Fi mesh or Bluetooth mesh. In this application, the verifier may select the verifier screen or the verifier standalone application to scan or read the user code on the first device 102. The verifier may verify the scan and read the information from the scanned code. The verifier may verify the details of the first user along with the event details.

Figure 26:
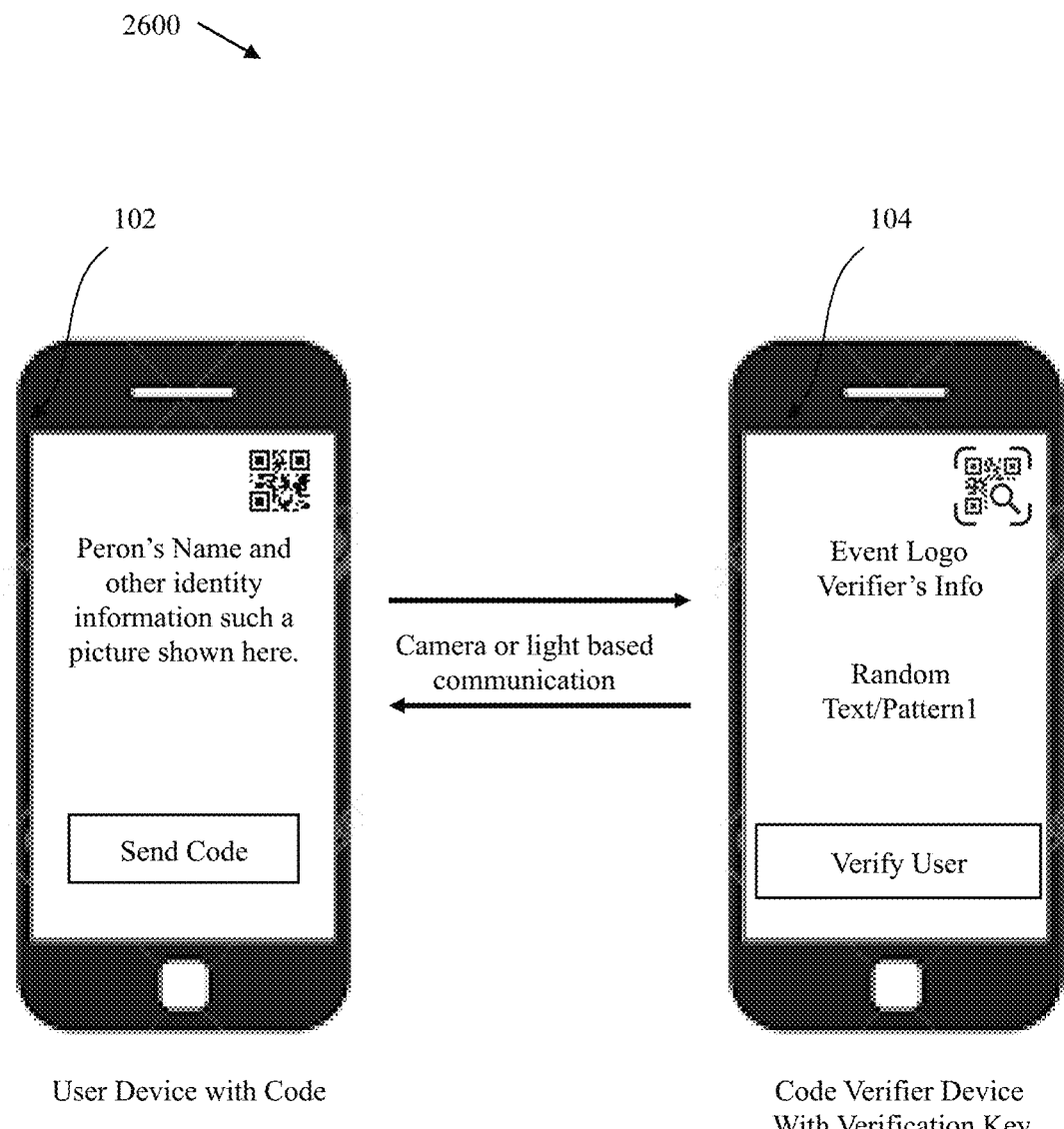
FIG. 26 is a block diagram that illustrates manual scanning option in accordance with an exemplary embodiment of the disclosure.

FIG. 26 is a block diagram 2600 that illustrates manual scanning option in accordance with an exemplary embodiment of the disclosure. In case the wireless communication is not feasible, a manual code scanning option on the guest's (user's) device (i.e., the first device 102) and the verifier's device (i.e., the second device 104) may be used. In this case, both select to perform the code scanning with camera, laser (light) or other QR/bar code scanning mechanism by selecting scan option such as given in the example image above (shown in FIG. 26) where an upper right corner icon can be clicked to perform a manual scanning and verification. When the guest (also user) clicks on the code icon, a code such QR code pops up on the screen, while the camera or scanning option starts when the verifier clicks on the scan icon.

Figure 27:
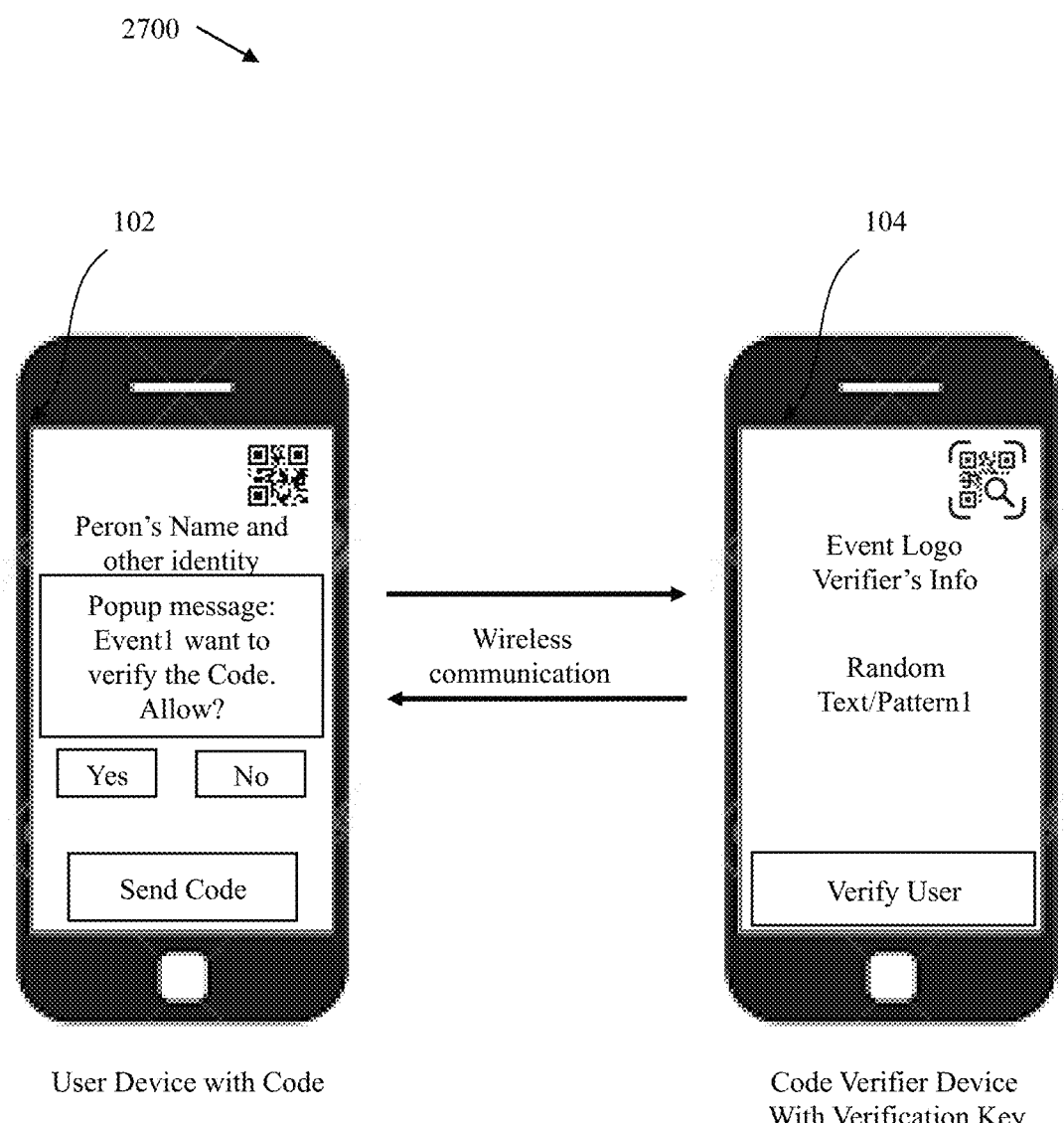
FIG. 27 is a block diagram that illustrates event notification on the user's device in accordance with an exemplary embodiment of the disclosure.

FIG. 27 is a block diagram 2700 that illustrates event notification and verification at a venue in accordance with an exemplary embodiment of the disclosure. When the first user reaches a venue location, the first user may open the application or program on the first device 102. The application or program may ask the first user whether he/she wants to verify the code for the event. The first user may click on YES to give his/her consent and then click on "send code" to send the code to the verifier's device (i.e., the second device 104) over the wireless communication. The wireless communication may be through multiprotocol wireless system or even via a wireless mesh networking such as Wi-Fi mesh or Bluetooth mesh. In this application, the verifier may select the verifier screen or the verifier standalone application to scan or read the user code on the first device 102. The verifier may verify the scan and read the information from the scanned code. The verifier may verify the details of the first user along with the event details.

Figure 28:
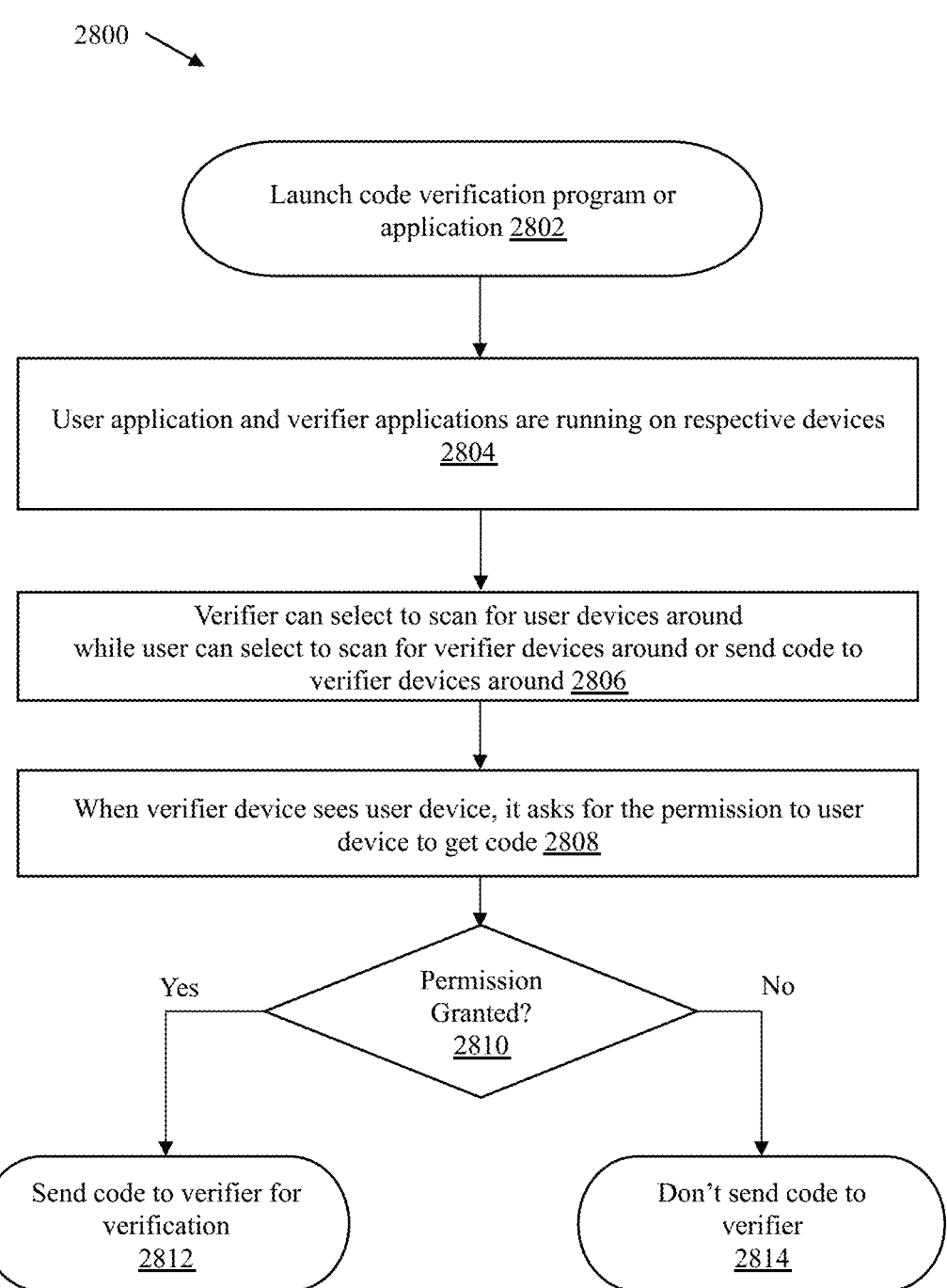
FIG. 28 is a process flow diagram that illustrates a process/algorithm for a permission grant by a user to a verifier for the user's code access in accordance with an exemplary embodiment of the disclosure.

FIG. 28 is a process flow diagram 2800 that illustrates a process/algorithm for a permission grant by the first user to the verifier for the user's code access in accordance with an exemplary embodiment of the disclosure.

At step 2802, code verification program or application is launched.

At step 2804, the user application and the verifier applications are running on respective devices i.e., the first device 102 and the second device 104, respectively.

At step 2806, the verifier can select to scan for the user devices around while the first user can select to scan for the verifier devices around or send code to the verifier devices around.

At step 2808, when the verifier device sees the first user device 102, it asks for the permission to the first user device 102 to get the code.

At step 2810, a check is performed to determine whether the permission is granted or not. If, at 2810, it is determined that the permission is granted, then step 2812 is executed or processed, else step 2814 is executed or processed.

At step 2812, the first user device 102 sends the code to the verifier for the verification.

At step 2814, the first user device 102 does not send the code to the verifier.

Figure 29:
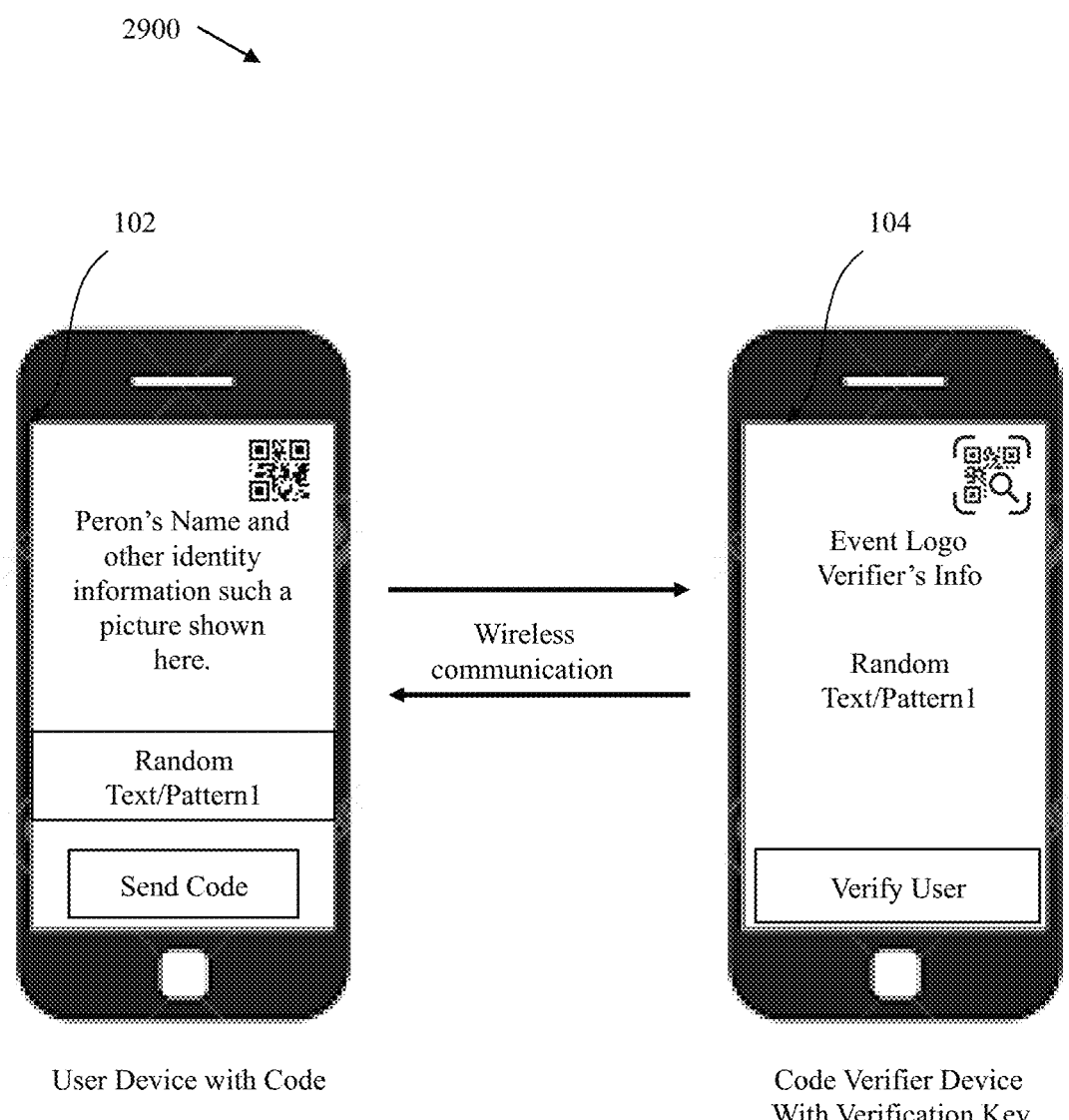
FIG. 29 is a block diagram that illustrates guest showing additional information in accordance with an exemplary embodiment of the disclosure.

FIG. 29 is a block diagram 2900 that illustrates guest showing additional information in accordance with an exemplary embodiment of the disclosure. With the successful verification, the verifier's device (i.e., the second device 104) provides the confirmation to the guest and may also provide a unique code to the guest device (i.e., the first device 102) which can be used to display a specific text, image, color, light indication, pattern, other physical attributes such as vibration or a combination on the guest's device as well as set some parameters on the guest's device 102 and the server 106. Also, the guest can show other information such as guest's identity information such as his selfie picture, name, etc. This information is useful to visually verify the guest's identity as and if required.

Figure 30:
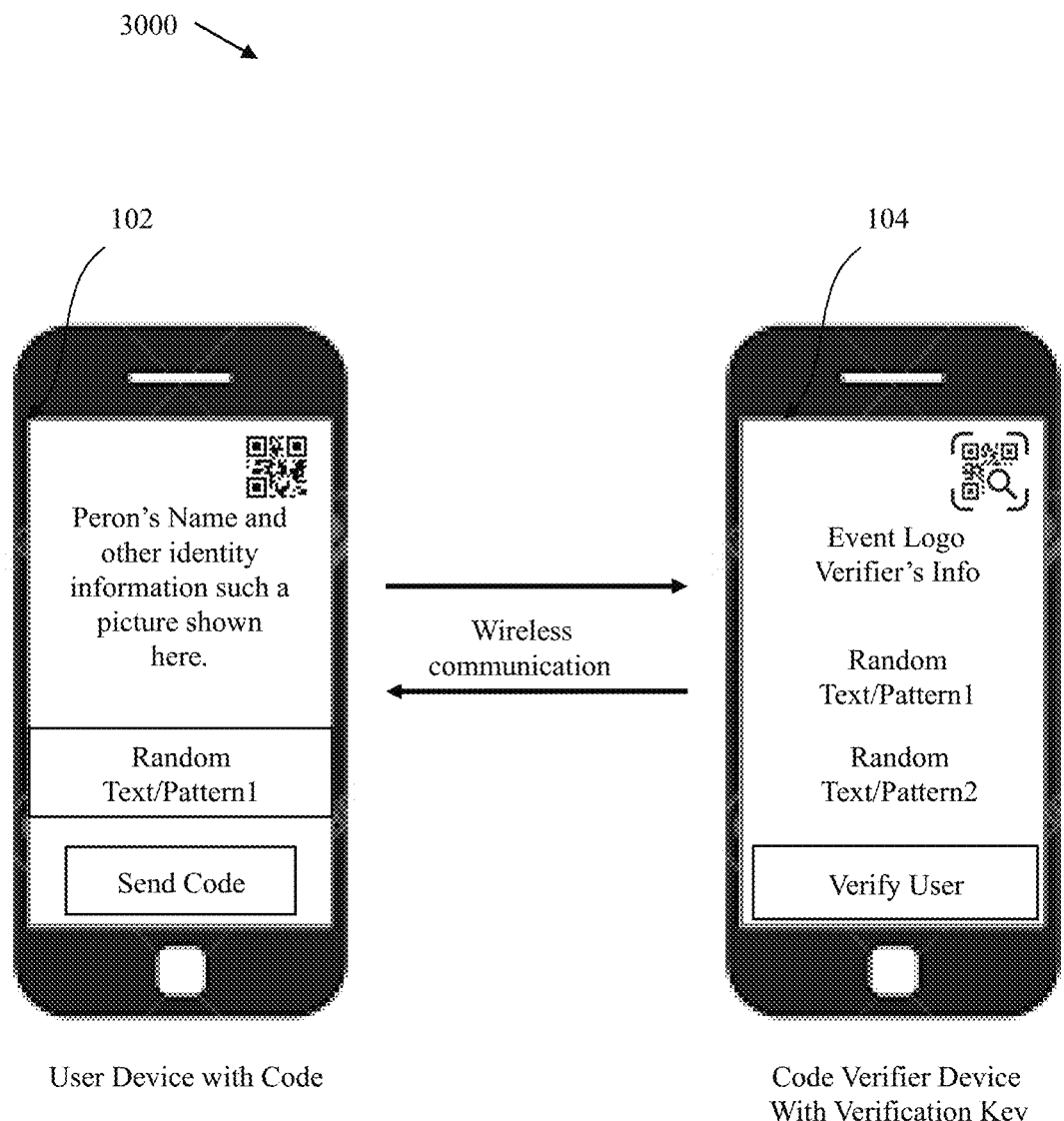
FIG. 30 is a block diagram that illustrates changing code in accordance with an exemplary embodiment of the disclosure.

FIG. 30 is a block diagram 3000 that illustrates changing code in accordance with an exemplary embodiment of the disclosure. The unique code from the verifier after verification can be time bound, meaning it can be valid only for a limited time such as 30 seconds while another code is sent after 30 seconds or whenever the guest or the verifier turns ON or restart the application. The guest phone can also use an algorithm including one of the algorithms explained above to generate the regular unique code to be displayed or indicated on or via the device with limited communication or code received from the verifier device. For e.g., the unique code by the verifier device can be a parameter to the guest device that takes into the account the location of the device, time on the device, weather or other parameters of the locations or associated with the device.

Figure 31:
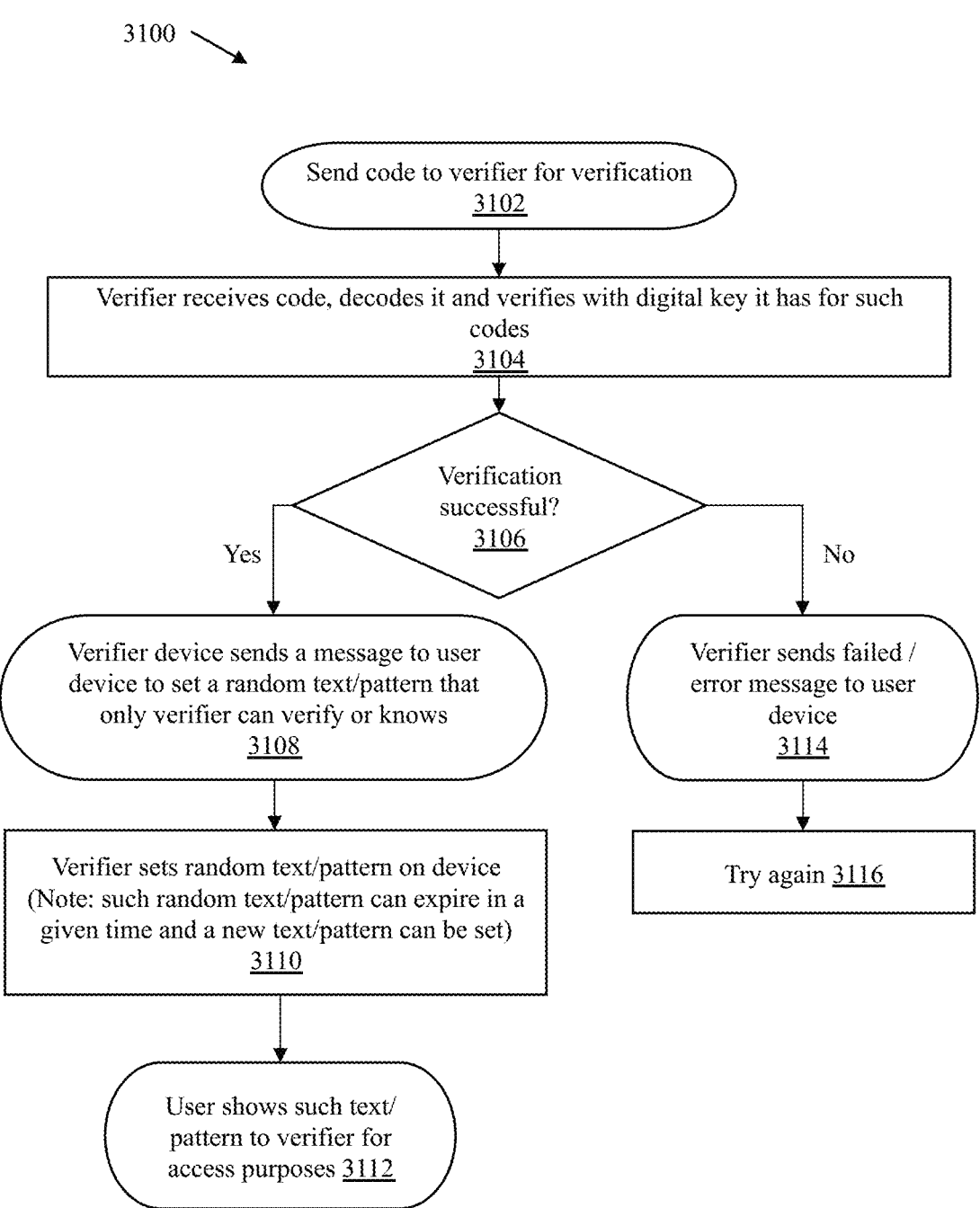
FIG. 31 is a process flow diagram that illustrates a verification algorithm in accordance with an exemplary embodiment of the disclosure.

FIG. 31 is a process flow diagram 3100 that illustrates the verification algorithm in accordance with an exemplary embodiment of the disclosure.

At step 3102, the code is sent to the verifier for verification.

At step 3104, the verifier receives code, decodes it, and verifies with digital key it has for such codes.

At step 3106, a check is performed to determine whether the verification is successful or not. If, at 3106, it is determined that the verification is successful, then step 3108 is executed or processed, else step 3114 is executed or processed.

At step 3108, the verifier's device (i.e., the second device 104) sends a message to the first device 102 to set a random text/pattern that only verifier can verify or knows.

At step 3110, the verifier sets random text/pattern on the device. Such random text/pattern may expire in each time frame and a new text/pattern can be set.

At step 3112, the user shows such text/pattern to the verifier for access purposes.

At step 3114, the verifier sends failed or error message to the first device 102.

At step 3116, the first user may try again and follow the steps as described above.

FIG. 32 is a diagram 3200 that illustrates two or more verifiers at an event venue for user verification, and FIG. 33 is a process flow diagram 3300 that illustrates two or more verifiers at an event venue for user verification with one or more BT devices in accordance with an exemplary embodiment of the disclosure.

At the event venue, there could be two or more verifiers (such as guard 1 and guard 2) who can be in the range of each other as well as one or more users (i.e., guests) who can be in the wireless verification range of two or more verifiers.

In an embodiment, the verifier can generate the random code (text, number, image pattern, or the like) and give it to the guest which is then displayed or shown by the guest's device for the access. In this case, the verifiers trying to connect and set such random code on guest's device (such as the first device 102) need to generate the same code (for example, 327). This is required as the guest can chose the entry gate of any verifier, and the verifier needs to match the code on his/her device (the second device 104). Only when the code (327) matches, the guests are allowed to pass through else not. As shown, the guests with the code (327), which matches with the code (327) with the guards, are allowed to pass through the gate. Other guests with FAIL status (not purchased the tickets) or N/A status (not having valid code) are not allowed into the restricted arena.

In an embodiment, generating the same code may be achieved in following ways:

1. There is a master verifier device(s) which generates the one or more codes and communicates the one or more codes to the other verifiers to generate and give to guests' devices.
2. Each verifier device generates the same code using the one or more algorithms provided above. The same code by the verifier is generated based on the same location, same time, same event, or some other parameters. As the parameters to the code generation algorithm remain the same, the codes generated at the same time can be the same.
3. Server to which the verifier devices are connected can generate the unique codes and provide the two or many verifiers' devices for the use.
4. The wireless independent devices may be installed and can act independently to generate and set such codes on guest's device or through verifier's device.
5. Instead of a server, there can be another master device that is able to communicate to the verifier devices and gives parameters to the verifier devices to generate the same code or gives the unique codes directly. Such master devices can generate the parameters or codes themselves or get those from the server they are communicating with.
6. The verifier devices and other master devices can talk to each other in a meshed network to pass on the codes or parameters.
7. Furthermore, there could be a display such as a TV display where the code can be set by the verifier or the BT device, so it becomes visible to all the guests and verifiers. The advantage of such display is that there can be passive verifiers just checking the codes on the guest's device and comparing with the code on the display for allowing or denying the entry. The verifier in this can need not run the application on his device on need not have a device.

Note that these can be achieved without needing any wireless communication but the guest's device, the verifier's device, the BT device, or the display itself generating the unique codes that is time bound as explained above independently. Any code generation algorithms along with the one or more parameters may be used on all such devices to generate the same unique time bound code which expires after a limited time and a new code is automatically generated. Here, the BT device may be a Bluetooth device, or any other wireless device (WD) as explained above. The unique code (text, pattern, image, or the like) may also be generated on the server and as long as the guest has valid access with valid QR code, the guest can set such random unique code on his device while display can also receive such code directly or through other device from the server and display it.

In case of a large crowd, the wireless communication may have limitations as the signal to noise ratio may degrade making it difficult to set codes on larger number of devices. To avoid such scenarios, when the guest device and the verifier device or the BT device are communicating, instead of a single code, multiple unique codes can be set. For example, if each unique code is valid for 30 seconds, the verifier device can give 20 codes representing 10 minutes. This helps in avoiding congestion.

Also need to note that the verifier randomly or based on the signal strength tries to communicate with the guest devices and once the communication link is established, the verifier performs the verification, and sets the code. Once the code is set and the application running on the guest device and/or on the verifier device or BT can try to communicate again but would immediately drop the communication link if they see the valid one or more codes were set recently, well within code expiration window. This also allows reducing the congestion and ability for the verifier device to communicate with other guest devices in an optimized way.

Figure 34:
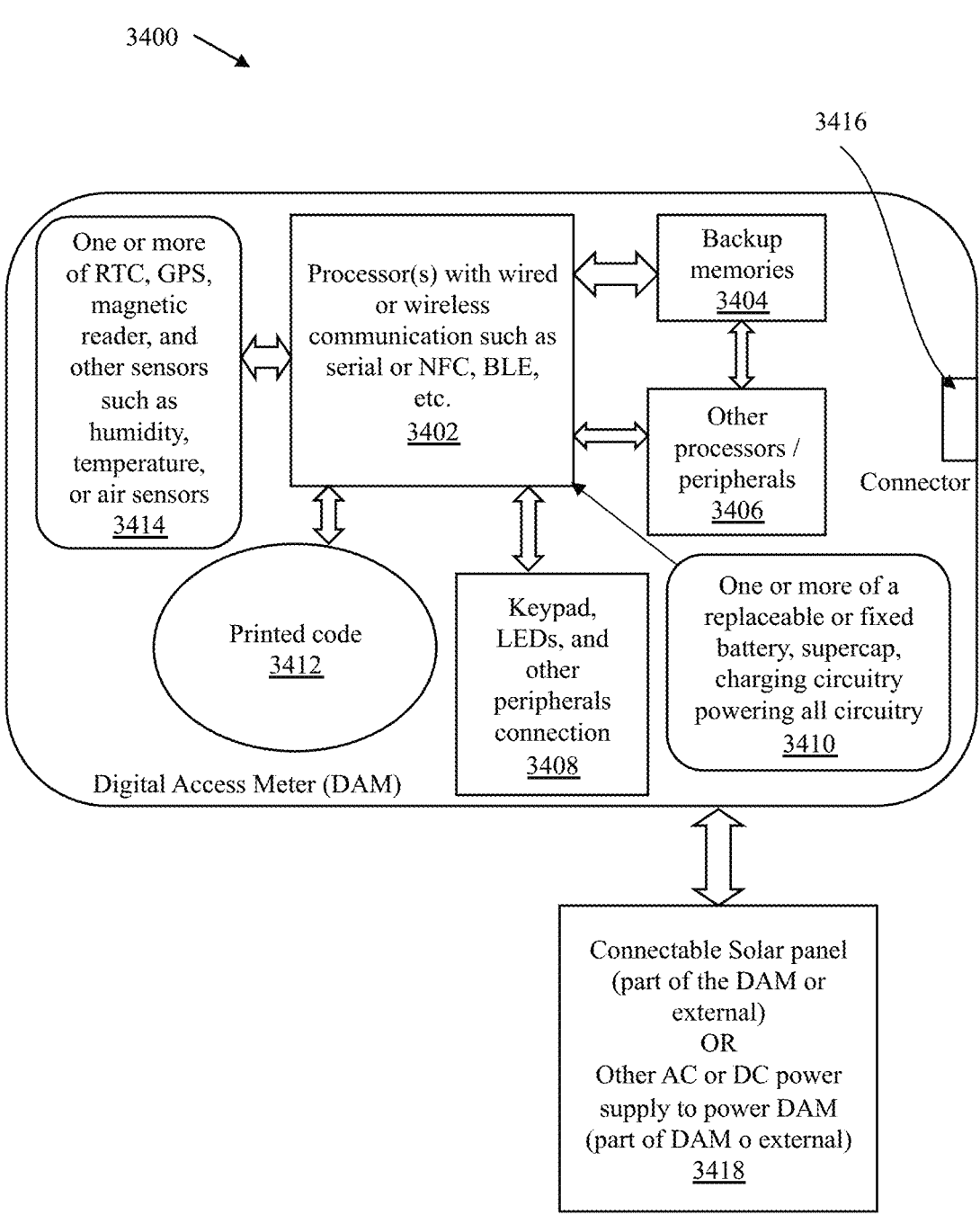
FIG. 34 is a block diagram that illustrates a digital access meter (DAM) in accordance with an exemplary embodiment of the disclosure.

FIG. 34 is a block diagram that illustrates a digital access meter (DAM) 3400 in accordance with an exemplary embodiment of the disclosure. Here, the DAM 3400 may include one or more processors 3402 with wired or wireless communication such as, but are not limited to, NFC, BLE, or the like. The DAM 3400 may further include backup memories 3404 along with other processors or peripherals 3406. The DAM 3400 may further include keypad, LEDs, and other peripherals connection 3408. The DAM 3400 may further include one or more of a replaceable or fixed battery, super capacitor (Super cap), charging circuitry powering all circuitry 3410. The DAM 3400 may further include fingerprint reader and other biometrics reader processors. The DAM 3400 may further include code printed on the device. The DAM 3400 may further include one or more sensors 3414 such as RTC (used to track the current date and time), GPS (to track position, velocity, and timing information), face recognition (such as 3D sensors to capture information about the shape of a face of a user), light detection and ranging (Lidar to determine variable distances), magnetic reader (such as magnetic stripe reader to read information encoded in a magnetic strip), and other sensors (such as humidity, temperature, or air sensors) but should not be construed as limiting to the scope of the present invention. The DAM 3400 may further include one or more connectors such as a connector 3416. In an embodiment, the DAM 3400 may be connected to a power source 3410. The power source 3410 may include one or more of a replaceable or fixed battery, super capacitor, and charging circuitry. The power source 3410 may be configured to power all circuitry of the DAM 3400.

The DAM 3400 has been disclosed herein since there is a need for a simple payment and usage of various spaces or causes, for example, a parking space. Currently, the way parking meters payment work is that the cellular or some sort of Internet connectivity is provided to the meter and the credit card transaction happens with the payment confirmation received by the meter and updating the time limit for which a car can be parked there. The limitation here is that each meter needs to have a constant internet or cellular connectivity which is expensive in terms of monthly recurring costs as well as such meters are costly.

The Bluetooth or NFC or other wireless solution such as in the DD explained previously without requiring the Inter

US 12,647,790 B2

47 net may be used where the transaction takes place on the DD or the mobile device that may have the Internet connection at the time of transaction or later. The DAM 3400 will now be explained. It has the hardware with:

Indicators: one or more color lighting device such as LED, sound, buzzer, and display including but is not limited to LED or LCD, vibrator, or any other such indicators with some physical attributes.

Wireless solution with antenna: Bluetooth, ZigBee, Wi-Fi, RFID, NFC, LoRA, and other wireless communication chipset with built in or secondary processor and antenna.

GPS: It can also have a GPS built in that helps in ensuring the location of the DAM 3400.

Sensors: It can also have various sensors such as temperature, humidity, $CO_2$, air, or the like.

RTC: Real Time Clock that helps the DAM 3400 know its current time and date.

Battery: A battery or a super capacitor to power the DAM 3400.

Power supply: AC/DC or DC/DC power supply that can power the DAM 3400 or charge the battery. A solar cell can be a part of the power supply solution. Solar panel can be part of the supply or can be connected externally.

Connectors: One or more connectors to connect to the DAM 3400 that can be used to update the firmware, power the DAM 3400, communicate with the controller and wireless chipsets in it.

Mechanical assembly structures: Ability to fasten the DAM 3400 on the road or on the wall with screwing mechanism, adhesive mechanism, snap-fit mechanism, or other ties or a combination.

Code: One or more codes such as QR codes, bar codes, numeric codes, ECode, or

OCode may be printed on the DAM 3400 that identifies the DAM device, the service the DAM device provides including transaction type, link to the service page on a website, specific information such as charges, access timing, payment methods, secured weblinks, service provider, etc. The one or more codes or part of the code can be wirelessly transmitted to a user device from where the information related to the DAM or its services can be accessed, paid for, and executed.

The DAM 3400 is a subset of DD with features suitable for access control applications such as parking meters. One or more DDs or DAMs can communicate via mesh and communicate to the server 106 via a gateway device or a user device (shown in FIG. 40). The gateway can be a device that can communicate with the DD or DAM and transmit the information to the server 106 via the cellular, Wi-Fi, Ethernet, or other means of connectivity.

Applications of DAM: Standalone Digital Parking meters (SDPM): The parking meters can work standalone where a user can use a device such as a DD including smartphone to pay for the parking.

Figure 35:
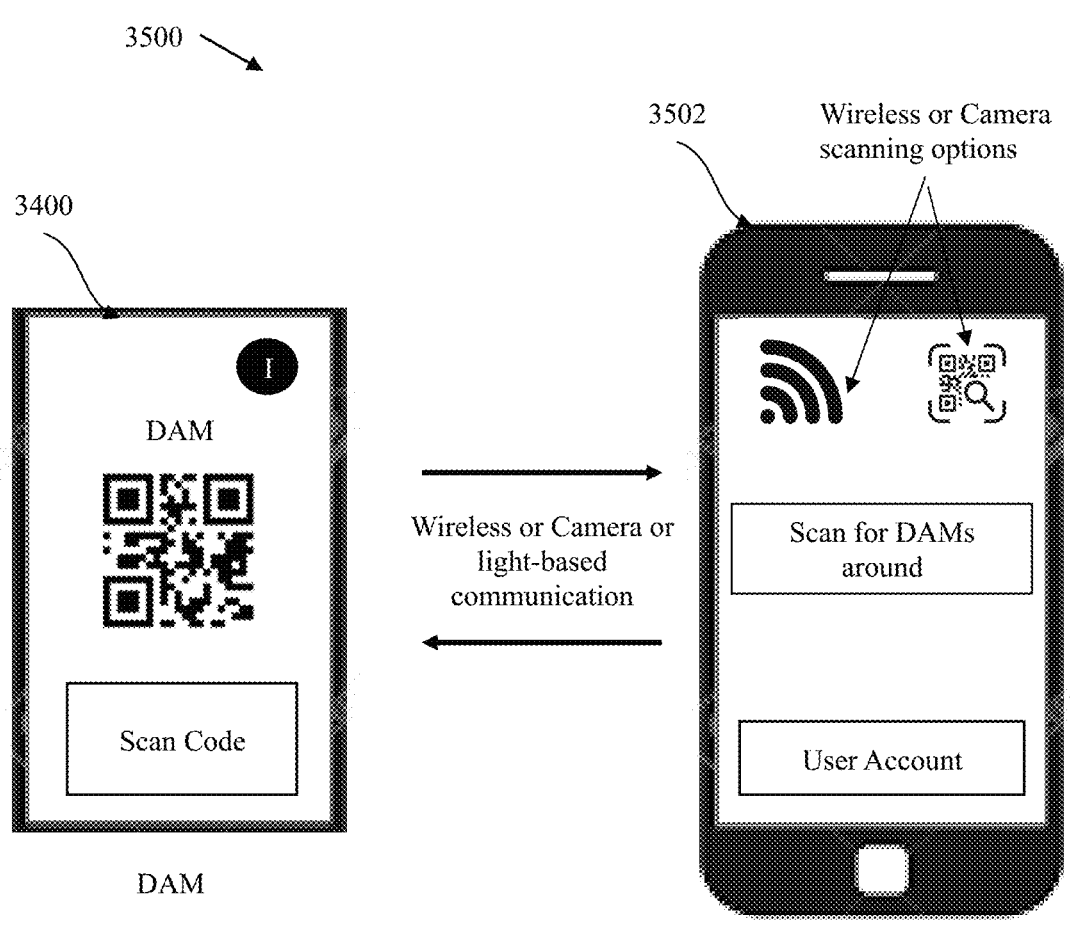
FIG. 35 is a diagram that illustrates code verification with manual scanning option in accordance with an exemplary embodiment of the disclosure.

FIG. 35 is a diagram 3500 that illustrates code verification with manual scanning option in accordance with an exemplary embodiment of the disclosure. In this embodiment, the DAM 3400 communicates with a user device 3502 (such as the first device 102 or the DD 1100) of a user. The communication between these two devices is based on wireless or camera or light-based communication but should not be construed as limiting to the scope of the present invention. The user device 3502 may be configured with an application to interact with the DAM 3400. The user may use this application to scan for DAMs in its surrounding either by using wireless option (such as Wi-Fi or Bluetooth) or camera scanning option. The wireless option may allow the user to connect the user device 3502 to the DAM 3400 (say, the nearest DAM) using its unique ID. The camera scanning option allows the user to the scan a code (such as a QR or Bar code) for establishing the secured connection.

Figure 36:
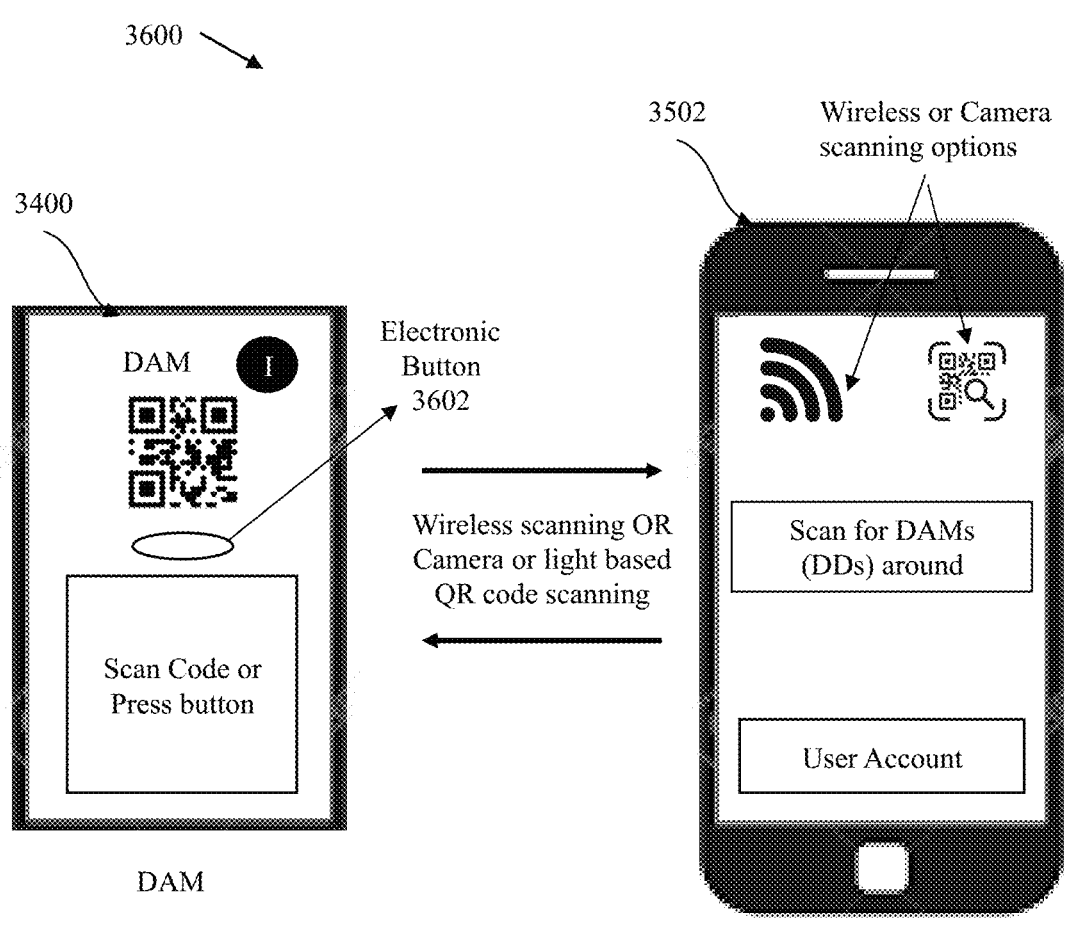
FIG. 36 is a diagram that illustrates code verification with wireless or manual scanning option with button press to start scanning in accordance with an exemplary embodiment of the disclosure.

FIG. 36 is a diagram 3600 that illustrates code verification with wireless or manual scanning option with button press to start scanning in accordance with an exemplary embodiment of the disclosure. In this embodiment, the DAM 3400 communicates with the user device 3502 based on wireless or camera or light-based communication for preforming wireless scanning or camera or light-based QR code scanning. The scanning process may be started by pressing an electronic button 3602 on the DAM 3400.

Figure 37:
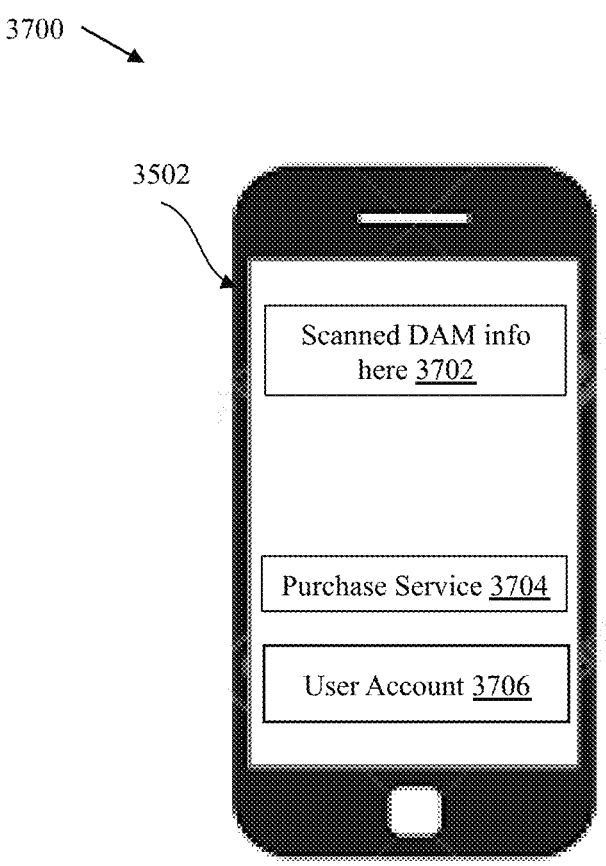
FIG. 37 is a diagram that illustrates a user's device with an application to interact with the DAM after scanning in accordance with an exemplary embodiment of the disclosure.

FIG. 37 is a diagram 3700 that illustrates the user's device 3502 with the application to interact with the DAM 3400 after scanning in accordance with an exemplary embodiment of the disclosure. The application may facilitate one or more functionalities such as an option 3702 (scanned DAM info here) that allows the user to access the DAM information on the user device 3502 after the scanning process. There is also provided an option 3704 to purchase a service or access a purchase service with the DAM 3400. There is also provided an option 3706 that allows the user to access his/her account.

Figure 38:
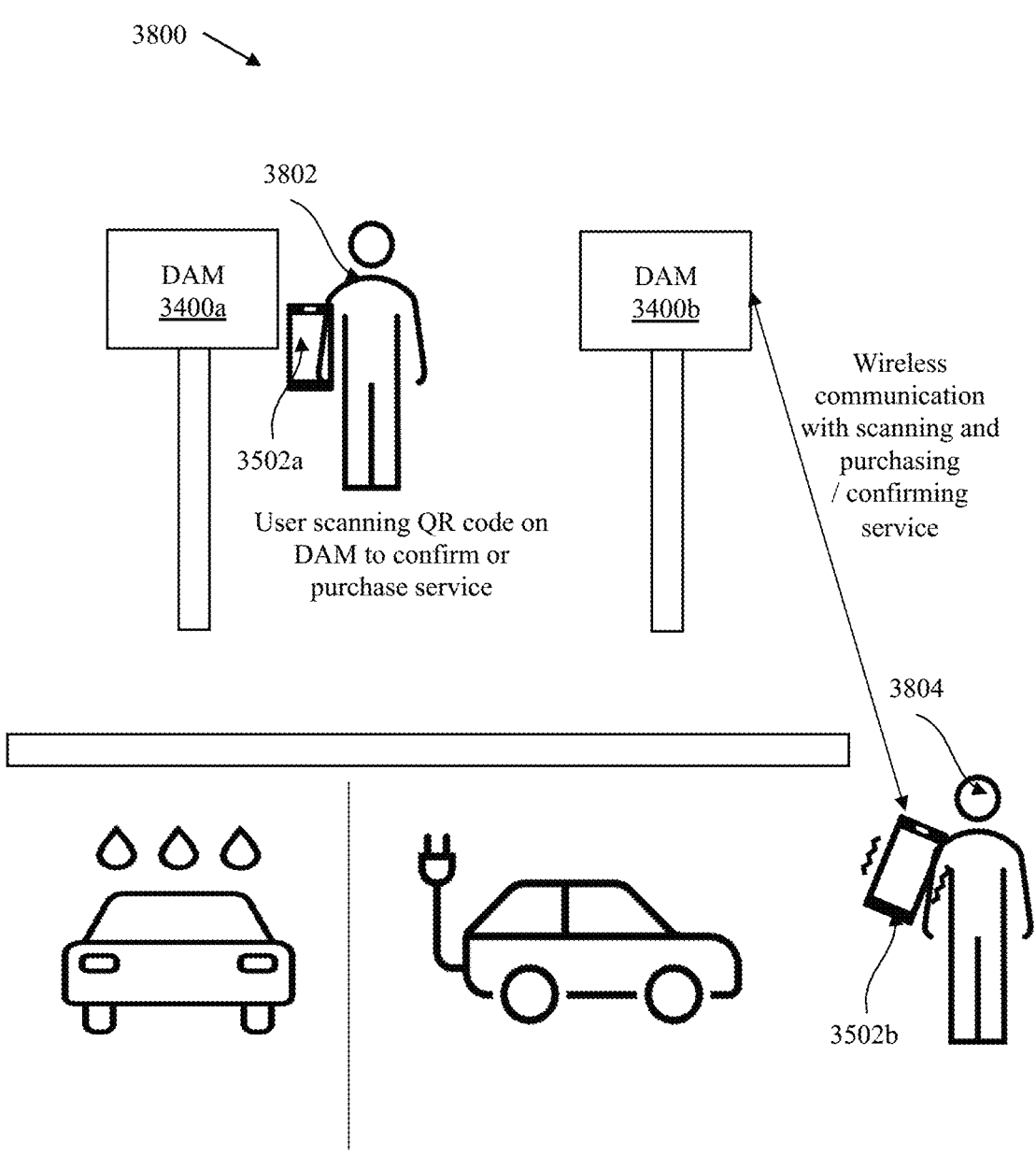
FIG. 38 is a diagram that illustrates a system environment of interaction between user devices and DAMs in accordance with an exemplary embodiment of the disclosure.

FIG. 38 is a diagram 3800 that illustrates a system environment of interaction between user devices and DAMs in accordance with an exemplary embodiment of the disclosure. For example, the user 3802 with the user device 3502a uses the application running on his/her device to scan a code (such as the QR or bar code) on the DAM 3400a to confirm or purchase a service related to parking of his/her vehicle in a parking area. In another example, the user 3804 with the user device 3502b uses the application running on his/her device to establish a wireless communication (say Wi-Fi or Bluetooth network) with the DAM 3400b to perform scanning of a code (such as the QR or bar code) and to purchase and confirm a service related to parking of his/her vehicle in the parking area.

Figure 39:
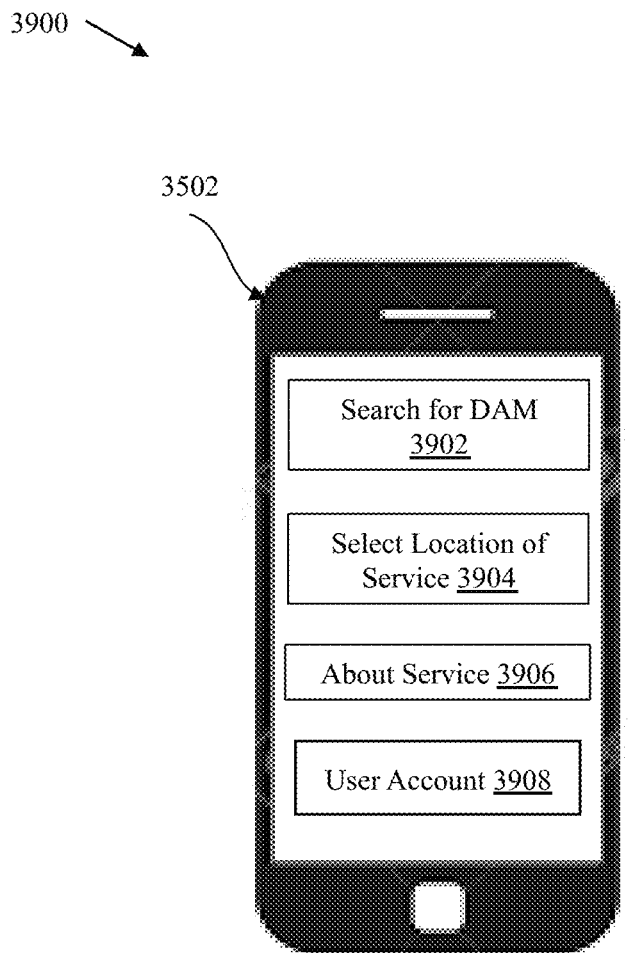
FIG. 39 is a diagram that illustrates a user's device with an application for searching, selecting, and acquiring one or more services in accordance with an exemplary embodiment of the disclosure.

FIG. 39 is a diagram 3900 that illustrates the user's device 3502 with the application for searching, selecting, and acquiring one or more services in accordance with an exemplary embodiment of the disclosure. The application may facilitate one or more functionalities such as options 3902-3908. The option 3902 may be used by the user (such as the user 3802 or 3804) to search for one or more DAMs (such as the DAM 3400) in its surrounding. The option 3904 may be used by the user to select a location of the required service (such as a location of an available parking for his/her vehicle). The option 3906 may be used by the user to browse about the services such terms of service, charges, or the like. There is also provided an option 3908 that allows the user to access his/her account.

Figure 40:
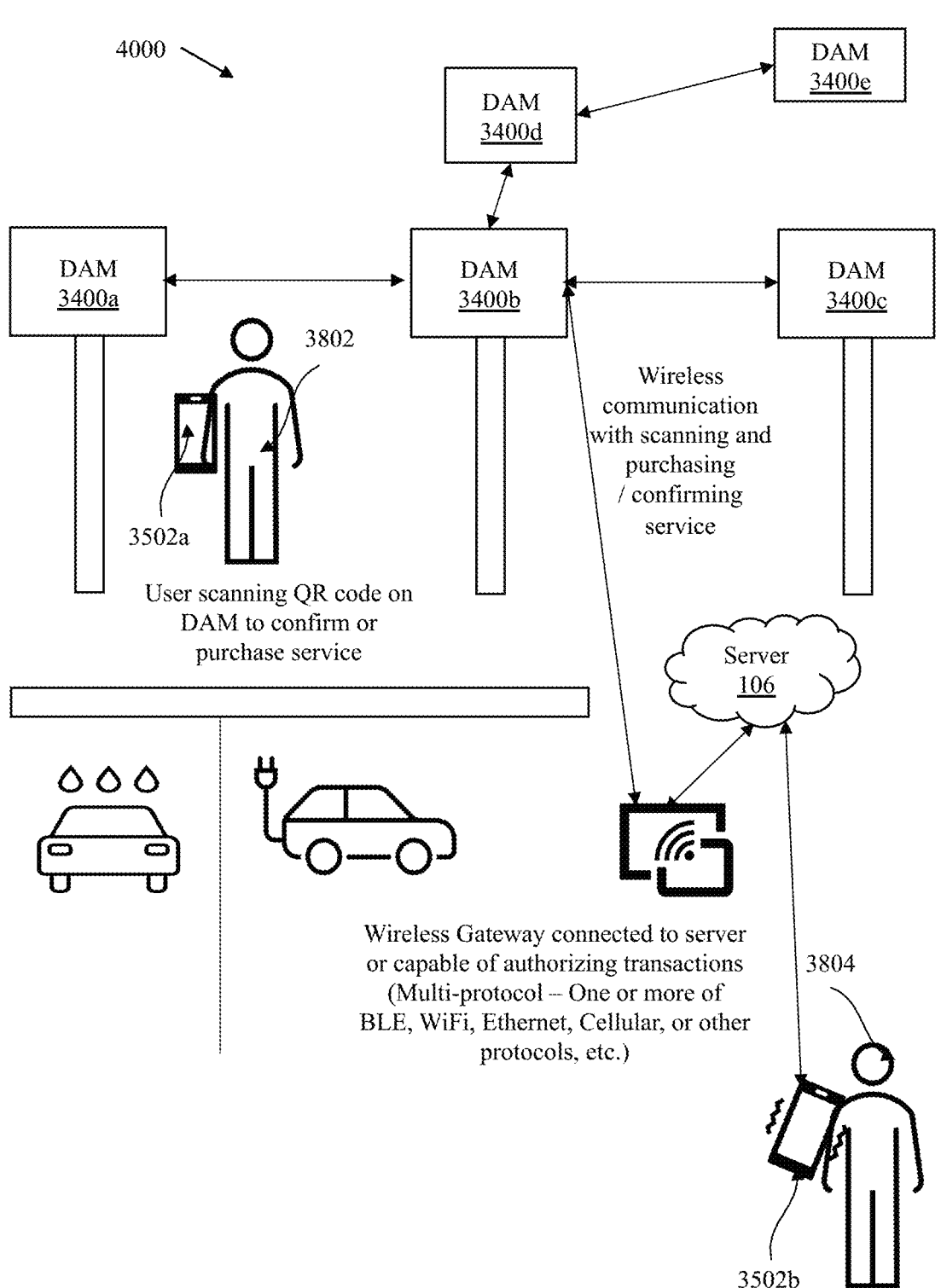
FIG. 40 is a diagram that illustrates a system environment of interaction between user devices and DAMs including gateway forming a network in accordance with an exemplary embodiment of the disclosure.

FIG. 40 is a diagram 4000 that illustrates a system environment of interaction between user devices and DAMs including gateway forming a network in accordance with an exemplary embodiment of the disclosure. In this exemplary environment, the DAMs such as the DAM 3400a, the DAM 3400b, the DAM 3400c, the DAM 3400d, and the DAM 3400e are interconnected to each other over a wired or wireless network and are configured to communicate and exchange status information (such as parking availability) of one or more parking in their respective areas/locations/regions. Various devices (such as the user device 3502a and 3502b) may communicate with the DAMs using the same or different communication and network protocol. For example, the user 3802 with the user device 3502a uses the application running on his/her device to scan a code (such as the QR or bar code) on the DAM 3400a to confirm or purchase a service related to parking of his/her vehicle in a parking area. In another example, the user 3804 with the user device 3502b uses the application running on his/her device to establish a wireless or wired communication with the server 106. This server 106 connects the user device 3502a to the wireless gateway (say Wi-Fi or Bluetooth network) which is capable of authorizing transactions with the DAM 3400b to perform scanning of a code (such as the QR or bar code) and to purchase and confirm a service related to parking of his/her vehicle in the parking area.

FIG. 41 is a process flow diagram 4100 that illustrates interaction between the user device 3502 and the DAM 3400 in accordance with an exemplary embodiment of the disclosure.

At step 4102, the DAM service program or application is launched by the user.

At step 4104, the DAM application is running on the user device 3502 of the user based on the launch initiated by the user.

At step 4106, the user device 3502 may select to scan for one or more nearby DAMs (such as the DAM 3400) via the wireless mode or code scanning mode (such as QR code scanning), directly or via a mesh network as described above.

At step 4108, the user device 3502 may select the DAM 3400 and its service and then may initiate communication either directly or via the network.

At step 4110, a check is performed to determine whether the communication between the user device 3502 and the DAM 3400 is established. If, at 4110, it is determined that the communication has been established, then, step 4112 is processed, else step 4114 is processed.

At step 4112, the DAM 3400 confirms the service, checks conflicts, and provides confirmation or status to the user. The DAM 3400 also sets visual indication to confirm the status.

At step 4114, the user may try again by repeating the same process, or the application may suggest one or more alternative ways to opt for the service.

Based on the foregoing description and figures, the following non-limiting embodiments are also provided.

In an embodiment of the present disclosure, hardware-based security systems with various types of codes, such as QR codes, Bar codes, Near Field Communication (NFC) codes, Bluetooth Low Energy (BLE) codes, Radio Frequency Identification (RFID) codes, or other codes, may be used that can enhance security, privacy, simplicity, and efficiency of various communication and transactions between devices such as data or command transmitting and receiving parties. Real time attributes or parameters such as time, date, and location, which keep changing for everyone are easily accessible because of the advancements in communication and computational devices such as a smartphone, smartwatch, or the like. Such attributes or parameters may be used for a new security protocol and system, wherein the associated devices can encrypt or decrypt the communication using regularly changing attributes or parameters that makes communication highly decentralized and harder to hack or figure out. Furthermore, various algorithms of encryption, decryption, or cryptography may be used in association with the attributes or parameters to further enhance the communication security. The methodologies and processes of implementing such security system along with various solutions including travel passport such as with respect to vaccination, securely storing data or files on local or remote servers, enhanced financial or transaction system, entry access to a restricted area, offline cash wallet for making a transaction, and possible hardware devices and applications for such solutions are disclosed herein in the present invention.

In another embodiment of the present disclosure, a security method includes: generating, by one or more first applications running on a first device, a code for executing a transaction corresponding to one or more actions or events; encrypting, by the one or more first applications, the code based on at least one or more parameters comprising at least one of a location, time, or date on the first device at a specific time, wherein the specific time is a current time or within a specific time duration; communicating, by the one or more first applications, the encrypted code to a second device over a communication network; receiving, by one or more second applications running on the second device, the encrypted code; decrypting, by the one or more second applications, the encrypted code and retrieving an information from the decrypted code; verifying, by the one or more second applications, the retrieved information; and executing the transaction after a successful verification of the retrieved information.

In one aspect, the code corresponds to a Quick Response (QR) code, a bar code, a graphical or visual code, or any other digital code comprising at least a Near Field Communication (NFC) code, a Bluetooth Low Energy (BLE) code, or a Radio Frequency Identification (RFID) code. In another aspect, the information comprises at least one of personal information, user credentials, payment information, ticket information, health records, purchase information, parking information, historical event information, future event information, product information, service information, access information, or any other information related to the one or more actions, events, or status. In another aspect, the method further includes selecting a code generation program or application from the one or more first applications. In another aspect, the method further includes selecting one or more encryption algorithms from the one or more first applications, wherein the one or more encryption algorithms change from time to time. In another aspect, the method further includes: accessing, by the one or more second applications, the one or more parameters used by the encryption algorithm; selecting one or more decryption algorithms from the one or more second programs that can decrypt the encrypted code; and wherein the encrypted code is decrypted by the one or more decryption algorithms based on the one or more accessed parameters. In another aspect, the communication network is a wireless communication network or a wired communication network. In another aspect, the one or more parameters further comprise personal data of a first user of the first device comprising at least one of a name, date of birth, universally unique identifier (UUID), device ID, phone number, email ID, other verification ID(s) that ensures identity of the first user by various verification means, nationality and related parameters, event types and related parameters, address, identity numbers such as license number, and duration of visit. In another aspect, the one or more parameters further comprise company parameters of a first user of the first device comprising at least one of a company name, company identification numbers, company address, employee ID, event ID, and any other company parameters. In another aspect, the one or more parameters further comprise one or more technical parameters comprising at least one of a signal strength between two devices, one or more random numbers, GPS coordinates of one or more devices comprising at least one of the first device or the second device, transmission power of the one or more devices, relative signal strength indicator (RSSI) value, sensor data comprising at least one of temperature, humidity, air quality, or any other data generated by the one or more devices, and security parameters comprising one or more types of biometrics comprising at least one of thumb print, facial recognition parameter, or voice parameter. In another aspect, the method further includes choosing, by the one or more first applications, the one or more parameters and one or more encryption algorithms to generate the encrypted code. In another aspect, the one or more parameters and the one or more encryption algorithms are chosen based on one or more predefined rules, as per a program on the first device, as entered by a first user of the first device, or taken from the second device before or while generating the encrypted code. In another aspect, the code comprises a single code, a combination of multiple codes, or multiple sequential codes. In another aspect, the encrypted code is valid for a time duration according to a type of the one or more actions or events associated with the transaction. In another aspect, the method further includes: selecting the code; selecting the transaction; and assigning the selected code to the selected transaction. In another aspect, the method further includes: scanning for the second device using the first device; or scanning for the first device using the second device. In another aspect, the method further includes sending a message from the second device to the first device requesting the code or permission to receive the code. In another aspect, the method further includes exchanging an algorithm identifier between the first device and the second device. In another aspect, the method further includes denying the transaction after an unsuccessful verification of the retrieved information. In another aspect, executing the transaction after the successful verification further includes: sending a message from the second device to the first device to set or display a random text/pattern known by the second device; setting or displaying the random text/pattern on the first device; and executing the transaction after a successful viewing of the random text/pattern. In another aspect, the first device includes: a digital device card, or the digital device card connected to a user device, or the digital device card integrated into the user device; and the digital device card comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors. In another aspect, the second device comprises: a digital access meter, or the digital access meter connected to a verifying device, or the digital access meter integrated into the verifying device; and the digital access meter comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors.

In another embodiment of the present disclosure, a security method includes: generating or scanning, by one or more first applications running on a first device, a code for executing a transaction corresponding to one or more actions or events; communicating, by the one or more first applications, the code to a second device over a wireless communication network; receiving, by one or more second applications running on a second device, the code from the first device over the wireless communication network; processing, by the one or more second applications, the received code; verifying, by the one or more second applications, an information in the received code; and executing the transaction after a successful verification of the information.

In one aspect, the code corresponds to a Quick Response (QR) code, a bar code, a graphical or visual code, or any other digital code comprising at least a Near Field Communication (NFC) code, a Bluetooth Low Energy (BLE) code, or a Radio Frequency Identification (RFID) code that is scannable by a camera device of the first device. In another aspect, the method further includes: selecting the information by a first user of the first device; generating the code by a code generation program or application from the one or more first applications running on the first device based on the selected information; and wherein the selected information comprises at least one of personal information, user credentials, payment information, ticket information, health records, purchase information, parking information, historical event information, future event information, product information, service information, access information, or any other information related to the one or more actions, events, or status. In another aspect, the method further includes: acknowledging a first user of the first device with a random confirmation code when the information is successfully verified; wherein one or more user devices comprise at least the first device, and one or more verifier devices comprise at least the second device that each display the random confirmation code simultaneously; and wherein the random confirmation code is valid for a short, limited time to avoid fraudulent actions, and the random confirmation code changes every time the information is verified. In another aspect, the code is a single code, a combination of multiple codes, or multiple sequential codes. In another aspect, the method further includes: selecting the code; selecting the transaction; and assigning the selected code to the selected transaction. In another aspect, the method further includes: scanning for the second device using the first device; or scanning for the first device using the second device. In another aspect, the method further includes sending a message from the second device to the first device requesting the code or permission to receive the code. In another aspect, the method further includes exchanging an algorithm identifier between the first device and the second device. In another aspect, the method further includes: encrypting, by the one or more first applications, the code based on at least one or more parameters comprising at least one of a location, time, or date on the first device at a specific time, wherein the specific time is a current time or within a specific time duration; the received code comprises the encrypted code; and decrypting, by the one or more second applications, the encrypted code. In another aspect, the method further includes denying the transaction after an unsuccessful verification of the retrieved information. In another aspect, executing the transaction after the successful verification further includes: sending a message from the second device to the first device to set or display a random text/pattern known by the second device; setting or displaying the random text/pattern on the first device; and executing the transaction after a successful viewing of the random text/pattern. In another aspect, the first device includes: a digital device card, or the digital device card connected to a user device, or the digital device card integrated into the user device; and the digital device card comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors. In another aspect, the second device comprises: a digital access meter, or the digital access meter connected to a verifying device, or the digital access meter integrated into the verifying device; and the digital access meter comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors.

In another embodiment of the present disclosure, a security system includes: one or more user devices comprising at least a first device; and one or more verifier devices comprising at least a second device. The first device is configured to generate or scan a code for executing a transaction corresponding to one or more actions or events, and communicate the code to the second device over a wireless communication network. The second device is configured to receive the code from the first device over the wireless communication network, process the received code, and verify an information in the received code. The transaction is executed after a successful verification of the information.

In one aspect, the code corresponds to a Quick Response (QR) code, a bar code, a graphical or visual code, or any other digital code comprising at least a Near Field Communication (NFC) code, a Bluetooth Low Energy (BLE) code, or a Radio Frequency Identification (RFID) code that is scannable by a camera device of the first device. In another aspect, the first device is further configured to select the information by a first user, and generate the code by a code generation program or application based on the selected information, and the selected information comprises at least one of personal information, user credentials, payment information, ticket information, health records, purchase information, parking information, historical event information, future event information, product information, service information, access information, or any other information related to the one or more actions, events, or status. In another aspect, the second device is further configured to acknowledge a first user of the first device with a random confirmation code when the information is successfully verified; the first device and second device display the random confirmation code simultaneously; and the random confirmation code is valid for a short, limited time to avoid fraudulent actions, and the random confirmation code changes every time the information is verified. In another aspect, the code is a single code, a combination of multiple codes, or multiple sequential codes. In another aspect, the first device is further configured to scan for the second device; or the second device is further configured to scan for the first device. In another aspect, the second device is further configured to send a message to the first device requesting the code or permission to receive the code. In another aspect, the first device and the second device are further configured to exchange an algorithm identifier. In another aspect, the first device is further configured to encrypt the code based on at least one or more parameters comprising at least one of a location, time, or date on the first device at a specific time, wherein the specific time is a current time or within a specific time duration; the received code comprises the encrypted code; and the second device is further configured to decrypt the encrypted code. In another aspect, the second device is further configured to deny the transaction after an unsuccessful verification of the retrieved information. In another aspect, the second device is further configured to send a message to the first device to set or display a random text/pattern known by the second device; the first device is further configured to set or display the random text/pattern; and the transaction is executed after a successful viewing of the random text/pattern. In another aspect, the first device includes: a digital device card, or the digital device card connected to a user device, or the digital device card integrated into the user device; and the digital device card comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors. In another aspect, the second device includes: a digital access meter, or the digital access meter connected to a verifying device, or the digital access meter integrated into the verifying device; and the digital access meter comprises a substrate, one or more processors disposed on or within the substrate, a memory disposed on or within the substrate and coupled to the one or more processors, a transceiver disposed on or within the substrate and coupled to the one or more processors, one or more input/output devices disposed on or within the substrate and coupled to the one or more processors, and one or more sensors disposed on or within the substrate and coupled to the one or more processors.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems, and methods for facilitating secured communication and transaction between devices and/or servers. While various exemplary embodiments of the disclosed systems and methods have been described above, it should be understood that they have been presented for the purpose of example and illustration only and should not be construed as limiting to the scope of the present invention. It is not exhaustive and does not limit the disclosure to the precise form disclosed. Modifications and variations are possible in light of the above teachings or may be acquired from practicing of the disclosure, without departing from the breadth or scope of the present invention.

Circuits can be implemented with, but are not limited to, single or combinations of discrete electrical and electronic components, integrated circuits, semiconductor devices, analog devices, digital devices, etc. Elements can be coupled together using any type of suitable direct or indirect connection between the elements including, but not limited to, wires, pathways, channels, vias, electromagnetic induction, electrostatic charges, optical links, wireless communication links, etc.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

What is claimed is:
1. A security method, comprising:
generating, by one or more first applications running on a mobile device, a scannable code for executing a transaction corresponding to one or more actions or events;
encrypting, by the one or more first applications on the mobile device, the scannable code based on at least one or more parameters comprising at least one of a location, time, or date on the mobile device at a specific time, wherein the specific time is a current time or within a specific time duration;
communicating, by the one or more first applications on the mobile device, the encrypted scannable code to a verifier device over a communication network;
receiving, by one or more second applications running on the verifier device, the encrypted scannable code;

decrypting, by the one or more second applications on the verifier device, the encrypted scannable code and retrieving an information from the decrypted scannable code;
verifying, by the one or more second applications on the verifier device, the retrieved information; and
executing the transaction after a successful verification of the retrieved information.

2. The security method of claim 1, wherein the scannable code corresponds to a Quick Response (QR) code, a bar code, a graphical or visual code, or any other scannable digital code comprising at least a Near Field Communication (NFC) code, a Bluetooth Low Energy (BLE) code, or a Radio Frequency Identification (RFID) code.

3. The security method of claim 1, wherein the information comprises at least one of personal information, user credentials, payment information, ticket information, health records, purchase information, parking information, historical event information, future event information, product information, service information, access information, or any other information related to the one or more actions, events, or status.

4. The security method of claim 1, further comprising selecting a scannable code generation program or application from the one or more first applications.

5. The security method of claim 1, further comprising selecting one or more encryption algorithms from the one or more first applications, wherein the one or more encryption algorithms change from time to time.

6. The security method of claim 5, further comprising:
accessing, by the one or more second applications, the one or more parameters used by the encryption algorithm;
selecting one or more decryption algorithms from the one or more second programs that can decrypt the encrypted scannable code; and
wherein the encrypted scannable code is decrypted by the one or more decryption algorithms based on the one or more accessed parameters.

7. The security method of claim 1, wherein the communication network is a wireless communication network or a wired communication network.

8. The security method of claim 1, wherein the one or more parameters further comprise personal data of a first user of the mobile device comprising at least one of a name, date of birth, universally unique identifier (UUID), device ID, phone number, email ID, other verification ID(s) that ensures identity of the first user by various verification means, nationality and related parameters, event types and related parameters, address, identity numbers such as license number, and duration of visit.

9. The security method of claim 1, wherein the one or more parameters further comprise company parameters of a first user of the mobile device comprising at least one of a company name, company identification numbers, company address, employee ID, event ID, and any other company parameters.

10. The security method of claim 1, wherein the one or more parameters further comprise one or more technical parameters comprising at least one of a signal strength between two devices, one or more random numbers, GPS coordinates of one or more devices comprising at least one of the mobile device or the verifier device, transmission power of the one or more devices, relative signal strength indicator (RSSI) value, sensor data comprising at least one of temperature, humidity, air quality, or any other data generated by the one or more devices, and security parameters comprising one or more types of biometrics comprising at least one of thumb print, facial recognition parameter, or voice parameter.

11. The security method of claim 1, further comprising choosing, by the one or more first applications, the one or more parameters and one or more encryption algorithms to generate the encrypted scannable code.

12. The security method of claim 11, wherein the one or more parameters and the one or more encryption algorithms are chosen based on one or more predefined rules, as per a program on the mobile device, as entered by a first user of the mobile device, or taken from the verifier device before or while generating the encrypted scannable code.

13. The security method of claim 1, wherein the scannable code comprises a single scannable code, a combination of multiple scannable codes, or multiple sequential scannable codes.

14. The security method of claim 1, wherein the encrypted scannable code is valid for a time duration according to a type of the one or more actions or events associated with the transaction.

15. A security method, comprising:

generating or scanning, by one or more first applications running on a mobile device, a scannable code for executing a transaction corresponding to one or more actions or events;

communicating, by the one or more first applications on the mobile device, the scannable code to a verifier device over a wireless communication network;

receiving, by one or more second applications running on a verifier device, the scannable code from the mobile device over the wireless communication network;

processing, by the one or more second applications on the verifier device, the received scannable code;

verifying, by the one or more second applications on the verifier device, an information in the received scannable code; and executing the transaction after a successful verification of the information.

16. The security method of claim 15, wherein the scannable code corresponds to a Quick Response (QR) code, a bar code, a graphical or visual code, or any other scannable digital code comprising at least a Near Field Communication (NFC) code, a Bluetooth Low Energy (BLE) code, or a Radio Frequency Identification (RFID) code that is scannable by a camera device of the mobile device.

17. The security method of claim 16, further comprising:

selecting the information by a first user of the mobile device;

generating the scannable code by a scannable code generation program or application from the one or more first applications running on the mobile device based on the selected information; and wherein the selected information comprises at least one of personal information, user credentials, payment information, ticket information, health records, purchase information, parking information, historical event information, future event information, product information, service information, access information, or any other information related to the one or more actions, events, or status.

18. The security method of claim 15, further comprising:

acknowledging a first user of the mobile device with a random confirmation code when the information is successfully verified;

wherein the mobile device and the verifier device each display the random confirmation code simultaneously; and wherein the random confirmation code is valid for a short, limited time to avoid fraudulent actions, and the random confirmation code changes every time the information is verified.

19. The security method of claim 15, wherein the scannable code is a single scannable code, a combination of multiple scannable codes, or multiple sequential scannable codes.

20. A security system, comprising:

one or more mobile devices;

one or more verifier devices; and wherein the mobile device is configured to generate or scan a scannable code for executing a transaction corresponding to one or more actions or events, and communicate the scannable code to the verifier device over a wireless communication network;

wherein the verifier device is configured to receive the scannable code from the mobile device over the wireless communication network, process the received scannable code, and verify an information in the received scannable code; and wherein the transaction is executed after a successful verification of the information.

* * * * *